US012517267B2

(12) United States Patent
Ishigami et al.

(10) Patent No.: US 12,517,267 B2
(45) Date of Patent: Jan. 6, 2026

(54) POSITIONING APPARATUS AND POSITIONING METHOD

(71) Applicant: Mitsubishi Electric Corporation, Tokyo (JP)

(72) Inventors: Tadatomi Ishigami, Tokyo (JP); Hiroshi Sakaida, Tokyo (JP); Masao Higuchi, Tokyo (JP); Tomoya Ikeuchi, Tokyo (JP); Masashi Kido, Tokyo (JP); Shinya Ueda, Tokyo (JP); Masakazu Suzuki, Tokyo (JP); Masatoshi Fujii, Tokyo (JP); Kohei Fujimoto, Tokyo (JP); Akihiro Obara, Tokyo (JP); Norizumi Motooka, Tokyo (JP); Yuki Sato, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 57 days.

(21) Appl. No.: 18/289,094

(22) PCT Filed: Jun. 8, 2021

(86) PCT No.: PCT/JP2021/021739
§ 371 (c)(1),
(2) Date: Oct. 31, 2023

(87) PCT Pub. No.: WO2022/259365
PCT Pub. Date: Dec. 15, 2022

(65) Prior Publication Data
US 2024/0219582 A1 Jul. 4, 2024

(51) Int. Cl.
*G01S 19/44* (2010.01)
*G01S 19/28* (2010.01)
(Continued)

(52) U.S. Cl.
CPC ............ *G01S 19/44* (2013.01); *G01S 19/28* (2013.01); *G01S 19/396* (2019.08); *G01S 19/49* (2013.01)

(58) Field of Classification Search
CPC ........ G01S 19/44; G01S 19/28; G01S 19/396; G01S 19/49; G01S 19/40; G01S 19/426
See application file for complete search history.

(56) References Cited

U.S. PATENT DOCUMENTS 9,223,029 B2   12/2015  Iwase
11,422,271 B2*  8/2022  Talbot ..................... G01S 19/44
(Continued)

FOREIGN PATENT DOCUMENTS

JP  2010-71686 A   4/2010
JP  5083749 B2   11/2012
(Continued)

OTHER PUBLICATIONS

International Search Report, issued in PCT/JP2021/021739, PCT/ISA/210, dated Aug. 17, 2021.

*Primary Examiner* — Rami Khatib
(74) *Attorney, Agent, or Firm* — BIRCH, STEWART, KOLASCH & BIRCH, LLP

(57) ABSTRACT

The object is to provide a technology for appropriately making the centimeter positioning available in automotive applications. A positioning apparatus determines a standalone positioning solution including a vehicle position, determines a float solution including the vehicle position and a carrier phase bias, determines an integer ambiguity, determines a fix solution including the vehicle position, sets any one of the standalone positioning solution, the float solution, the fix solution, and a non-positioning solution indicating no existence of a solution as a positioning solution, and predicts (Continued)

a positioning error of the positioning solution as a positioning error of the vehicle position per epoch.

22 Claims, 36 Drawing Sheets

(51) Int. Cl.
  *G01S 19/39* (2010.01)
  *G01S 19/49* (2010.01)

(56) References Cited

U.S. PATENT DOCUMENTS

| | | | |
|---|---|---|---|
| 12,013,468 B2* | 6/2024 | Smolyakov | G01S 19/071 |
| 12,169,243 B2* | 12/2024 | Kishimoto | G01S 19/071 |
| 2005/0212697 A1* | 9/2005 | Brabec | G01S 19/44 |
| | | | 342/357.27 |
| 2012/0286991 A1* | 11/2012 | Chen | G01S 19/32 |
| | | | 342/357.23 |
| 2018/0074201 A1 | 3/2018 | Sakai et al. | |
| 2019/0049594 A1 | 2/2019 | Yoshino | |

FOREIGN PATENT DOCUMENTS

| | | |
|---|---|---|
| JP | 5590010 B2 | 9/2014 |
| WO | WO 2017/072980 A1 | 5/2017 |
| WO | WO 2017/138502 A1 | 8/2017 |

\* cited by examiner

POSITIONING APPARATUS AND POSITIONING METHOD

TECHNICAL FIELD

The present disclosure relates to a positioning apparatus and a positioning method.

BACKGROUND ART

In the field of surveying, multi-Global Navigation Satellite System (GNSS) satellites such as GPS, GLONASS, Galileo, BeiDou, and QZSS radiate signals at three frequencies including military L2P and civil L1 and L5. GNSS receivers supporting these can perform centimeter positioning. In a standalone positioning method with less accuracy, a pseudo range of a positioning signal calculated from a radio propagation time from a satellite to a vehicle is used as main observation data. In the centimeter positioning, carrier phases are also used as the main observation data. A method using the carrier phases is referred to as a carrier phase positioning method.

The carrier phase positioning method includes real-time kinematic (RTK) and precise point positioning-RTK (PPP-RTK). In the carrier phase positioning method, a GNSS receiver calculates an integrated value obtained by continuously measuring carrier phase angles of demodulated positioning signals. When continuous observation is suspended by, for example, cycle slip, the GNSS receiver resets the integrated value. In this reset, a carrier phase bias is changed. In other words, the carrier phase bias is not changed during continuous reception of radio waves from a plurality of positioning-based satellites. If the carrier phase bias is determined with high accuracy once, the carrier phase bias cannot be determined per epoch.

The carrier phase positioning method including the standalone positioning method produces three positioning solutions in total which includes two of a float solution and a fix solution with application of an augmentation signal, and one standalone positioning solution with no application of the augmentation signal.

The centimeter positioning for use in the field of surveying is performed under an environment without any surrounding structures causing reception interference of radio waves (this environment is referred to as open sky). It is said that the accuracy of fix solutions is centimeter accuracy. Also, it is expected that a fix rate is higher than or equal to 95% at minimum, and normally higher than or equal to 99%. On the other hand, float solutions are lower in accuracy than fix solutions (e.g., centimeter to meter accuracy). Thus, in general, the float solutions are not used when the objective is to perform the centimeter positioning.

Although the aforementioned GNSS receivers can perform high-accuracy positioning, they am very expensive and thus cannot be incorporated into production vehicles. Positioning devices in automotive applications perform positioning computation in the carrier phase positioning method by receiving civil L1 and L2C radiated from the multi-GNSS satellites such as GPS, GLONASS, Galileo, BeiDou, and QZSS through inexpensive GNSS receivers and GNSS antennas. Even under the open sky, however, positioning signals received through the inexpensive GNSS antennas are generally lower in carrier-to-noise ratios (C/N values) than those received through expensive GNSS antennas for surveying. C/N averages of these positioning signals sometimes differ depending on frequency bands of the L1 and the L2C. Moreover, car-mounted environments such as environments for receiving radio waves around vehicles have various problems. This is because the environments vary, ranging from the open sky, multipath environments in varying sizes, or environments that shield a part of satellite radio waves over vehicles to environments in tunnels that shield the whole satellite radio waves. To address these problems, for example, technologies in Patent Documents 1 to 4 have been proposed.

PRIOR ART DOCUMENTS

Patent Documents

[Patent Document 1] Japanese Patent No. 5590010
[Patent Document 2] Japanese Patent No. 5083749
[Patent Document 3] International Publication No, WO2017/138502 A1
[Patent Document 4] Japanese Patent Application Laid-Open No. 2010-071686

SUMMARY

Problem to be Solved by the Invention

Vehicles traveling through roads sometimes suffer from mistaken fix solutions with which vehicle position accuracy obtained from fix solutions decreases to meter accuracy. If a fix rate at which fix solutions are obtained decreases, a float rate at which float solutions with uncertain accuracy are obtained conversely increases. Under the conventional technologies, however, positioning errors between fix solutions and float solutions are not predicted in real time. Thus, there has been a problem of difficulty in using the centimeter positioning in automotive applications.

The present disclosure has been made in view of the problem, and has an object of providing a technology for making the centimeter positioning available in automotive applications.

Means to Solve the Problem

A positioning apparatus according to the present disclosure includes: a GNSS obtaining means to obtain a piece of observation data including, for each of positioning signals from a plurality of GNSS satellites, a pseudo range, a carrier phase, and a Doppler shift frequency, and a piece of orbit data of the plurality of GNSS satellites; a positioning augmentation data obtaining means to obtain positioning augmentation data from positioning augmentation satellites or the Internet; a positioning-based satellite selecting means to select positioning-based satellites from among the plurality of GNSS satellites; a standalone positioning solution calculating means to determine a standalone positioning solution, based on pieces of observation data and a piece of orbit data of the positioning-based satellites without using the positioning augmentation data; a float solution calculating means to determine a float solution including a carrier phase bias, based on the pieces of observation data and the piece of orbit data of the positioning-based satellites, and the positioning augmentation data; a search and test means to determine an integer ambiguity based on the carrier phase bias of the float solution; a fix solution calculating means to determine a fix solution based on the pieces of observation data and the piece of orbit data of the positioning-based satellites, the positioning augmentation data, and the integer ambiguity; and a satellite positioning error predicting means to set any one of the standalone positioning solution, the float solution, the fix solution, and a non-positioning solution indicating no existence of a solution as a positioning solution, and predict a positioning error of the positioning solution per epoch.

Effects of the Invention

The present disclosure reduces mistaken fix solutions and predicts a positioning error of a positioning solution in real time, thereby making the centimeter positioning available in automotive applications.

The object, features, aspects, and advantages of the present disclosure will become more apparent from the following detailed description and the accompanying drawings.

DESCRIPTION OF EMBODIMENT(S)

Embodiment 1

Figure 1:
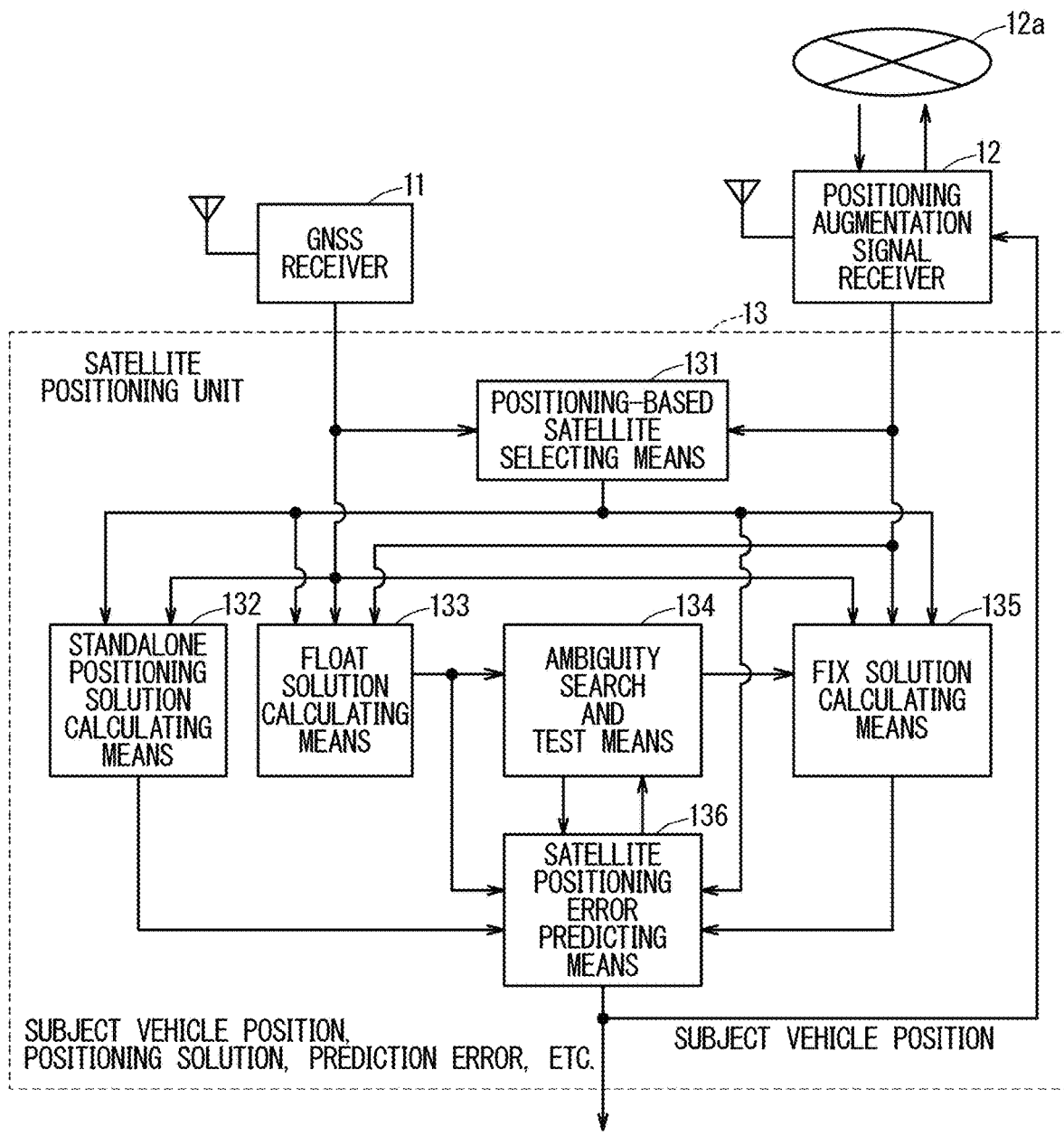
FIG. 1 is a block diagram illustrating a configuration of a positioning device according to Embodiment 1.

FIG. 1 is a block diagram illustrating a configuration of a positioning device according to Embodiment 1. Hereinafter, a target vehicle of interest on which a positioning device is mounted may be referred to as a "subject vehicle", its vehicle position may be referred to as a "subject vehicle position", the positioning device may be referred to as a "mobile station", and a GNSS satellite may be referred to as a "satellite".

The positioning device in FIG. 1 includes a GNSS receiver 11 that is a GNSS obtaining means and includes a GNSS antenna, a positioning augmentation signal receiver 12 that is a positioning augmentation data obtaining means, and a satellite positioning unit 13.

The GNSS receiver 11 receives positioning signals of radio waves in a predetermined frequency band. The positioning signals are radiated from a plurality of GNSS satellites including GPS satellites existing over the subject vehicle. The positioning signals according to Embodiment 1 include positioning signals at two frequencies, that is, an L1 signal that is a first positioning signal, and a L2C signal that is a second positioning signal whose frequency band is different from that of the L1 signal, which are not limited to these. The GNSS receiver 11 generates time data, pieces of observation data, and a piece of orbit data, based on the positioning signals to be broadcast by the plurality of GNSS satellites.

The time data includes, for example, a time to be used for synchronization. The piece of observation data includes a pseudo range, a carrier phase, a Doppler shift frequency, and an ionospheric delay error of a mobile station for each of the positioning signals. The piece of orbit data is data necessary for calculating positions of the plurality of GNSS satellites, and includes broadcast ephemeris.

The positioning augmentation signal receiver 12 is connected to a positioning augmentation signal distribution provider server (not illustrated) through an internet connection 12a. The positioning augmentation signal receiver 12 authenticates a predetermined access point in the connecting. The positioning augmentation signal receiver 12 appropriately transmits, to the connected server, position data of the mobile station that supports the carrier phase positioning method to receive a positioning augmentation signal including positioning augmentation data that supports the carrier phase positioning method from the server in a predetermined cycle. The positioning augmentation data includes position data and observation data of a reference station that is a reference point. The reference station and the observation data herein may be virtual, and the position data of the reference station may be fixed data. Although Embodiment 1 describes the carrier phase positioning method as a virtual reference station (VRS) method, the carrier phase positioning method may be the RTK method.

The satellite positioning unit 13 includes a positioning-based satellite selecting means 131, a standalone positioning solution calculating means 132, a float solution calculating means 133, an ambiguity search and test means 134, a fix solution calculating means 135, and a satellite positioning error predicting means 136.

The positioning-based satellite selecting means 131 selects positioning-based satellites from among the plurality of GNSS satellites. The standalone positioning solution calculating means 132, the float solution calculating means 133, and the fix solution calculating means 135 use the time data, the pieces of observation data, and the piece of orbit data of the selected positioning-based satellites.

The standalone positioning solution calculating means 132 determines a standalone positioning solution including a GNSS-receiver internal clock error, based on the time data, the pieces of observation data, and the piece of orbit data of the positioning-based satellites according to the standalone positioning method without using the positioning augmentation data.

The float solution calculating means 133 determines a float solution and a carrier phase bias, based on the time data, the pieces of observation data, and the piece of orbit data of the positioning-based satellites, and based on virtual observation data including coordinates of a virtual reference station that the server virtually sets near the subject vehicle position and virtual observation results at the coordinates according to the VRS method as the carrier phase positioning method. As described above, the carrier phase positioning method is the VRS method in Embodiment 1. The float solution is a real number.

The ambiguity search and test means 134 determines, according to search and test in the least-square ambiguity decorrelation adjustment (LAMBDA) method to be described later, an integer ambiguity of carrier phases referred to as ambiguity from the carrier phase bias represented by the real number of the float solution.

The fix solution calculating means 135 determines a fix solution based on the time data, the pieces of observation data, and the piece of orbit data of the positioning-based satellites, and based on the virtual observation data including the coordinates of the virtual reference station that the server virtually sets near the subject vehicle position and the virtual observation results at the coordinates according to the VRS method as the carrier phase positioning method.

The satellite positioning error predicting means 136 sets any one of the standalone positioning solution, the float solution, the fix solution, and a non-positioning solution indicating no existence of a solution as a positioning solution of the satellite positioning. The satellite positioning error predicting means 136 also predicts a positioning error of the positioning solution per epoch.

[Operations]

Figure 2:
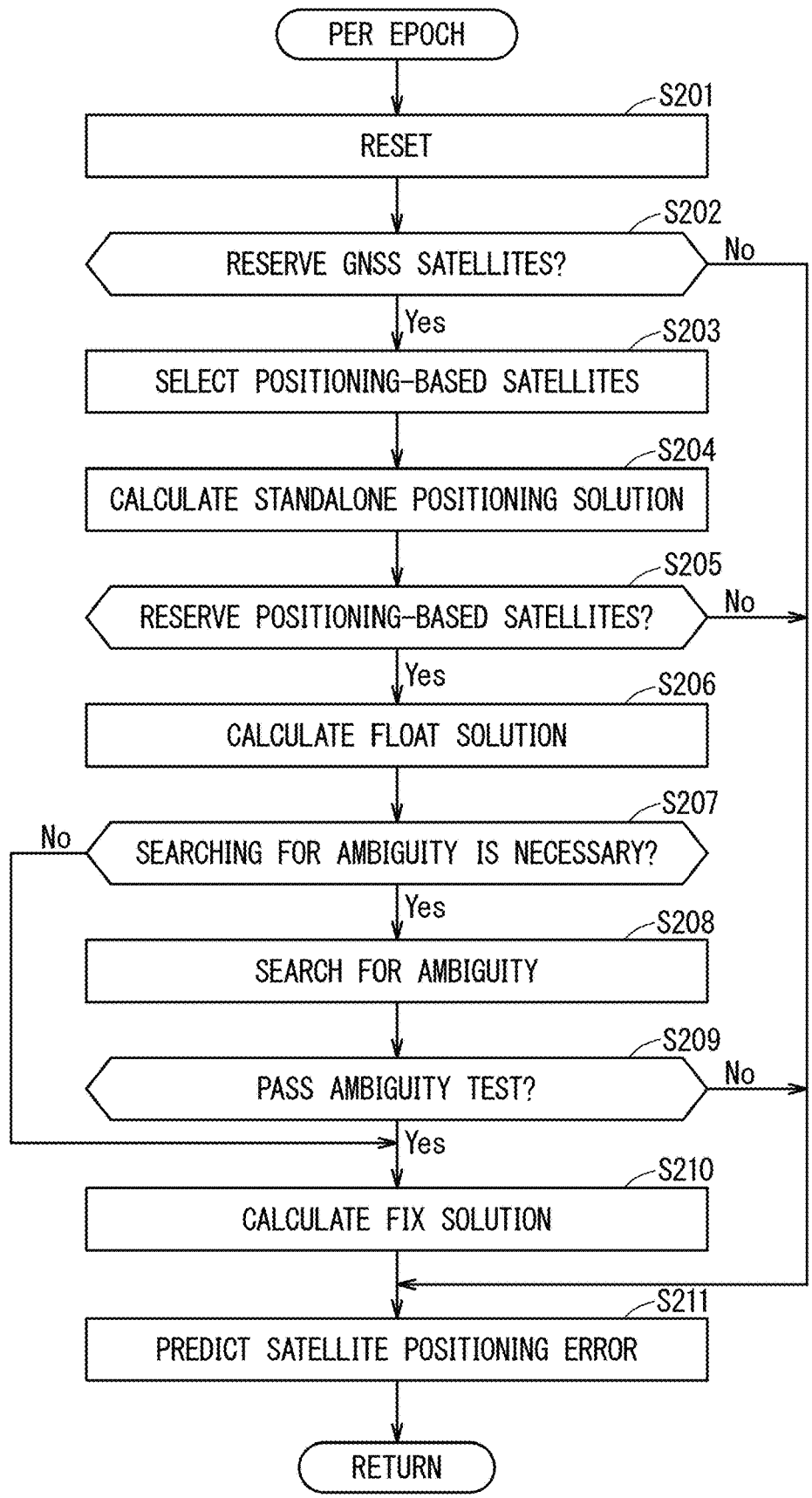
FIG. 2 is a flowchart illustrating operations of the positioning device according to Embodiment 1.

Next, operations of the positioning device according to Embodiment 1 will be described. FIG. 2 is a flowchart illustrating operations of the positioning device per epoch. The satellite positioning unit 13 performs the operations in FIG. 2. Although the VRS method will be mainly described, the same applies to the RTK method.

First, in Step S201 of FIG. 2, processes of the positioning device are reset.

In Step S202, the satellite positioning unit 13 determines whether the number of GNSS satellites (may be hereinafter referred to as "receiving satellites") from which the GNSS receiver 11 can receive positioning signals is more than or equal to four. When the number of receiving satellites is less than four, the processes proceed to Step S211. When the number of receiving satellites is more than or equal to four, the processes proceed to Step S203.

In Step S203, the positioning-based satellite selecting means 131 selects positioning-based satellites from among the plurality of GNSS satellites. Selection of the positioning-based satellites will be hereinafter described.

Figure 3A:
FIGS. 3A to 3C illustrates example results each obtained by calculating pseudo-range residuals according to Embodiment 1.
Figure 3B:
Figure 3C:

FIGS. 3A to 3C illustrate example results each obtained by calculating pseudo-range residuals as one piece of observation data. The GNSS receiver that outputs the pseudo-range residuals is currently known. The pseudo-range residuals merely represent occurrence of multipath as flags as illustrated in FIG. 3C.

Thus, the positioning-based satellite selecting means 131 according to Embodiment 1 determines first pseudo-range residuals as illustrated in FIG. 3A, based on a comparison between pseudo ranges, carrier phases, or Doppler shift frequencies which are included in positioning signals being received. The positioning-based satellite selecting means 131 can calculate the first pseudo-range residuals by a calculation method described in, for example, Japanese Patent No. 4988028 or Japanese Patent No. 6482720.

When having both of an L1 signal and an L2C signal at two frequencies, that is, upon receipt of both of these signals, the positioning-based satellite selecting means 131 offsets an ionospheric delay error of the L1 signal against an ionospheric delay error of the L2C signal according to ionospheric-free linear combinations. The positioning-based satellite selecting means 131 determines second pseudo-range residuals as illustrated in FIG. 3B by offsetting such ionospheric delay errors.

Next, the positioning-based satellite selecting means 131 makes a primary selection of selecting GNSS satellites whose communication quality is higher than or equal to a first threshold necessary for attaining the positioning accuracy as preliminary positioning-based satellites, based on at least one of the first pseudo-range residuals or the second pseudo-range residuals, and angles of elevation and C/N values.

Then, the positioning-based satellite selecting means 131 selects the preliminary positioning-based satellites as positioning-based satellites when the number of pieces of observation data of the preliminary positioning-based satellites is smaller than or equal to a prescribed number. When the number of pieces of observation data of the preliminary positioning-based satellites exceeds the prescribed number, the positioning-based satellite selecting means 131 makes a secondary selection of selecting positioning-based satellites whose number of pieces of observation data is smaller than or equal to a threshold from among the preliminary positioning-based satellites, based on the communication quality of each of the preliminary positioning-based satellites. For example, the positioning-based satellite selecting means 131 makes the secondary selection of selecting GNSS satellites whose communication quality is higher than or equal to a second threshold higher than the first threshold necessary for attaining the positioning accuracy as preliminary positioning-based satellites, based on at least one of the first pseudo-range residuals or the second pseudo-range residuals, and angles of elevation and C/N values. The pseudo-range residuals to be used for the primary selection may be identical to or different from those for the secondary selection.

The positioning-based satellite selecting means 131 may select GNSS satellites whose positioning signal is only at a single frequency as positioning-based satellites whose pieces of observation data are used by the standalone positioning solution calculating means 132. The positioning-based satellite selecting means 131 selects GNSS satellites whose positioning signals are at two frequencies more preferentially than GNSS satellites whose positioning signal is only at a single frequency, as positioning-based satellites whose pieces of observation data are used by the float solution calculating means 133 and the fix solution calculating means 135. These selections improve the accuracy of float solutions and fix solutions.

The positioning-based satellite selecting means 131 determines, from among the positioning-based satellites, a positioning-based satellite whose angle of elevation, C/N value, and quality of a pseudo range are higher as a primary satellite, and determines the other positioning-based satellites as subordinate satellites. The following will describe example conditions for selecting positioning-based satellites.

[Conditions for Selecting Positioning-Based Satellites]

(1) Pseudo-range residuals (mainly an estimated value of a multipath error) between the L1 signal and the L2C signal are less than or equal to a predetermined value.

(2) An angle of elevation of a GNSS satellite is larger than or equal to a predetermined value.

(3) A state where C/N values of the L1 signal and the L2C signal are higher than or equal to a predetermined value is continued for a predetermined epoch or longer.

(4) Carrier phases of the L1 signal and the L2C signal are observed after a lapse of a predetermined time or longer, after cycle slip that is not observed.

(5) A virtual reference station and a mobile station have common pieces of observation data of GNSS satellites (this selecting condition is applied only when the carrier phase positioning method is the VRS method).

(6) A delay time of the piece of observation data at the virtual reference station is shorter than or equal to a predetermined time.

(7) The number of GNSS satellites having both of the L1 signal and the L2C signal is more than or equal to a predetermined value (this reason is that GNSS satellites at two frequencies are preferred to calculate pseudo-range residuals by eliminating the influence of ionospheric delay errors).

When the piece of observation data only includes a carrier phase, the number of simultaneous equations for solving unknowns is insufficient. In contrast, since the piece of observation data includes a pseudo range as well as the carrier phase in Embodiment 1, unknowns can be solved by the increased number of simultaneous equations.

In Step S204, the standalone positioning solution calculating means 132 determines a standalone positioning solution including a subject vehicle position and a GNSS-receiver internal clock error, based on pseudo ranges included in the pieces of observation data of four or more GNSS satellites and the broadcast ephemeris included in the piece of orbit data according to the standalone positioning method.

In Step S205, the satellite positioning unit 13 determines whether the number of positioning-based satellites is more than or equal to five and whether the number of simultaneous equations is more than the number of unknowns. When the number of positioning-based satellites is more than or equal to five and the number of simultaneous equations is more than the number of unknowns, the processes proceed to Step S206. When the number of positioning-based satellites is less than five and the number of simultaneous equations is less than the number of unknowns, the processes proceed to Step S211.

In Step S206, the float solution calculating means 133 performs convergence calculations within the epoch according to the following procedures 1 to 4 in the VRS method to determine a float solution and a carrier phase bias that are unknown. The carrier phase bias to be determined herein is not an approximate integer but a real number.

[Procedure 1]

The float solution calculating means 133 obtains determination results on the primary satellite and the subordinate satellites by the positioning-based satellite selecting means 131.

[Procedure 2]

The float solution calculating means 133 calculates Equations (1) to (8) below to be used in the VRS method on the carrier phases and the pseudo ranges that are included in the pieces of observation data of the positioning-based satellites.

[Math 1]

$$\lambda \varphi_A^1 = r_A^1 + C(\delta t_A - \Delta t^1) - I_A^1 + T_A^1 + \lambda N_A^1 + \varepsilon_{\varphi A}[m] \quad (1)$$

This Equation (1) is an observation equation for pseudo wave phases on a reference station A and a primary satellite. $\varphi$ denotes a carrier phase [cycle], r denotes a geometric distance between the satellite and the reference station A [m], C denotes a light speed [m/s], $\delta t$ denotes a GNSS receiver built-in clock error [s], $\Delta t$ denotes a satellite clock error [s], I denotes an ionospheric delay error [m], T denotes a tropospheric delay error [m], $\lambda$ denotes a wavelength [m/cycle], N denotes a carrier phase bias, and $\omega$ denotes an observation error of the carrier phase [m].

"1" affixed to the upper right of, for example, $\varphi$ means n=1 indicating data of the primary satellite. In Equations to be described later, "n" affixed to the upper right of, for example, $\varphi$ means n=2, 3, . . . indicating pieces of data of the subordinate satellites. "A" affixed to the lower right of, for example, $\varphi$ indicates data of the reference station A. In Equations to be described later, "B" affixed to the lower right of, for example, $\varphi$ indicates data of a mobile station B. The position of the reference station A is a known number, whereas the position of the mobile station B is an unknown. In the following description, the reference station A and the mobile station B may be collectively referred to as receivers for convenience.

Equations (2) and (3) below are obtained by calculating a difference between the observation equation on the reference station A in Equation (1) and an observation equation on the mobile station B that is represented similarly to Equation (1), and using an approximation that an ionospheric delay error and a tropospheric delay error of the reference station A are identical to an ionospheric delay error and a tropospheric delay error of the mobile station B, respectively.

[Math 2]

$$\lambda \varphi_{BA}^1 = r_{BA}^1 + C\delta t_{BA} \lambda N_{BA}^1 + \varepsilon_{\varphi BA} \quad (2)$$

[Math 3]

$$\lambda \varphi_{BA}^n = r_{BA}^n + C\delta t_{BA} \lambda N_{BA}^n + \varepsilon_{\varphi BA} \quad (3)$$

"BA" affixed to the lower right of, for example, $\varphi$ indicates data obtained by subtracting data of the reference station A from data of the mobile station B. For example, $\varphi^1_{BA}$ indicates $\varphi^1_B - \varphi^1_A$. $\varphi$ to which "BA" is affixed is referred to as an observation value of a between-receivers single difference, and indicates a path difference that is a difference between a path between the reference station and a satellite and a path between the mobile station and the satellite. In other words, Equations (2) indicates a path difference that is a difference between a path between the reference station and the primary satellite (n=1) and a path between the mobile station and the primary satellite, and indicates a between-receivers single difference in carrier phase on the primary satellite (n=1). Equations (3) indicates path differences that are differences between paths between the reference station and subordinate satellites (n=2, 3, . . . ) and paths between the mobile station and the subordinate satellites, and indicates between-receivers single differences between carrier phases on the subordinate satellites (n=2, 3, . . . ). A difference between Equations (2) and (3) produces Equation (4) below.

[Math 4]

$$\lambda \varphi_{BA}^{1n} + r_A^{1n} = r_B^{1n} + \lambda(N_{BA}^1 - N_{BA}^n), \quad (4)$$

wherein $$r_B^n = \{(x_B - x^n)^2 + (y_B - y^n)^2 + (z_B - z^n)^2\}^{1/2},$$

$(x_B, y_B, z_B)$ indicates a position of a GNSS receiver of a mobile station, and $(x_n, y_n, x_n)$ indicates a position of a satellite n.

$(x_B, y_B, z_B)$ indicates a position of a GNSS receiver of a mobile station, and $(x_n, y_n, z_n)$ indicates a position of a satellite n.

"1n" affixed to the upper right of, for example, $\varphi$ indicates data on a difference between satellites obtained by subtracting data on the between-receivers single differences of the subordinate satellites (n=2, 3, . . . ) from data on the between-receivers single difference of the primary satellite (n=1). For example, $\varphi^{1n}_{BA}$ indicates $\varphi^1_{BA} - \varphi^n_{BA}$, and is referred to as an observation value of a double difference.

Figure 4:
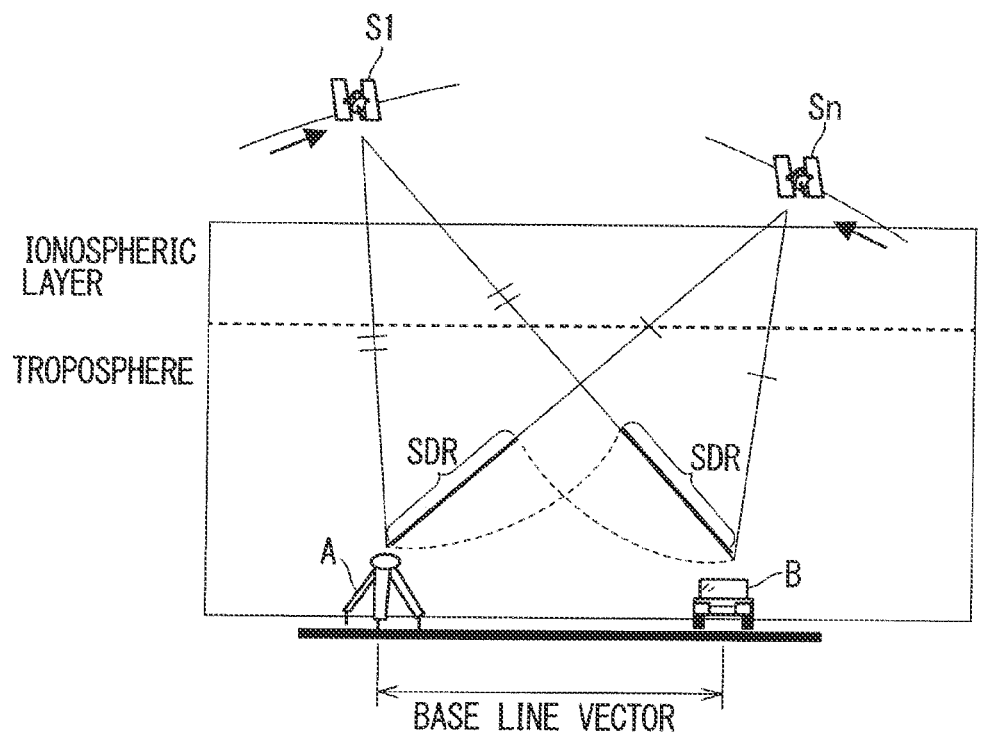
FIG. 4 schematically illustrates a single difference and a double difference of pieces of observation data according to Embodiment 1.

FIG. 4 schematically illustrates a single difference and a double difference of pieces of observation data to be used for positioning by the satellite positioning unit 13. The VRS method is a relative positioning method of determining a relative position of the mobile station B with respect to the reference station A whose coordinates are known as illustrated in FIG. 4. Thus, the float solution calculating means 133 determines, as between-receivers single differences SDR, a path difference that is a difference between a distance between each satellite and the reference station A and a distance between the satellite and the mobile station B. Then, the float solution calculating means 133 determines, as an observation value of a double difference, a difference between the between-receivers single difference SDR of a primary satellite S1 and the between-receivers single difference SDR of a subordinate satellite Sn.

Equations (1) to (4) above are equations on carrier phases. Equations (5) to (8) below on pseudo ranges hold, similarly to Equations (1) to (4) above.

[Math 5]
$$\rho_A^1 = r_A^1 + C(\delta t_A - \Delta t^1) + I_A^1 + T_A^1 + \varepsilon_{\rho A}[m] \quad (5)$$

[Math 6]
$$\rho_{BA}^1 = r_{BA}^1 + C\delta t_{BA} + \varepsilon_{\rho BA} \quad (6)$$

[Math 7]
$$\rho_{BA}^n = r_{BA}^n + C\delta t_{BA} + \varepsilon_{\rho BA} \quad (7)$$

[Math 8]
$$\rho_{BA}^{1n} + r_A^{1n} = r_B^{1n} \quad (8)$$

Equation (5) is an observation equation on a pseudo range between the reference station A and the primary satellite. ρ denotes a pseudo range [m]. $\varepsilon_\rho$ denotes an observation error of the pseudo range [m], and is also referred to as a pseudo range residual. Equations (6) and (7) are obtained by calculating a difference between the observation equation on the reference station A in Equation (5) and an observation equation on the mobile station B expressed similarly to Equation (5). A difference between Equations (6) and (7) produces Equation (8).

In Equation (4) on a carrier phase, the left side is a known number, and the right side is an unknown. Thus, Equation (4) holds as many as the subordinate satellites (i.e., n=2, 3, . . . ). Similarly, the left side is a known number, and the right side is an unknown in Equation (8) on a pseudo range. Thus, Equation (8) holds as many as the subordinate satellites (i.e., n=2, 3, . . . ).

[Procedure 3]

The float solution calculating means 133 compares a residual that is a difference between a single-difference observation value and a predicted value, with a difference between a delta range and a range rate to calculate a single-difference observation error. The float solution calculating means 133 can calculate the single-difference observation error by a calculation method described in, for example, Japanese Patent No. 4988028, Japanese Patent No. 5855249, or Japanese Patent No. 6482720.

[Procedure 4]

The float solution calculating means 133 performs convergence calculations using an extended Kalman filter indicated by Equations (9) to (13) below to determine a float solution including a subject vehicle position, an estimated value of a carrier phase bias, and an observation error covariance matrix.

[Math 9]
$$\left.\begin{array}{l} x_k(t) = [O^T, N_1^T, N_2^T]^T \\ O = [x_B(t), y_B(t), z_B(t)]^T \\ N_i = [N_{BAi}^1(t), N_{BAi}^2(t), \ldots, N_{BAi}^n(t)]^T \end{array}\right\} \quad (9)$$

[Math 10]
$$\left.\begin{array}{l} y_k(t) = [\Phi_1^T, \Phi_2^T, D_1^T, D_2^T]^T \\ \varphi_i = [\varphi_{BAi}^{12}(t), \varphi_{BAi}^{13}(t), \ldots, \varphi_{BAi}^{in}(t)]^T \\ D_i = [\rho_{BAi}^{12}(t), \rho_{BAi}^{13}(t), \ldots, \rho_{BAi}^{in}(t)]^T \end{array}\right\} \quad (10)$$

[Math 11]
$$\left.\begin{array}{l} x_k^- = Fx_k^+ \\ P_k^- = FP_k^+ F^T + Q_k \\ F = \mathrm{diag}(1,1,1,1,1,\ldots,1) \\ Q_k = \mathrm{diag}(\delta_{Bx}^2, \delta_{By}^2, \delta_{Bz}^2, 0, 0, \ldots, 0) \end{array}\right\} \quad (11)$$

[Math 12]
$$\left.\begin{array}{l} x_k^+ = x_x^- + K_k\{y_k - h_k(x_k^-)\} \\ P_k^+ = \{I - K_k H_k(x_k^-)\} P_k^- \\ K_k = P_k^- H_k(x_k^-)\{H_k(x_k^-) P_k^- H_k(x_k^-)^T + R_k\}^{-1} \\ h_k(x_k^-) = [h_{\Phi 1}(x_k^-)^T, h_{\Phi 2}(x_k^-)^T, h_{\rho 1}(x_k^-)^T, h_{\rho 2}(x_k^-)^T]^T \end{array}\right\} \quad (12)$$

[Math 13]
$$\left.\begin{array}{l} h_{\varphi i}(x_k^-)\begin{pmatrix} x_{BA}^{12}(t) + \lambda_i(N_{BAi}^1 - N_{BAi}^2) \\ x_{BA}^{13}(t) + \lambda_i(N_{BAi}^1 - N_{BAi}^3) \\ \vdots \\ x_{BA}^{1n}(t) + \lambda_i(N_{BAi}^1 - N_{BAi}^n) \end{pmatrix} \\ h_{\rho i}(x_k^-) = \begin{pmatrix} x_{BA}^{12}(t) \\ x_{BA}^{13}(t) \\ \vdots \\ x_{BA}^{1n}(t) \end{pmatrix} \\ H_k = \begin{pmatrix} -E & L_1 & 0 \\ -E & 0 & L_2 \\ -E & 0 & 0 \\ -E & 0 & 0 \end{pmatrix} \\ E = \begin{pmatrix} -\sin\lambda_B & \cos\lambda_B & 0 \\ -\sin\varphi_B\cos\lambda_B & -\sin\varphi_B\sin\lambda_B & \cos\varphi_B \\ \cos\varphi_B\cos\lambda_B & \cos\varphi_B\sin\lambda_B & \sin\varphi_B \end{pmatrix} \\ L_i\begin{pmatrix} \lambda_i & -\lambda_i & 0 & 0 \\ \lambda_i & 0 & -\lambda_i & 0 \\ \vdots & \vdots & \vdots & \vdots \\ \lambda_i & 0 & 0 & -\lambda_i \end{pmatrix} \\ R_v = \mathrm{diag}[R_{\varphi 1}, R_{\varphi 2}, R_{\rho 1}, R_{\rho 2}] \\ R_{\varphi i} = \mathrm{diag}\{(\sigma_{\varepsilon\varphi Ai}^1)^2 + (\sigma_{\varepsilon\varphi Bi}^1)^2, (\sigma_{\varepsilon\varphi Ai}^2)^2 + (\sigma_{\varepsilon\varphi Bi}^2)^2, \ldots, \\ \qquad (\sigma_{\varepsilon\varphi Ai}^n)^2 + (\sigma_{\varepsilon\varphi Bi}^n)^2\} \\ R_{\rho i} = \mathrm{diag}\{(\sigma_{\varepsilon\rho Ai}^1)^2 + (\sigma_{\varepsilon\rho Bi}^1)^2, (\sigma_{\varepsilon\rho Ai}^2)^2 + (\sigma_{\varepsilon\rho Bi}^2)^2, \ldots, \\ \qquad (\sigma_{\varepsilon\rho Ai}^n)^2 + (\sigma_{\varepsilon\rho Bi}^n)^2\} \end{array}\right\} \quad (13)$$

Equation (9) indicates an unknown of a float solution corresponding to the right sides of Equations (4) and (8), and is equivalent to a state of the extended Kalman filter. In Equation (9), i=1 indicates an L1 signal, and i=2 indicates an L2C signal. Equation (10) indicates a known number of a float solution corresponding to the left sides of Equations (4) and (8), and is equivalent to an observable of the extended Kalman filter.

Equation (11) is equivalent to a propagation step (also referred to as a prediction step) of the extended Kalman filter, and is an equation for predicting a state from a certain time to the next time by a linear approximation. The single-difference observation error determined in the procedure 3 is applied as an element of $Q_k$. Equation (12) is equivalent to an update step (also referred to as a filtering step) of the extended Kalman filter, and is an equation for updating a current state by comparison between a predicted state and the observable. Equation (13) is an equation for expressing, for example, the observation error covariance matrix indicated by Equation (12).

The float solution calculating means 133 is configured to determine a float solution per epoch when predefined computation conditions (e.g., conditions in Steps S202 and S205 in FIG. 2) are satisfied, irrespective of whether the ambiguity search and test means 134 determines an integer ambiguity.

In Step S207, the ambiguity search and test means 134 determines whether searching for an integer ambiguity, that is, an ambiguity of the positioning-based satellites is necessary. The ambiguity search and test means 134 according to Embodiment 1 determines that searching for an integer ambiguity is necessary, when any one of (1) and (2) holds: (1) the L1 and the L2C to be used by the positioning-based satellites are subject to cycle slip; and (2) the integer ambiguity of the L1 and the L2C to be used by the positioning-based satellites has not been calculated yet. When the ambiguity search and test means 134 determines that searching for an integer ambiguity is necessary, the processes proceed to Step S208. When the ambiguity search and test means 134 determines that searching for an integer ambiguity is not necessary, the processes proceed to Step S210.

In Step S208, the ambiguity search and test means 134 searches for candidate points for an integer ambiguity of carrier phases, that is, an ambiguity, based on the carrier phase bias represented by the real number of the float solution.

Here, simply rounding the carrier phase bias represented by the real number to determine an integer ambiguity produces a wrong value due to a strong correlation indicated in the search space, and the positioning accuracy decreases. Thus, the ambiguity search and test means 134 searches for an integer ambiguity according to the following procedures 1 to 4 in the LAMBDA method.

[Procedure 1]

The ambiguity search and test means 134 decorrelates a bias as much as possible using the carrier phase bias represented by the real number of the float solution and a covariance matrix. The ambiguity search and test means 134 decorrelates the bias, for example, by diagonalizing an error covariance matrix of the extended Kalman filter using an orthogonal matrix as much as possible.

[Procedure 2]

The ambiguity search and test means 134 calculates a z-transform matrix by repeating $LDL^T$ decomposition and $UDU^T$ decomposition on the result obtained in the procedure 1.

[Procedure 3]

The ambiguity search and test means 134 defines a search space (e.g., an ellipsoid) of an integer ambiguity based on the result obtained in the procedure 2, and searches for a plurality of candidate points for the integer ambiguity included in the search space.

[Procedure 4]

The ambiguity search and test means 134 defines a narrow new search space based on the plurality of candidate points obtained in the procedure 3, and searches for a plurality of candidate points for an integer ambiguity that are included in the search space. The ambiguity search and test means 134 repeats the procedure 4 until the number of the candidate points for an integer ambiguity is two. It may take the processing time as long as a plurality of epochs until the number of the candidate points for an integer ambiguity is two.

In Step S209, the ambiguity search and test means 134 tests the candidate points for an integer ambiguity that have been obtained through the search in Step S208. The ambiguity search and test means 134 according to Embodiment 1 calculates a ratio of a sum of squares of second candidate residuals to a sum of squares of first candidate residuals. The numerator of this ratio is the second candidate, and the denominator is the first candidate. When the ratio is higher than or equal to a threshold, the ambiguity search and test means 134 determines that the test has passed and sets the first candidate to an integer ambiguity. Then, the processes proceed to Step S210. When the ratio is lower than the threshold, the ambiguity search and test means 134 determines that the test has failed, and the processes proceed to Step S211.

In Step S210, the fix solution calculating means 135 performs convergence calculations within the epoch using the integer ambiguity that has passed the test, and the extended Kalman filter indicated by Equations (9) to (13) to determine a fix solution.

In Step S211, the satellite positioning error predicting means 136 sets any one of the standalone positioning solution, the float solution, the fix solution, and a non-positioning solution indicating no existence of a solution in the latest epoch as a positioning solution status. A flag indicating the presence or absence of each positioning solution is assigned in bit to the positioning solution status. There may be a plurality of positioning solutions simultaneously. Alternatively, none of positioning solutions may exist (i.e., only non-positioning solutions may exist).

The satellite positioning error predicting means 136 predicts a positioning error of the float solution according to a first equation, based on a piece of observation data having a correlation with an actual error of the float solution and internal data on positioning computation. The first equation is an equation representing a relationship between the piece of observation data, the internal data, and the positioning error of the float solution. The internal data corresponds to information on at least one of, for example, the number of satellites only at a single frequency and satellites at two frequencies, a constellation of positioning-based satellites, observation statuses of the positioning-based satellites, a subject vehicle speed, an elapsed time after receipt of the positioning augmentation data, an observation error of the extended Kalman filter, an error covariance of the extended Kalman filter, or a converged status of the float solution.

Figure 5:
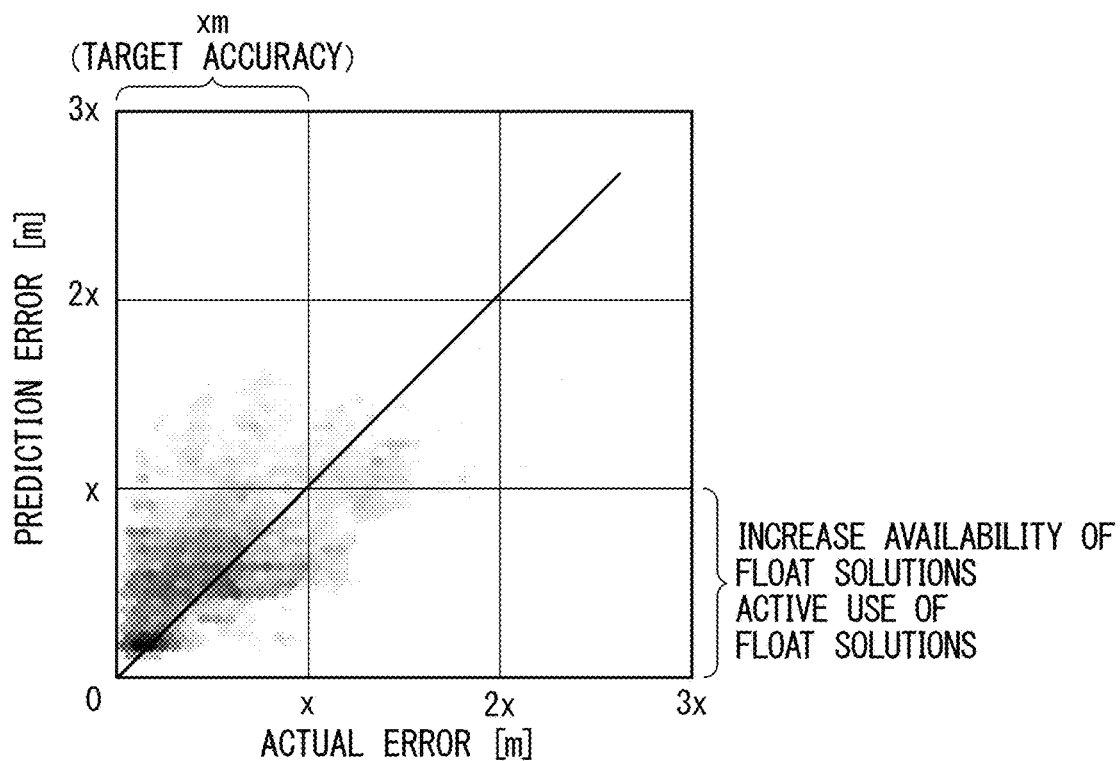
FIG. 5 illustrates an example relationship between a prediction error and an actual error of a float solution according to Embodiment 1.

The satellite positioning error predicting means 136 also learns the first equation through machine learning, based on the piece of observation data, the internal data, and the actual error of the float solution to be calculated by, for example, postprocessing using electronic reference points. The parameter of the fit equation may include not only the piece of observation data and the internal data but also the actual error of the float solution and residuals of the piece of observation data, or may be limited to the internal data. FIG. 5 illustrates an example relationship on the float solution between a prediction error that is an error predicted by the satellite positioning error predicting means 136 and the actual error. The straight line in FIG. 5 represents an ideal relationship between the prediction error and the actual error.

Similarly, the satellite positioning error predicting means 136 predicts a positioning error of the fix solution according to a second equation, based on a piece of observation data having a correlation with an actual error of the fix solution and internal data on positioning computation. The second equation is an equation representing a relationship between the piece of observation data, the internal data, and the positioning error of the fix solution. This internal data may be identical to the aforementioned internal data.

Figure 6:
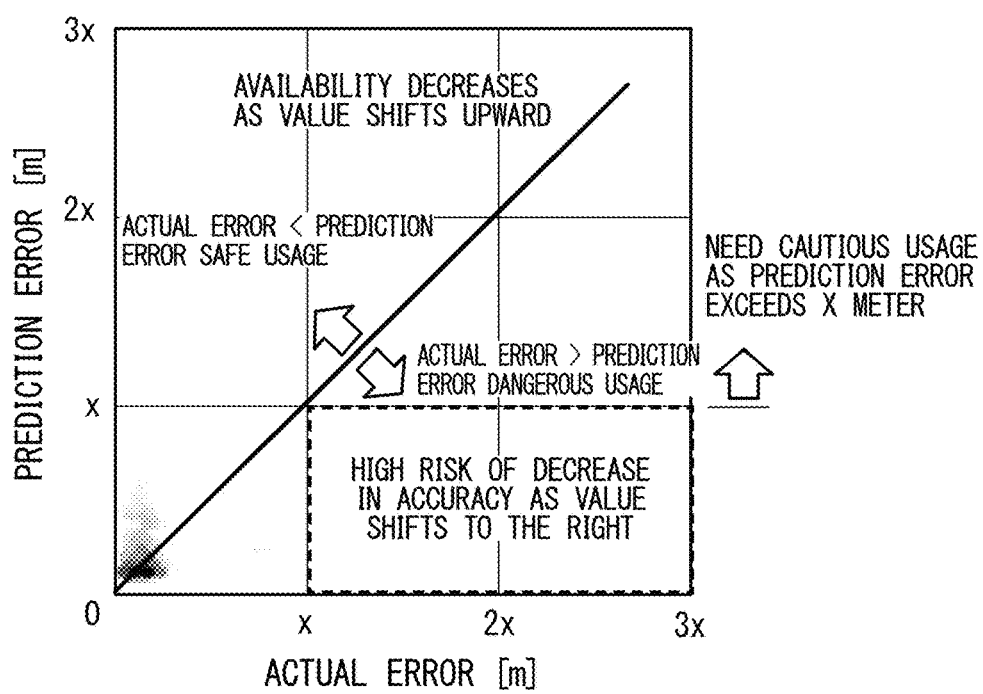
FIG. 6 illustrates an example relationship between a prediction error and an actual error of a fix solution according to Embodiment 1.

The satellite positioning error predicting means 136 also learns the second equation through machine learning, based on the piece of observation data, the internal data, and the actual error of the fix solution to be calculated by, for example, postprocessing using electronic reference points. The parameter of the second equation may include not only the piece of observation data and the internal data but also the actual error of the fix solution and residuals of the piece of observation data, or may be limited to the internal data. FIG. 6 illustrates an example relationship on the fix solution between a prediction error that is an error predicted by the satellite positioning error predicting means 136 and the actual error. The straight line in FIG. 6 represents an ideal relationship between the prediction error and the actual error.

As described above, the satellite positioning error predicting means 136 determines a positioning error of each of the float solution and the fix solution per epoch in Step S211. After Step S211, the processes return to Step S201.

[Summary of Embodiment 1]

Since the positioning device according to Embodiment 1 can predict a positioning error of a positioning solution per epoch, the positioning device can appropriately detect mistaken fix solutions with which subject vehicle position accuracy obtained from a fix solution decreases to meter accuracy, and use a fix solution according to the intensity of doubt on decrease in the accuracy. Similarly, the positioning device can also select and use a float solution matching the desirable positioning accuracy, and increases the availability of float solutions and fix solutions. Consequently, the centimeter positioning is available in automotive applications.

The positioning device according to Embodiment 1 makes the primary selection of selecting preliminary positioning-based satellites whose communication quality is higher than or equal to the first threshold, based on at least one of the first pseudo-range residuals or the second pseudo-range residuals. When the number of pieces of observation data of the preliminary positioning-based satellites exceeds a threshold, the positioning device makes the secondary selection of selecting positioning-based satellites whose communication quality is higher than or equal to a second threshold higher than the first threshold. This enables the positioning device having positioning signals at two frequencies to appropriately calculate a multipath effect on pseudo ranges by eliminating the influence of ionospheric delay errors included in pseudo range residuals. Since the positioning device can calculate the pseudo range residuals subject to the multipath effect as a result, the accuracy of float solutions and fix solutions is improved. Furthermore, the positioning device can appropriately calculate a multipath effect on pseudo ranges of a previous generation GPS satellite relying on only the L1 signal and a GNSS satellite (e.g., a Galileo satellite) that does not use a positioning augmentation signal other than the GPS satellite. Since the positioning device can calculate the pseudo range residuals subject to the multipath effect as a result, positioning rates and the availability of float solutions and fix solutions in a place with a smaller number of positioning-based satellites are increased. Even under an open sky environment where positioning signals of high quality which are more than or equal to pieces of observation data necessary for attaining the accuracy can be received, the positioning device can more preferentially select pseudo ranges of high quality up to the upper limit of the number of the pieces of observation data. Thus, a usage rate and an operation time of a CPU to be used for positioning can be reduced.

The positioning device according to Embodiment 1 learns the first equation representing a relationship between a positioning error of a float solution and information on at least one of a constellation of positioning-based satellites, an elapsed time after receipt of the positioning augmentation data, observation statuses of the positioning-based satellites, or a converged status of the float solution, and learns the second equation representing a relationship between a positioning error of a fix solution and the information. Since this can prevent a prediction error from becoming too smaller or too larger than the actual error, the reliability of the prediction error can be enhanced, and the availability of float solutions and fix solutions can be increased.

[Modification 1]

In Step S203 of FIG. 2, the positioning-based satellite selecting means 131 determines the first pseudo-range residuals based on positioning signals being received, and determines the second pseudo-range residuals when having both of the L1 signal and the L2C signal at two frequencies. However, the positioning-based satellite selecting means 131 may determine pseudo-range residuals in calculation methods other than the aforementioned method.

[Modification 2]

In Step S211 of FIG. 2, the satellite positioning error predicting means 136 learns the first equation and the second equation. Step S211 is not limited to this. For example, the satellite positioning error predicting means 136 may receive a positioning result such as a fix solution determined by an external positioning device that can measure an actual error in real time with high accuracy (e.g., centimeter accuracy), and adjust the first equation and the second equation, based on data for calculating a prediction error including a piece of observation data having a correlation with an actual error and internal data on positioning computation, and the received positioning result. Since this configuration can calculate a prediction error in better agreement with an actual error in a car-mounted environment on, for example, a road through which the subject vehicle travels, the reliability of the prediction error can be enhanced.

[Modification 3]

In Step S211 of FIG. 2, the satellite positioning error predicting means 136 predicts a positioning error of each of the float solution and the fix solution, based on the piece of observation data having a correlation with an actual error and the internal data on positioning computation according to the first equation and the second equation. Step S211 is not limited to this.

For example, in the car-mounted environments where satellite radio reception environments may greatly vary due to the influence of structures around roads or trees, etc., predicting a positioning error identical in level to an actual error is difficult through the aforementioned prediction. Thus, the satellite positioning error predicting means 136 may adjust the first equation and the second equation so that the positioning error is larger than the actual error to prioritize the safety under these environments. Since unnecessarily making the positioning error larger than the actual error reduces the availability of fix solutions, the satellite positioning error predicting means 136 preferably adjusts the first equation and the second equation so that the positioning error is not unnecessarily too larger than the actual error.

Furthermore, data and a calculation method to be used for the first equation and the second equation are not limited to those described above. Since a range of the actual error of the float solution in FIG. 5 is particularly wider than that of the actual error of the fix solution in FIG. 6, adjusting the first equation so that the prediction error of the float solution is appropriate can determine a target accuracy of the positioning device in consideration of both of the availability and the safety.

[Modification 4]

Figure 7A:
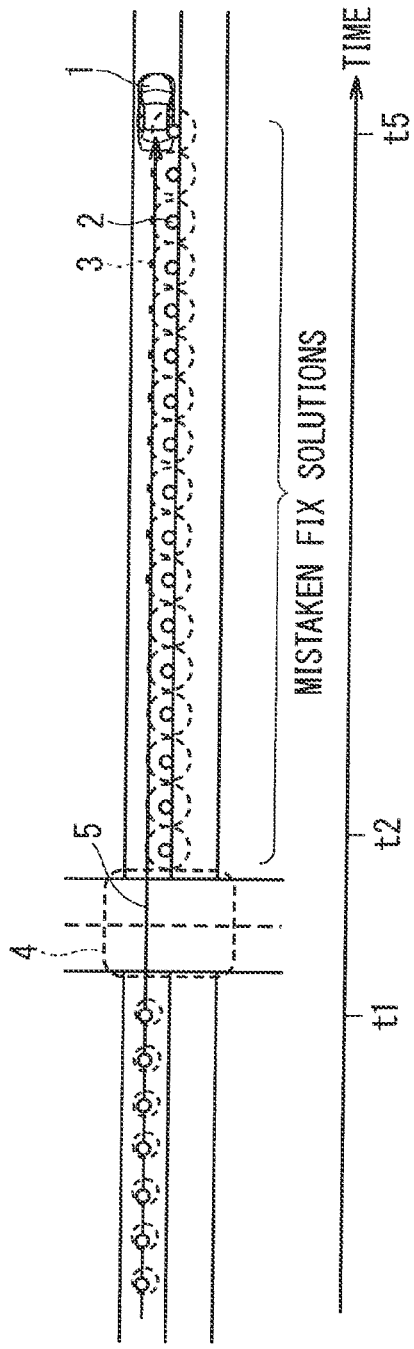
FIGS. 7A and 7B illustrates re-searching ambiguity according to Modification 4 of Embodiment 1.
Figure 7B:
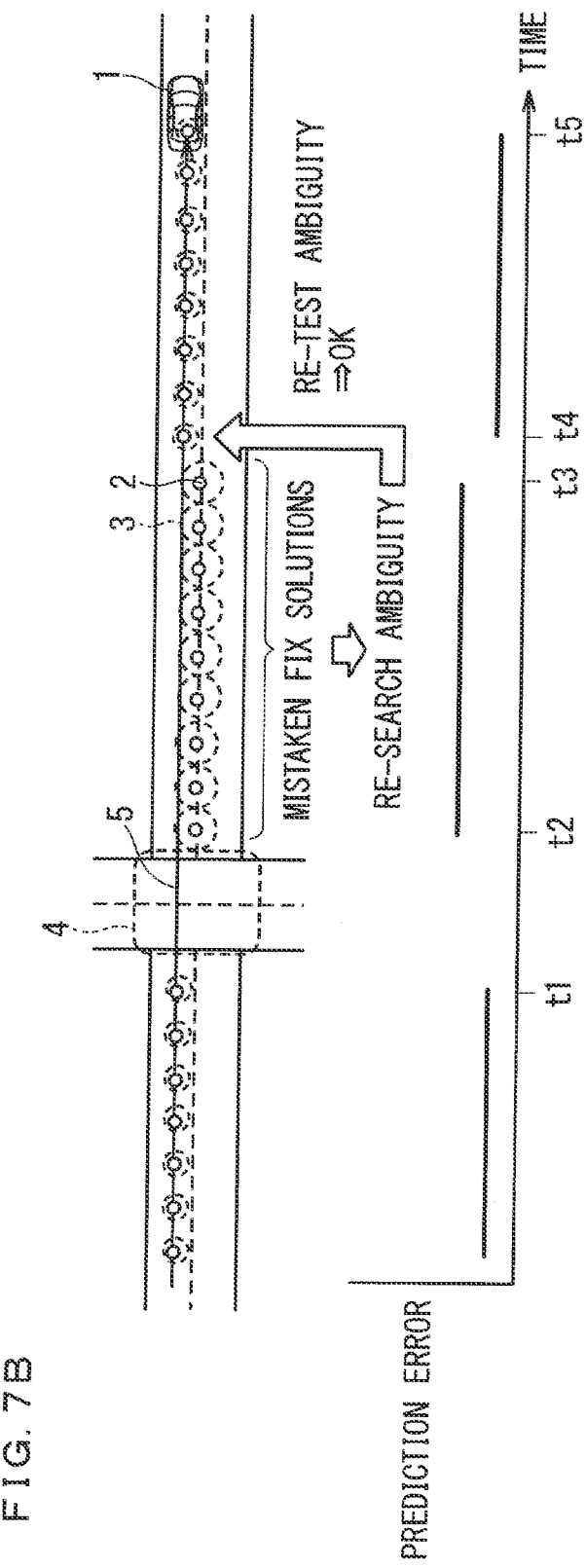

FIGS. 7A and 7B illustrates re-searching an ambiguity (i.e., an integer ambiguity) when mistaken fix solutions are generated. FIGS. 7A and 7B illustrates a subject vehicle 1, fix solutions 2, prediction errors 3 of the fix solutions, and a traveling route 5 of the subject vehicle 1. FIGS. 7A and 7B illustrates that the larger the circle of the prediction error 3 of the fix solution is, the larger the prediction error is. When the subject vehicle 1 traveling through a low-grade road in an elevated highway passes through an intersection 4 with the elevated highway, the prediction errors 3 of the fix solutions increase.

Here, when determining that the integer ambiguity has passed the test, the ambiguity search and test means 134 according to Embodiment 1 does not determine a new integer ambiguity during a non-applicable period. The non-applicable period is a period from when an integer ambiguity has been determined to when radio waves of positioning-based satellites are interrupted or shielded or a period from when an integer ambiguity has been determined to when combinations of positioning-based satellites are updated. Thus, even when mistaken fix solutions are generated as illustrated in FIG. 7A, the ambiguity search and test means 134 does not determine a new integer ambiguity.

Thus, the ambiguity search and test means 134 may determine an integer ambiguity during the non-applicable period, when a positioning error of a fix solution is larger than a first threshold and pseudo range residuals of positioning-based satellites are smaller than a second threshold. Such a configuration can return the fix solution to a normal solution earlier and more reliably as illustrated in FIG. 7B.

Embodiment 2

A positioning device according to Embodiment 2 applies a carrier phase positioning method such as a PPP-RTK method in which only a mobile station can perform RTK positioning for surveying without using pieces of observation data of a reference station, instead of the carrier phase positioning method according to Embodiment 1. In Japan, a positioning augmentation service for PPP-RTK positioning referred to as "centimeter-level augmentation service (CLAS)" is provided for free as a national infrastructure from the government.

In the PPP-RTK method, satellite positioning errors are classified into satellite orbit error, satellite clock error, satellite signal ambiguity error, ionospheric delay error, tropospheric delay error, receiver clock error, and multipath error. Furthermore, the PPP-RTK method represents global errors of satellite positioning (e.g., satellite orbit error, satellite clock error, and satellite signal ambiguity error) more correctly. Quasi-zenith satellites that are positioning augmentation satellites distribute local errors (e.g., ionospheric delay error and tropospheric delay error) as positioning augmentation signals of positioning augmentation data. This PPP-RTK method allows high accurate positioning with centimeter accuracy under an open sky environment.

The quasi-zenith satellites have constraints in data communication capacity. The positioning augmentation data is compressed into data of an approximately 60 km square by decimating an GNSS-based control station network (an approximately 20 km square) of the Geographical Survey institute. The positioning augmentation data is decimated based on dynamics using global errors as common denominators to attain centimeter accuracy. The order of local errors is reduced by modeling the spatial distribution, resulting in the compressed data.

Figure 8:
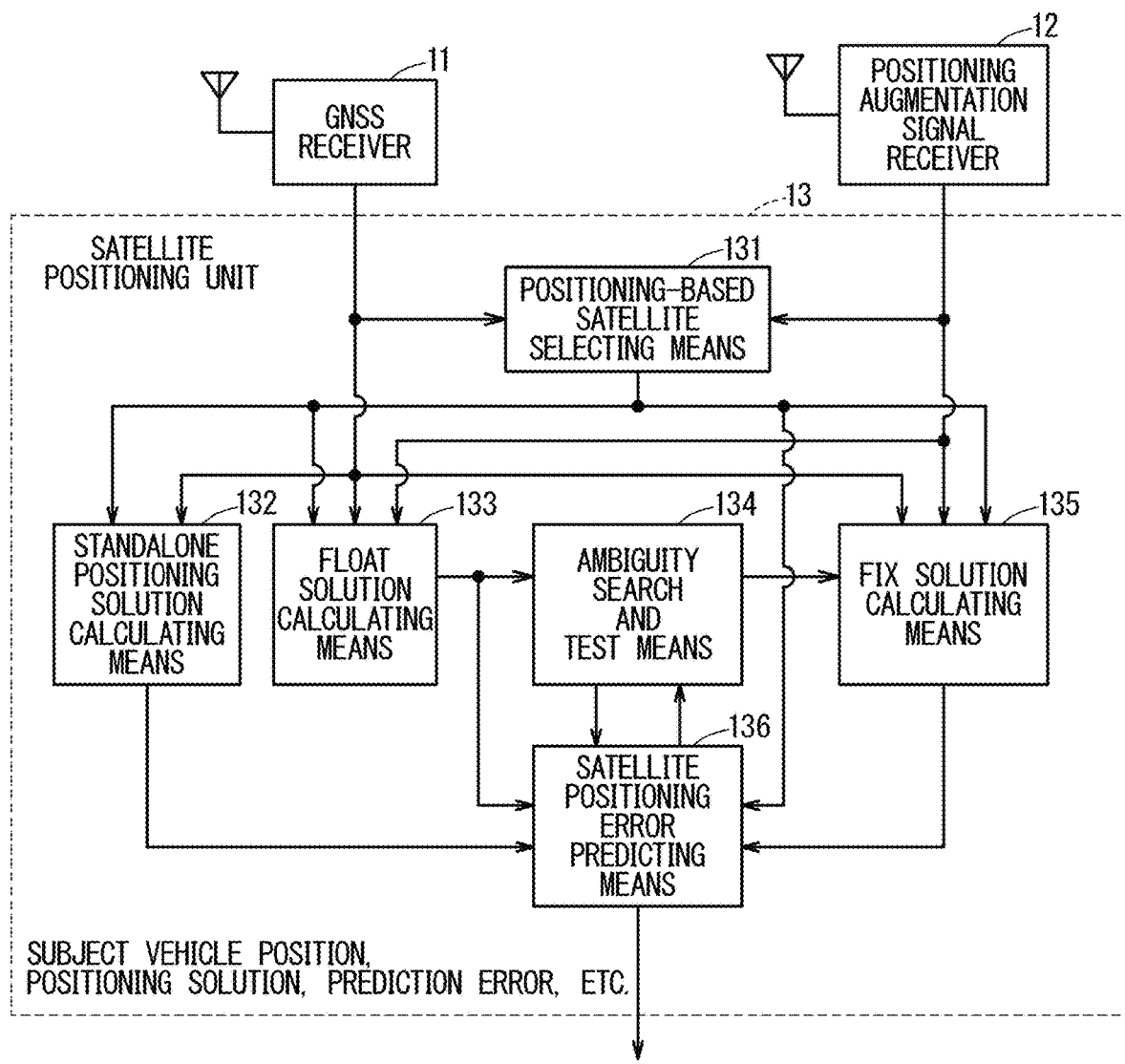
FIG. 8 is a block diagram illustrating a configuration of a positioning device according to Embodiment 2.

FIG. 8 is a block diagram illustrating a configuration of the positioning device with the CLAS according to Embodiment 2. Among constituent elements according to Embodiment 2, the constituent elements identical or similar to those described above will be denoted by identical or similar reference numerals, and the different constituent elements will be hereinafter mainly described.

Operations of the positioning augmentation signal receiver 12, the float solution calculating means 133, and the fix solution calculating means 135 in Embodiment 2 are different from those in Embodiment 1.

The positioning augmentation signals in the PPP-RTK method are defined by a standard referred to as the Compact-SSR. The positioning augmentation data is split into predetermined messages, and broadcast from the quasi-zenith satellites as positioning augmentation signals such as L6 signals. The positioning augmentation data includes a satellite orbit error, a satellite clock error, a satellite code bias, a satellite phase bias, a satellite code phase-to-phase bias, STEC correction data, grid correction data, tropospheric correction data, and the relevant data all of which are causes of positioning errors.

The positioning augmentation signal receiver 12 receives positioning augmentation signals broadcast in a predetermined cycle from the quasi-zenith satellites that are positioning augmentation satellites to obtain the positioning augmentation data, unlike that according to Embodiment 1. The float solution calculating means 133 determines a float solution including a subject vehicle position and a carrier phase bias according to the carrier phase positioning method such as the PPP-RTK method, based on the time data, the pieces of observation data, and the piece of orbit data of the positioning-based satellites and the positioning augmentation data of the CLAS. The fix solution calculating means 135 determines a fix solution based on the pieces of observation data, and the piece of orbit data of the positioning-based satellites, the positioning augmentation data of the CLAS, and the integer ambiguity according to the carrier phase positioning method such as the PPP-RTK method.

[Operations]

Next, the operations of the positioning device according to Embodiment 2 will be described. The operations of the positioning device according to Embodiment 2 differ from those according to Embodiment 1 in the process of Step S206 of FIG. 2 to be performed by the float solution calculating means 133 and the process in Step S210 to be performed by the fix solution calculating means 135.

The float solution calculating means 133 and the fix solution calculating means 135 calculate basic observation equations using the positioning augmentation data and an error model of the CLAS, according to the PPP-RTK method using pieces of observation data of the mobile station, instead of the pieces of the observation data of a reference station. The basic observation equations are to determine between-receivers single differences between phases and between pseudo ranges on a primary satellite and subordinate satellites, and are expressed by Equations (14) and (15).

[Math 14]

$$\lambda\varphi_B^1 = r_B^1 + C\delta t_B - C\Delta t^1 - I_B^1 + T_B^1 + \lambda N_B^1 + \quad (14)$$
$$\varepsilon_{\varphi B} - \{\lambda\varphi_A^1 + r_A^1 + C(\delta t_A - \Delta t^1) - I_A^1 + T_A^1 + \lambda N_A^1 + \varepsilon_{\varphi A}\}$$

[Math 15]

$$\rho_B^1 = r_B^1 + C\delta t_B - C\Delta t^1 + I_B^1 + T_B^1 + \quad (15)$$
$$\varepsilon_{\rho B} - \{-\rho_A^1 = r_A^1 + C(\delta t_A - \Delta t^1) + I_A^1 + T_A^1 + \varepsilon_{\rho A}\}$$

Equation (14) and Equation (15) produce a between-receivers phase single difference and a between-receivers pseudo range single difference, respectively, without using the pieces of observation data of the reference station. The equations for the between-receivers single differences to be actually used are designed with reference to the user interface and sample codes (CLAS LIB) of the CLAS that are open to the public to spread the use of the CLAS, although the detailed description is omitted. Between-satellites double differences between phases and between pseudo ranges on a primary satellite and subordinate satellites are differences of between-receivers single differences on the primary satellite and the subordinate satellites, and are identical to those in the VRS method and the RTK method that are described in Embodiment 1.

[Summary of Embodiment 2]

Embodiment 2 as described above can produce the same advantages as those according to Embodiment 1. Embodiment 2 can determine a float solution and a fix solution by receiving the positioning augmentation signals such as the L6 signals from the quasi-zenith satellites that are positioning augmentation satellites. Thus, running costs including communication expenses can be reduced. The domestic coverage of the quasi-zenith satellites are wide, and access points need not be switched during traveling across wide areas. Thus, a positioning device can be designed without taking the access points into account.

[Modification]

Figure 9:
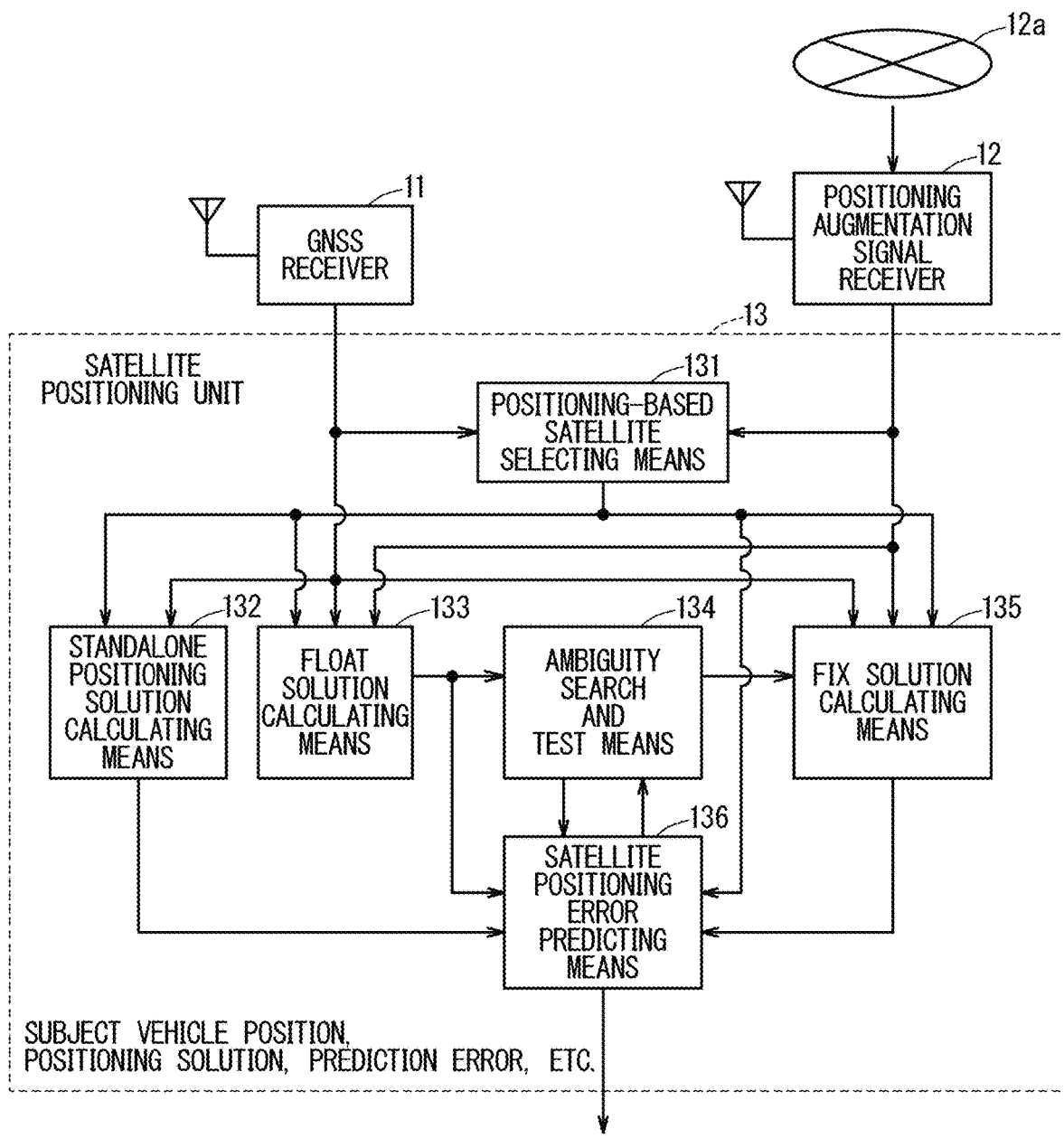
FIG. 9 is a block diagram illustrating a configuration of a positioning device according to a modification of Embodiment 2.

The positioning augmentation signal receiver 12 according to Embodiment 2 receives positioning augmentation signals from positioning augmentation satellites, which is not limited to this. As illustrated in FIG. 9, for example, the positioning augmentation signal receiver 12 may be connected to a positioning augmentation signal distribution provider server (not illustrated) through the internet connection 12a. The positioning augmentation signal receiver 12 authenticates a predetermined access point in the connecting. Then, the positioning augmentation signal receiver 12 may receive, from the connected server, the positioning augmentation signals including positioning augmentation data in the PPP-RTK method in a predetermined cycle. Even such a configuration can produce the same advantages as those according to Embodiment 2.

Embodiment 3

Figure 10:
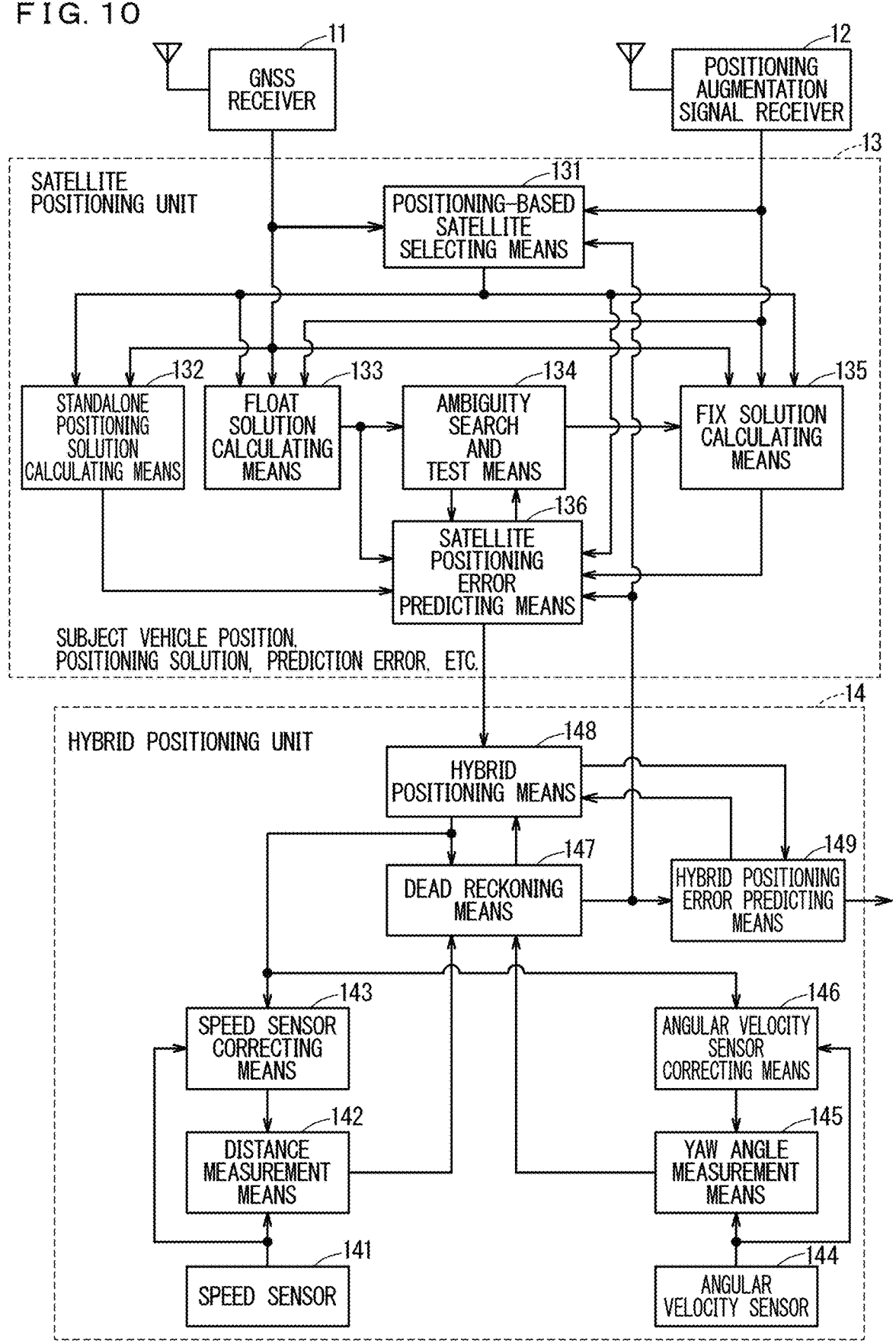
FIG. 10 is a block diagram illustrating a configuration of a positioning device according to Embodiment 3.

FIG. 10 is a block diagram illustrating a configuration of a positioning device according to Embodiment 3. Among constituent elements according to Embodiment 3, the constituent elements identical or similar to those described above will be denoted by identical or similar reference numerals, and the different constituent elements will be hereinafter mainly described.

The configuration according to Embodiment 3 is identical to a configuration obtained by adding a hybrid positioning unit 14 to that according to Embodiment 2.

The configuration of the satellite positioning unit 13 is almost identical to that according to Embodiment 2. When one of a float solution and a fix solution is determined, the satellite positioning error predicting means 136 according to Embodiment 3 predicts a positioning error of a standalone positioning solution, based on a positioning error of one of the float solution and the fix solution, and a difference between one of the float solution and the fix solution and the standalone positioning solution.

The hybrid positioning unit 14 includes a speed sensor 141, a distance measurement means 142, a speed sensor correcting means 143, an angular velocity sensor 144, a yaw angle measurement means 145, an angular velocity sensor correcting means 146, a dead reckoning means 147, a hybrid positioning means 148, and a hybrid positioning error predicting means 149.

The speed sensor 141 outputs a pulse signal corresponding to a moving distance of the subject vehicle. The distance measurement means 142 determines the moving distance and the speed from the number of pulses of the speed sensor 141 measured in each predetermined cycle. The speed sensor correcting means 143 determines a scale factor (an SF coefficient) representing a distance per pulse output by the speed sensor 141.

The angular velocity sensor 144 adds, to a 0-point output, a signal corresponding to an angular velocity (e.g., a yaw rate) with respect to a vertical direction of the subject vehicle as a sensor detection axis to output the 0-point output. The yaw angle measurement means 145 determines a yaw angle from the output of the angular velocity sensor 144 measured with predetermined timing. The angular velocity sensor correcting means 146 determines the 0-point output of the angular velocity sensor 144.

The dead reckoning means 147 updates, according to the dead reckoning, a subject vehicle position (may be hereinafter referred to as a "DR position"), a subject vehicle speed, and a subject vehicle azimuth (may be hereinafter referred to as a "DR azimuth"), using the moving distance determined by the distance measurement means 142 and the yaw angle determined by the yaw angle measurement means 145. Specifically, the dead reckoning means 147 estimates a dead reckoning solution including the DR position, using the sensors including the speed sensor 141 and the angular velocity sensor 144. The dead reckoning solution may include the subject vehicle speed and the DR azimuth.

The hybrid positioning means 148 obtains the standalone positioning solution determined by the standalone positioning solution calculating means 132 through the satellite positioning error predicting means 136, and corrects a positioning error of the standalone positioning solution in this epoch, using a positioning error (an offset and a predetermined time are valid) of the standalone positioning solution calculated when the fix solution or the float solution has been determined until a predefined epoch. Furthermore, the hybrid positioning means 148 determines an error of the dead reckoning solution, based on the dead reckoning solution estimated by the dead reckoning means 147 and the standalone positioning solution whose positioning error has been corrected. Then, the hybrid positioning means 148 performs hybrid positioning to determine a hybrid positioning solution by correcting the dead reckoning solution based on the determined error. The hybrid positioning solution may include not only the subject vehicle position of the dead reckoning which has been corrected based on the error of the dead reckoning solution, but also the subject vehicle speed and the subject vehicle azimuth that have been corrected based on the error of the dead reckoning solution.

The hybrid positioning error predicting means 149 predicts the errors of the subject vehicle position and the subject vehicle azimuth.

When one of a float solution and a fix solution is determined, the hybrid positioning means 148 determines the subject vehicle position, based on the hybrid positioning solution, a positioning error of the hybrid positioning solution determined by the hybrid positioning error predicting means 149, and one of the float solution and the fix solution used in predicting the positioning error of the hybrid positioning solution. The hybrid positioning error predicting means 149 then predicts the positioning error of the hybrid positioning solution, based on a positioning error of one of the float solution and the fix solution, and a difference between one of the solutions and the hybrid positioning solution.

[Operations]

Figure 11:
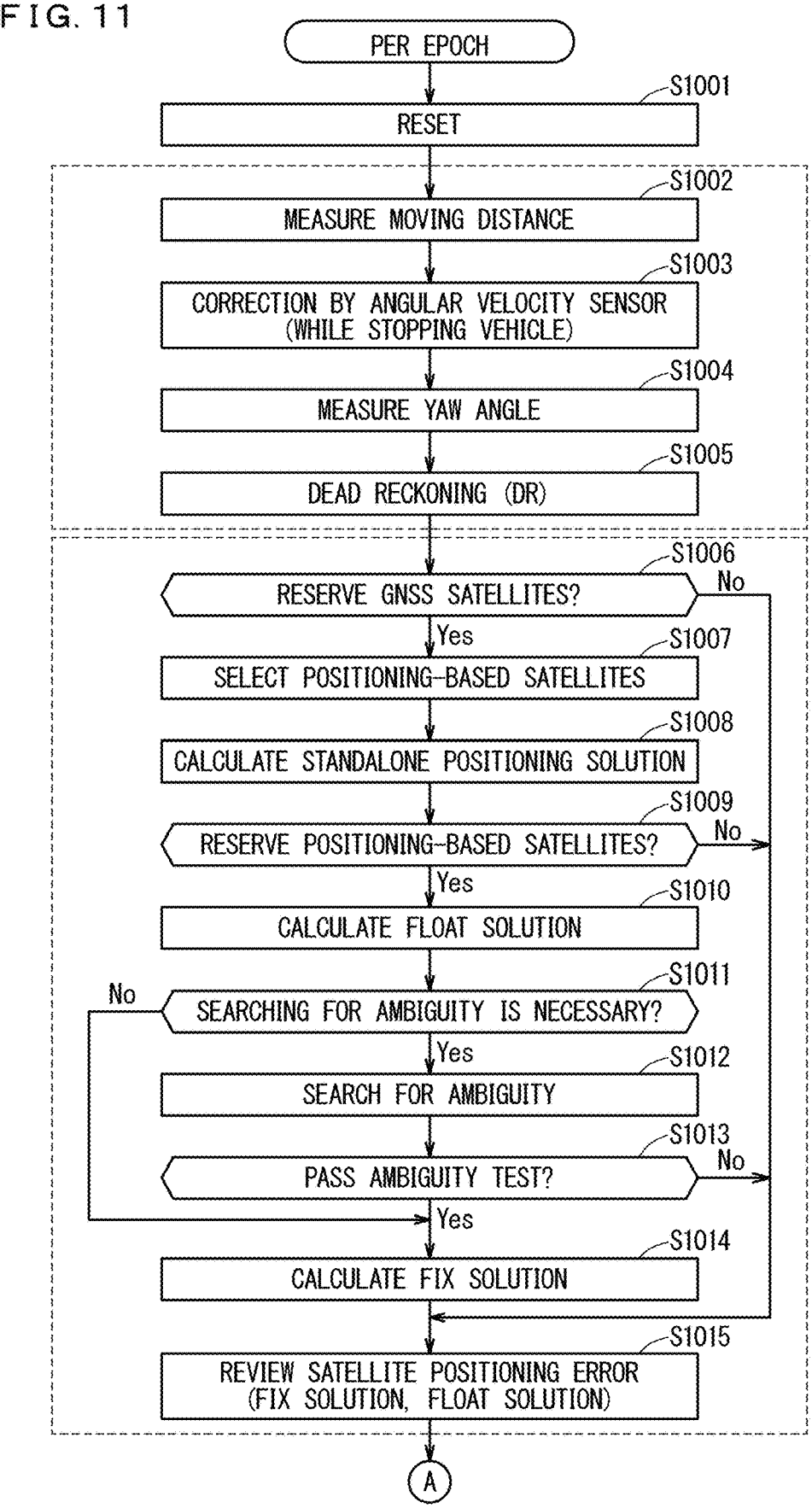
FIG. 11 is a flowchart illustrating operations of the positioning device according to Embodiment 3.
Figure 12:
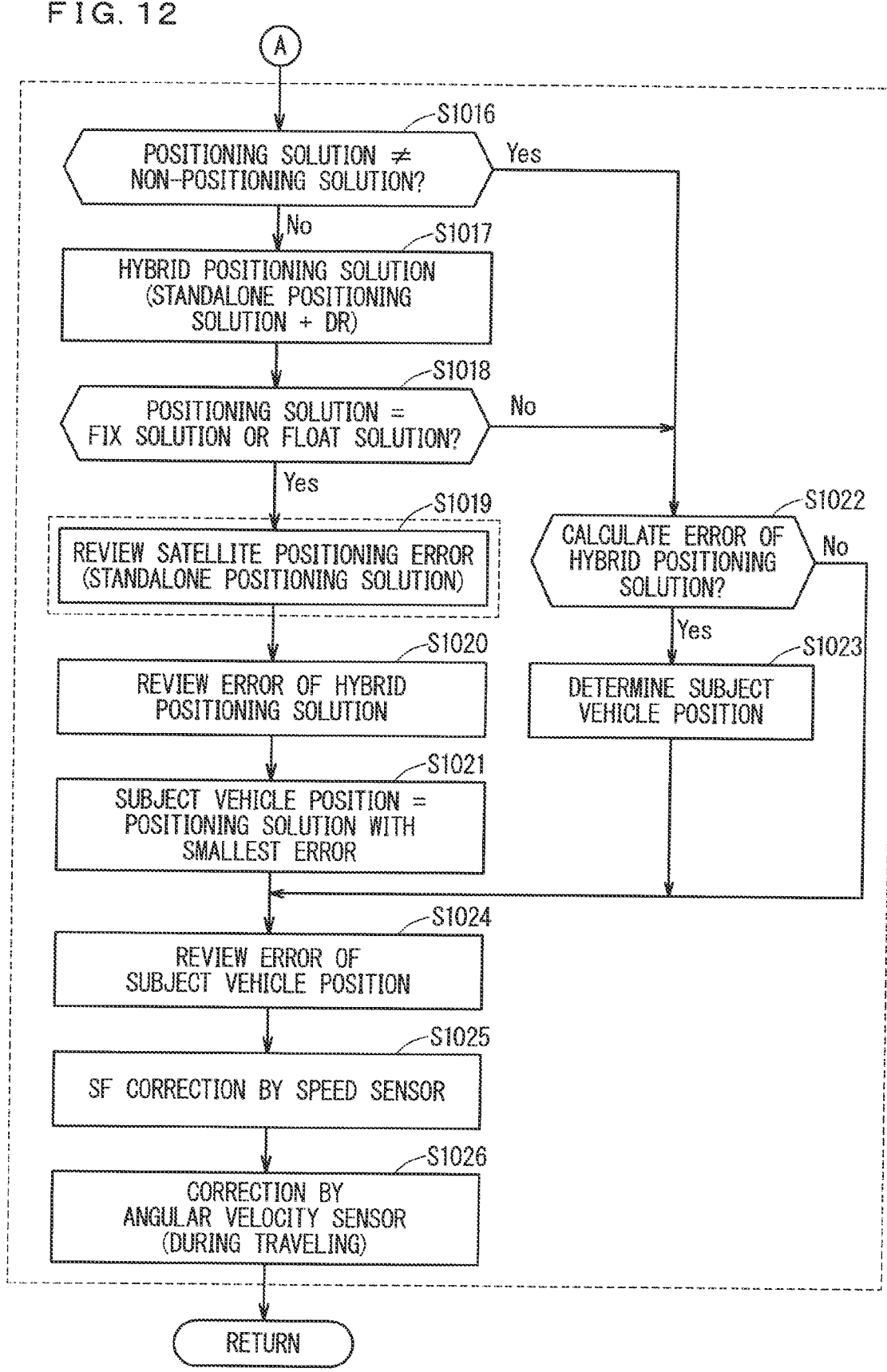
FIG. 12 is a flowchart illustrating operations of the positioning device according to Embodiment 3.

Next, operations of the positioning device according to Embodiment 3 will be described, FIGS. 11 and 12 are flowcharts illustrating the operations of the positioning device per epoch.

In Step S1001, processes of the positioning device are reset.

The hybrid positioning unit 14 performs processes from Step S1002 to Step S1005 in FIG. 11.

In Step S1002, the distance measurement means 142 multiplies the number of pulses of the speed sensor 141 measured in each predetermined cycle by the SF coefficient to determine a moving distance, and also determines a speed using a value obtained by passing the number of pulses for each predetermined cycle through a low-pass filter.

In Step S1003, the angular velocity sensor correcting means 146 determines to stop the vehicle based on the moving distance determined by the distance measurement means 142, determine an average of outputs of the angular velocity sensor 144 while stopping the vehicle, and corrects the average as an output bias of the angular velocity sensor 144. The process in Step S1003 can be performed using the processes described in, for example, Japanese Patent No. 3137784 and Japanese Patent No. 3751513.

In Step S1004, the yaw angle measurement means 145 determines a yaw angle obtaining by eliminating the output bias from the output of the angular velocity sensor 144 measured with the predetermined timing.

In Step S1005, the dead reckoning means 147 determines a moving vector in each predetermined cycle based on the moving distance and the yaw angle according to the dead reckoning, and updates the subject vehicle position by adding the determined moving vector to the subject vehicle position previously measured.

The satellite positioning unit 13 performs processes from Step S1006 to Step S1015. Since these processes are identical to those from Step S202 to Step S211 in FIG. 2, the description is omitted.

Among processes in FIG. 12, the satellite positioning unit 13 performs a process in Step S1019, and the hybrid positioning unit 14 performs processes from Step S1016 to Step S1026 except Step S1019.

In Step S1016, the hybrid positioning unit 14 determines whether a non-positioning solution has been set to a positioning solution status. When a non-positioning solution is not set, the processes proceed to Step S1017. When the non-positioning solution has been set, the processes proceed to Step S1022.

In Step S1017, the hybrid positioning means 148 performs hybrid positioning based on the dead reckoning solution, the standalone positioning solution, and the pseudo ranges to determine a hybrid positioning solution that matches a traveling trajectory with approximately 2-meter accuracy even with local radio shielding and multipath. The hybrid positioning means 148 can calculate the hybrid positioning solution by the hybrid positioning described in, for example, Japanese Patent No. 6482720, Japanese Patent No. 4988028, and Japanese Patent No. 5855249.

In Step S1018, the hybrid positioning unit 14 determines whether one of the float solution and the fix solution has been set to the positioning solution status. When one of the float solution and the fix solution has been set, the processes proceed to Step S1019. When none of the float solution and the fix solution has been set, that is, when a standalone positioning solution has been set, the processes proceed to Step S1022.

In Step S1019, the satellite positioning error predicting means 136 predicts a positioning error (also referred to as an offset) of a standalone positioning solution, based on a positioning error of a determined one of the float solution and the fix solution, and a difference between the determined solution and the standalone positioning solution.

Figure 13A:
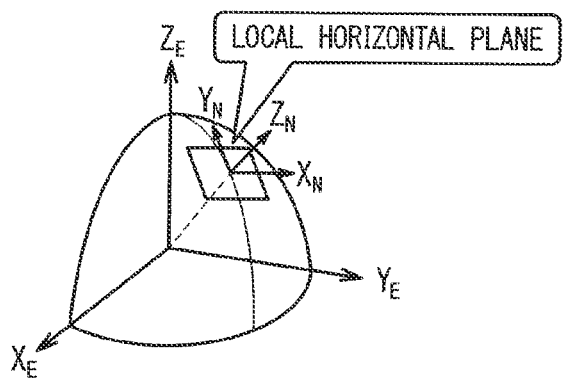
FIGS. 13A to 13C illustrates the operations of the positioning device according to Embodiment 3.
Figure 13B:
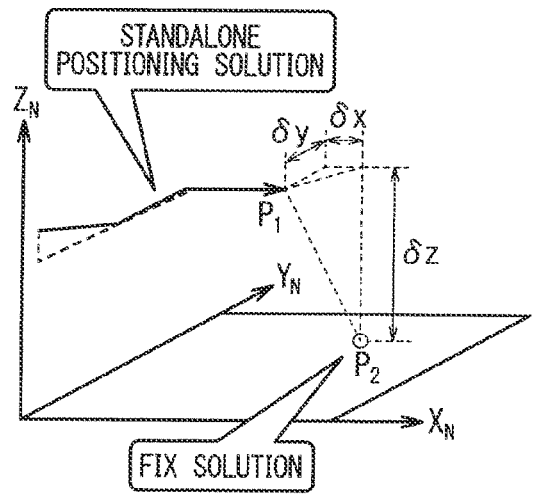
Figure 13C:
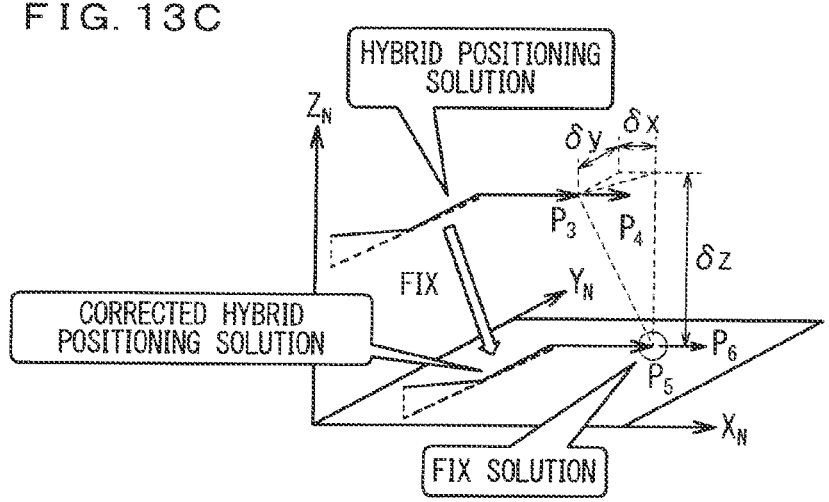

FIGS. 13A to 13C illustrates prediction of a positioning error of a standalone positioning solution. Although a determined solution is a fix solution in the following description, the same applies even when the determined solution is a float solution. FIG. 13A illustrates a spherical surface including a fix solution. FIG. 13B illustrates a local horizontal plane that is a part of the spherical surface, a point $P_1$ representing a standalone positioning solution, and a point $P_2$ representing a fix solution obtained in the same epoch as that of the standalone positioning solution.

The satellite positioning error predicting means 136 predicts a positioning error of a standalone positioning solution, based on a prediction error that is a positioning error with which the fix solution has been predicted, and a distance between two points ($\delta x$, $\delta y$, $\delta z$) that is a difference between the point $P_1$ representing the standalone positioning solution and the point $P_2$ representing the fix solution. The satellite positioning error predicting means 136 predicts, as the positioning error of the standalone positioning solution, for example, a value more approximating to the prediction error of the fix solution as the distance between two points is shorter. When the next hybrid positioning is performed, the error of the standalone positioning solution predicted herein is used for fine tuning a hybrid positioning solution with respect to the previous epoch.

In Step S1020 of FIG. 12, the hybrid positioning error predicting means 149 predicts a positioning error of the hybrid positioning solution based on the positioning error of a determined one of the float solution and the fix solution, and a difference between the determined solution and the hybrid positioning solution. The hybrid positioning error predicting means 149 predicts the positioning error of the hybrid positioning solution, in the same manner as predicting the positioning error of the standalone positioning solution described in Step S1019. The hybrid positioning error predicting means 149 predicts the error of the hybrid positioning solution, for example, based on the prediction error of the fix solution, and a distance between two points that is a difference between a point representing the hybrid positioning solution and a point representing the fix solution. The error of the hybrid positioning solution predicted herein is used not only for updating the error of the hybrid positioning solution in the next epoch but also for weighting in gain computation of an extended Kalman filter for the standalone positioning solution or pseudo ranges.

In Step S1021, the hybrid positioning means 148 selects one of the float solution, the fix solution, and the dead reckoning solution which is a solution with higher accuracy and matches a traveling trajectory more. For example, the hybrid positioning means 148 selects one of the float solution, the fix solution, and the dead reckoning solution that is a solution with the smallest error. Then, the processes proceed to Step S1024.

In Step S1022, the hybrid positioning unit 14 determines whether the hybrid positioning error predicting means 149 has predicted (calculated) the error of the hybrid positioning solution within the latest predetermined time or within the latest predetermined distance in Step S1020. When the hybrid positioning error predicting means 149 has predicted the positioning error of the hybrid positioning solution, the processes proceed to Step S1023 When the hybrid positioning error predicting means 149 does not predict the positioning error of the hybrid positioning solution, the processes proceed to Step S1024.

In Step S1023, the hybrid positioning means 148 determines the subject vehicle position, based on the hybrid positioning solution, the positioning error of the hybrid positioning solution determined by the hybrid positioning error predicting means 149, and one of the float solution and the fix solution used when calculating the positioning error of the hybrid positioning solution.

FIG. 13C illustrates the process in Step S1023. FIG. 13C illustrates a point $P_3$ representing a past hybrid positioning solution in satellite positioning synchronization which has been used in calculating the error of the hybrid positioning solution, a point $P_4$ representing the hybrid positioning solution at the latest time, and a point $P_5$ representing a fix solution used in calculating the error of the hybrid positioning solution. The hybrid positioning means 148 corrects the point $P_3$ of the hybrid positioning solution to the point $P_5$ representing the fix solution used in calculating the error of the hybrid positioning solution. In tandem with the correction, the hybrid positioning means 148 corrects the point $P_4$ representing the hybrid positioning solution at the latest time to a point $P_6$ in agreement with the former correction to determine the point $P_6$ as the subject vehicle position. Then, the processes proceed to Step S1024.

In Step S1024, the hybrid positioning error predicting means 149 continuously predicts an error of the subject vehicle position within the latest predetermined time or within the latest predetermined distance, irrespective of whether the subject vehicle position has been updated using one of the float solution, the fix solution, the dead reckoning solution, and the hybrid positioning solution. The hybrid positioning error predicting means 149 predicts the error of the subject vehicle position with respect to a positioning solution with high accuracy and a small prediction error.

In Step S1025, the speed sensor correcting means 143 corrects the SF coefficient of the pulse signal of the speed sensor. The speed sensor correcting means 143 can perform this correction using the correction method described in, for example, Japanese Patent No. 5606656.

In Step S1026, the angular velocity sensor correcting means 146 corrects a 0-point (also referred to as a bias) of the angular velocity sensor 144 based on a difference between an azimuth obtained by summing momentary yaw angles and a subject vehicle azimuth corrected by the hybrid positioning means 148, using a subject vehicle azimuth at a given time during the traveling of the subject vehicle as an initial value. The angular velocity sensor correcting means 146 can perform this correction using the correction method described in, for example, Japanese Patent No. 3321096 and Japanese Patent No. 3727489. After Step S1026, the processes return to Step S1001 in FIG. 11.

[Summary of Embodiment 3]

Unless radio waves are completely interrupted as in tunnels, typically, a standalone positioning solution is determined at a high positioning rate using dual-frequency multi-GNSS satellites. Thus, an appropriate standalone positioning solution with pseudo ranges with less multipath effect can be obtained. The accuracy of the standalone positioning solution is not high accuracy but accuracy of several meters. However, calculating a standalone positioning solution using a 3-dimensional velocity vector through the Doppler produces a trajectory closer to that of the dead reckoning except being under large multipath environments including buildings.

Here, when determining one of a float solution and a fix solution, the positioning device according to Embodiment 3 predicts a positioning error (an offset) of a standalone positioning solution whose trajectory shape matches a traveling trajectory of the subject vehicle, based a positioning error of a determined one of the float solution and the fix solution, and a difference between the standalone positioning solution and the determined solution. Consequently, the standalone positioning solution whose positioning error has been corrected approaches the float solution or the fix solution. Thus, the positioning rate, the accuracy, and the availability of the standalone positioning solution are increased.

Even when a float solution and a fix solution are not obtained in the next epoch, the standalone positioning solution is corrected using, in the next epoch, the positioning error determined in the previous epoch according to Embodiment 3. This maintains the high accuracy of the standalone positioning solution approaching the float solution or the fix solution, and increases the positioning rate, the accuracy, and the availability of the corrected standalone positioning solution. This further improves the accuracy of the hybrid positioning solution corrected using the standalone positioning solution corrected with this positioning error.

When determining one of a float solution and a fix solution, the positioning device according to Embodiment 3 predicts a positioning error of the hybrid positioning solution based on a positioning error of a determined one of the float solution and the fix solution, and a difference between the determined solution and the hybrid positioning solution. Since the hybrid positioning solution whose positioning error has been corrected approaches the float solution or the fix solution, the positioning rate, the accuracy, and the availability of the hybrid positioning solution are further improved.

[Modification 1]

A Doppler predicted value based on the dead reckoning may be fed back to the satellite positioning unit 13. While radio waves are being interrupted during a predetermined time, predicting a pseudo range can be continued. This enhances the reliability of rejecting (preventing) the use of the positioning of a pseudo range with low quality immediately after the radio waves are interrupted, and can further reduce mistaken fix solutions.

[Modification 2]

Figure 14:
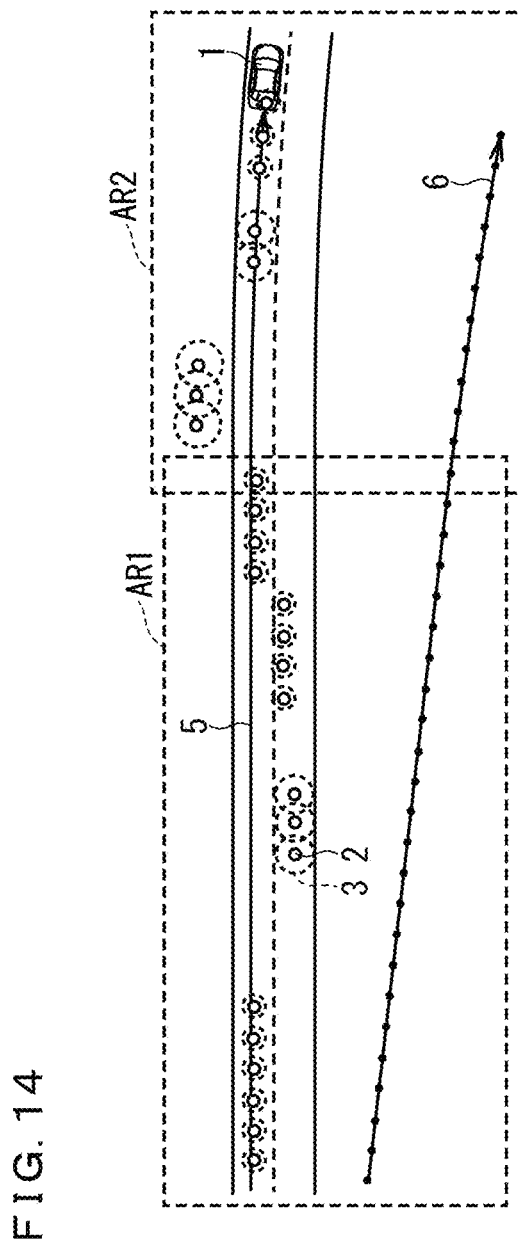
FIG. 14 illustrates operations of a positioning device according to Modification 2 of Embodiment 3.
Figure 15:
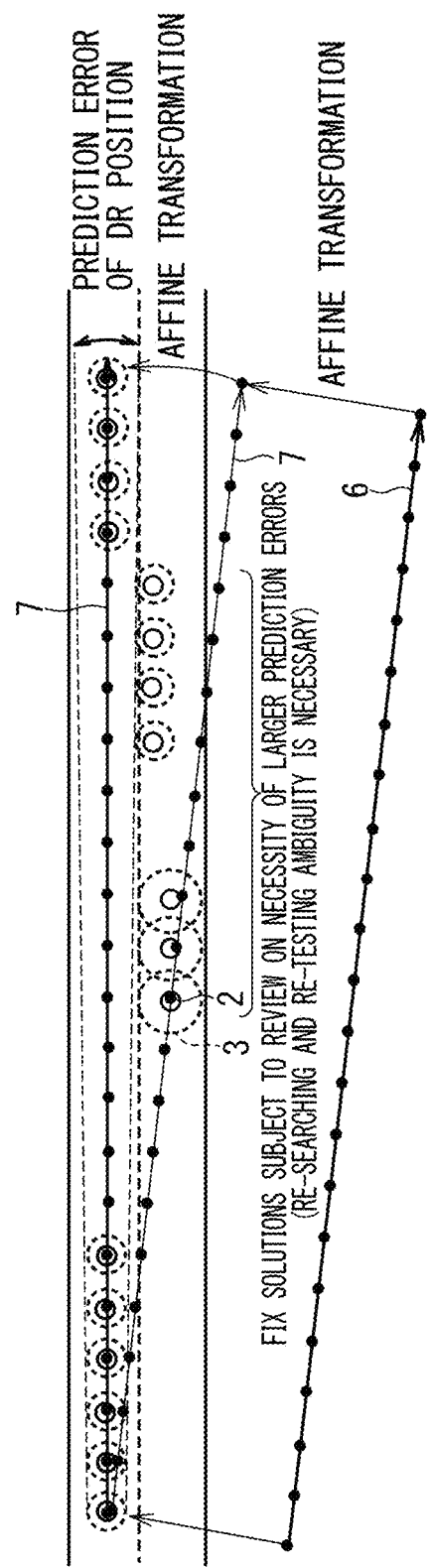
FIG. 15 illustrates the operations of the positioning device according to Modification 2 of Embodiment 3.
Figure 16:
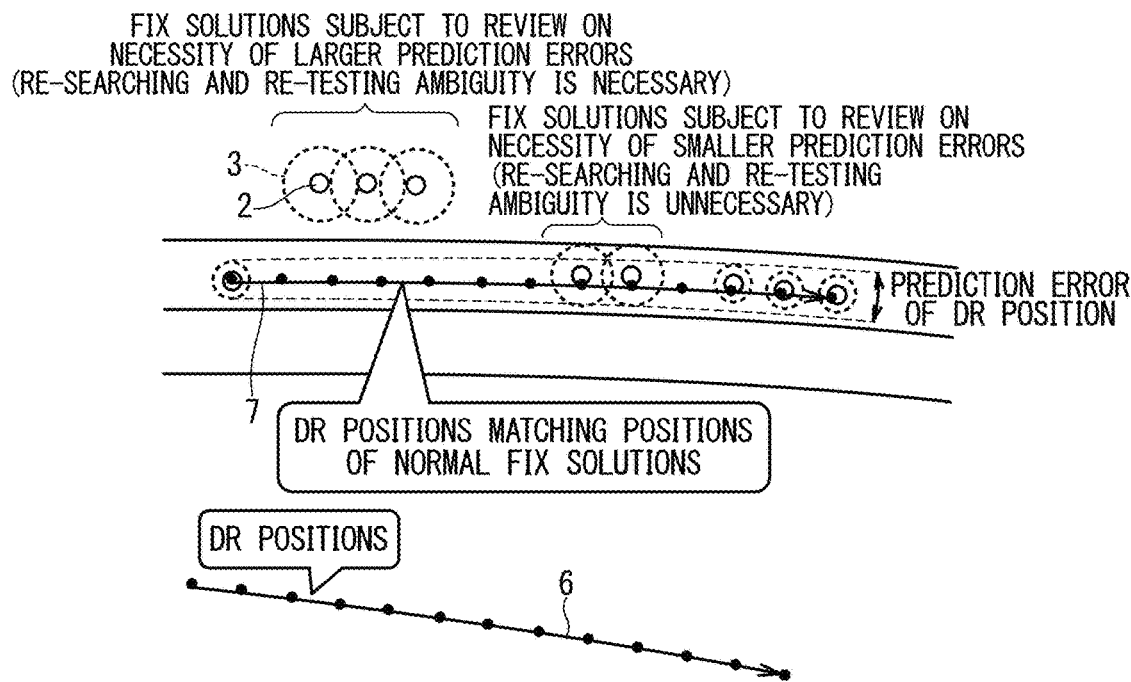
FIG. 16 illustrates the operations of the positioning device according to Modification 2 of Embodiment 3.

FIGS. 14 to 16 illustrate comparison of a trajectory of float solutions and fix solutions with a traveling trajectory of the dead reckoning for additionally determining prediction errors of the float solutions and the fix solutions. IG. 15 is an enlarged view of a region AR1 in FIG. 14. FIG. 16 is an enlarged view of a region AR2 in FIG. 14. Each of FIGS. 14 to 16 appropriately illustrates the subject vehicle 1, the fix solutions 2, the prediction errors 3, the traveling route 5, a trajectory 6 of subject vehicle positions (DR positions) based on the dead reckoning, and trajectories 7 obtained through affine transformations of the trajectory 6.

The positioning device may detect a state in which an actual error is sufficiently larger than a prediction error by comparing a trajectory of float solutions and fix solutions with a traveling trajectory of the dead reckoning. This configuration can cover a state in which the accuracy of prediction errors of float solutions decreases, and provide safer usage of the prediction errors. When the trajectory does not match the traveling trajectory, significantly reviewing prediction errors of the float solutions and the fix solutions enables more active use of the float solutions and the fix solutions that match the traveling trajectory.

[Modification 3]

A configuration for associating the latest fix solutions and the latest float solutions with less error, with the hybrid positioning solution obtained by correcting dead reckoning or a prediction error is described above, which is not limited to this. For example, connection by the dead reckoning so that a vehicle passes through the latest fix solutions and float solutions at a plurality of points with less error can make an azimuth of the dead reckoning more accurate. This can maintain the high accuracy of the azimuth for a long time, and increases its availability in the car-mounted environments.

Embodiment 4

Figure 17:
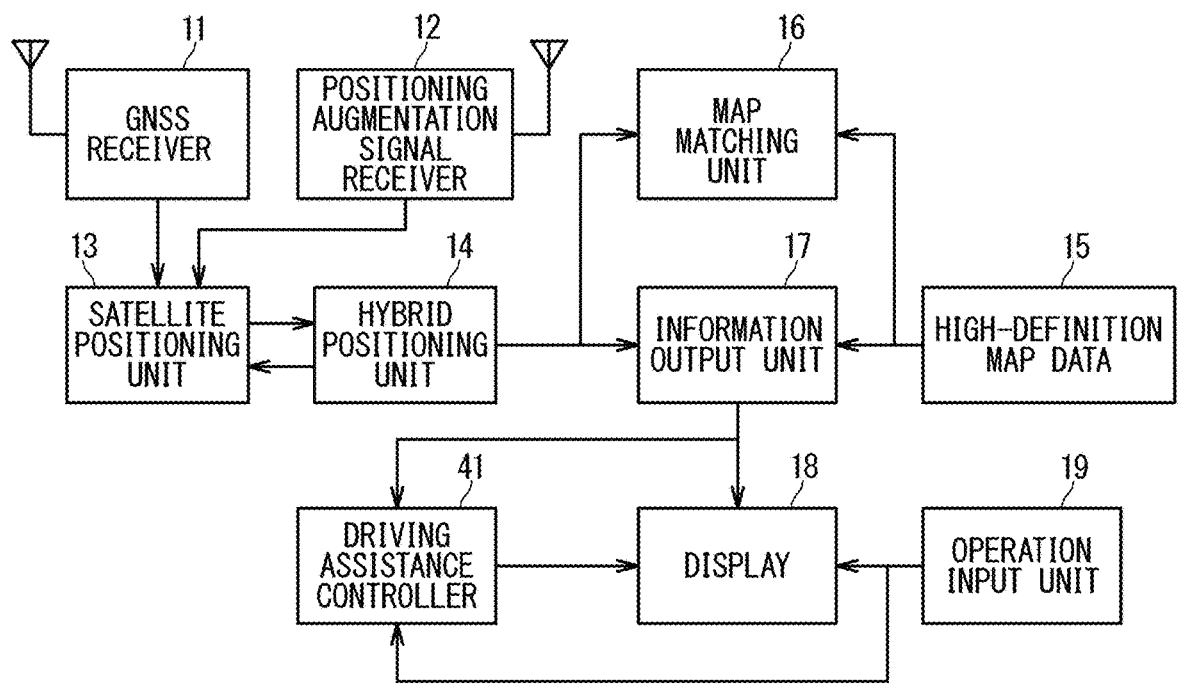
FIG. 17 is a block diagram illustrating a configuration of a driving assistance system according to Embodiment 4.

FIG. 17 is a block diagram illustrating a configuration of a driving assistance system according to Embodiment 4. The driving assistance system in FIG. 17 includes the positioning device according to Embodiment 3. The driving assistance system displays a subject vehicle position in a lane and guides a lane to a driver and occupants, based on results of high-accurate positioning obtained by the positioning device, which will be described hereinafter.

The driving assistance system in FIG. 17 includes high-definition map data 15, a map matching unit 16, an information output unit 17, a display 18, an operation input unit 19, and a driving assistance controller 41, besides the positioning device.

The high-definition map data 15 is data produced with absolute accuracy less than 50 cm, and includes three-dimensional shape information on each lane, three-dimensional shape information on road shoulders, and information on, for example, transverse and longitudinal gradients of the lanes and the road shoulders and road elevation. The map matching unit 16 implements map matching per lane, based on the subject vehicle position, the subject vehicle azimuth and prediction errors of these determined by the hybrid positioning unit 14, and the high-definition map data 15 to identify a traveling lane that is a lane through which the subject vehicle 1 is traveling, and the subject vehicle position in the lane. The map matching unit 16 can implement the map matching using the map matching described in, for example, Japanese Patent No. 6482720.

The information output unit 17 generates Advanced Driving Assistance System (ADAS) data in accordance with the Advanced Driving Assistance Systems Interface Specifications (ADASIS) standard, and outputs the ADAS data to the display 18 and the driving assistance controller 41. The information output unit 17 generates the ADAS data based on the subject vehicle position, the subject vehicle azimuth and the prediction errors of these determined by the hybrid positioning unit 14, the traveling lane and the subject vehicle position in the lane which have been identified by the map matching unit 16, and data in the high-definition map data 15 for a predetermined distance ahead of the subject vehicle 1 on a road.

The operation input unit 19 is, for example, input buttons, and receives input operations for reflecting intentions of the driver and the occupants onto a display screen. The display 18 generates an image for the display screen from high-definition road data around the subject vehicle 1 in the high-definition map data 15, based on the ADAS data from the information output unit 17, renders, for example, the subject vehicle position in the lane over the image, and displays the subject vehicle position or provides the voice guidance. The display 18 also displays a display screen for selection based on the input operations from the driver and the occupants which have been received by the operation input unit 19, and changes a scale or details of the display screen. The driving assistance controller 41 generates lane guidance data for traveling toward a destination, based on the input operations from the driver and the occupants and the ADAS data from the information output unit 17, and causes the display 18 to display the lane guidance data or provide the voice guidance.

Figure 18:
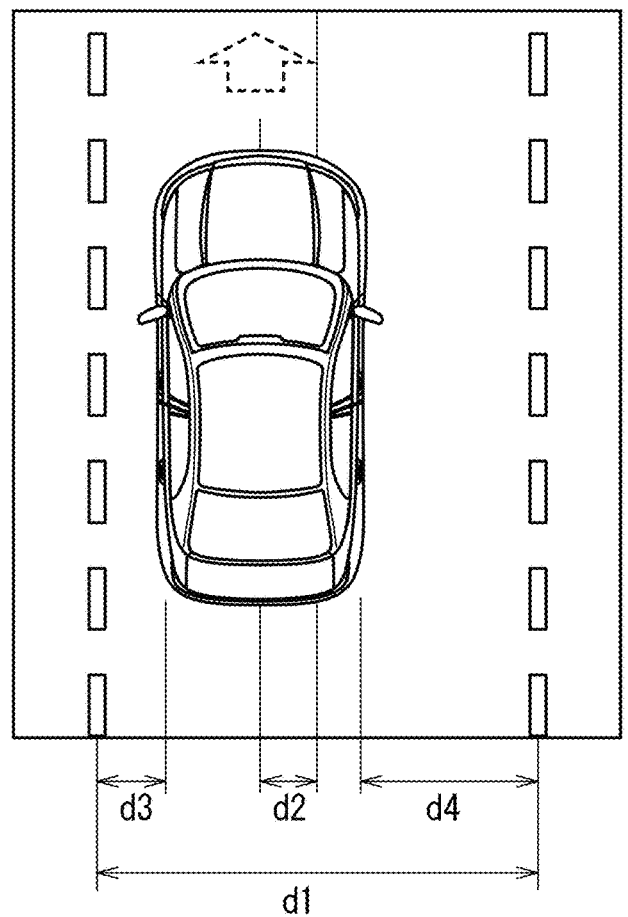
FIG. 18 illustrates an example display screen according to Embodiment 4.
Figure 19:
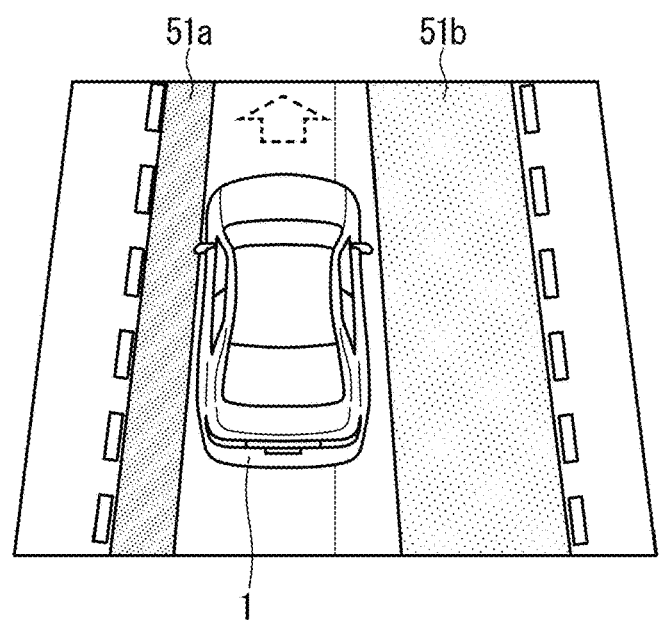
FIG. 19 illustrates an example display screen according to Embodiment 4.
Figure 20:
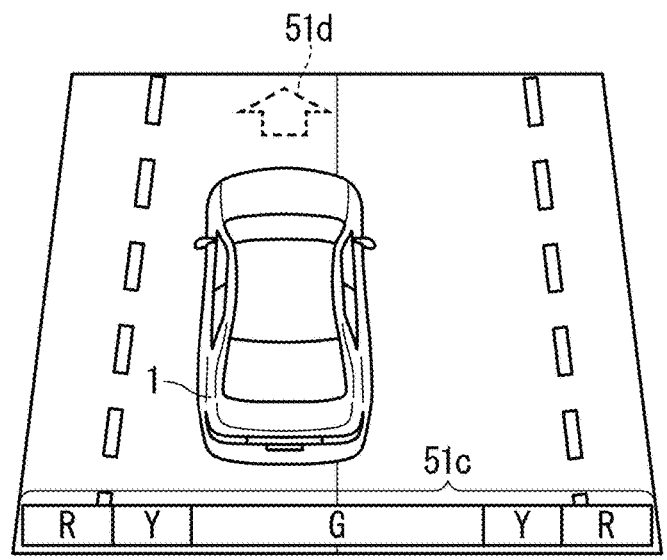
FIG. 20 illustrates an example display screen according to Embodiment 4.

Next, examples of the display screen of the display 18 will be described with reference to FIGS. 18 to 20. FIGS. 18 to 20 illustrate example display screens each displaying a subject vehicle position in a lane. FIG. 18 illustrates a distance relationship in a lane transverse direction between the subject vehicle position and white lines defining both ends of a traveling lane. A distance d1 is a width of the traveling lane, that is, a distance between the white lines. A distance d2 is a distance between the center of the traveling lane and the center of the subject vehicle 1. A distance d3 is a distance between the white line to the left and the subject vehicle 1. A distance d4 is a distance between the white line to the right and the subject vehicle 1. The distance d3 and the distance d4 are determined using a predefined width of the subject vehicle 1.

In FIG. 19, the display 18 changes display colors of a strip 51a and a strip 51b with the distance d3 and the distance d4, respectively, based on whether the distance d3 and the distance d4 are identical. For example, when the distance d3 and the distance d4 are identical, the strip 51a and the strip 51b are displayed in the same color. When the distance d3 and the distance d4 are different, the strip 51a and the strip 51b are displayed in different colors as illustrated in FIG. 19.

In FIG. 20, the display 18 changes display colors of a bar 51c and an arrow 51d, based on at least one of the distance d2, the distance d3, or the distance d4. For example, when a distance between the subject vehicle 1 and one of white lines is longer than or equal to a first threshold, the display 18 displays the bar 51c and the arrow 51d in green. Similarly, when the distance is shorter than the first threshold and longer than or equal to a second threshold, the display 18 displays the bar 51c and the arrow 51d in yellow. When the distance is shorter than the second threshold, the display 18 displays the bar 51c and the arrow 51d in red.

[Summary of Embodiment 4]

The aforementioned driving assistance system according to Embodiment 4 can determine an accurate traveling lane and an accurate subject vehicle position in the lane, using results of high accurate positioning obtained through satellite positioning and hybrid positioning. This driving assistance system can render spaces between the right and left white lines of the traveling lane and the subject vehicle 1 using easy-to-understand images, and thereby show the driver and the occupants the latest driving state. Consequently, the driving assistance system can, for example, appropriately alert and warn the driver and the occupants when drowsy driving or dangerous driving caused by front distracted driving is highly probable, thereby facilitating avoidance of a situation where the subject vehicle 1 is moving out of a lane and a road and falls into a difficulty in continuing to travel and a situation causing a self-inflicted traffic accident.

[Modifications]

Example variations of the display screen of the display 18 will be described with reference to FIGS. 21 to 28. As clear from the following description, results of high accurate positioning can produce advantages such as driving assistance and preventive safety in any of these examples.

Figure 21:
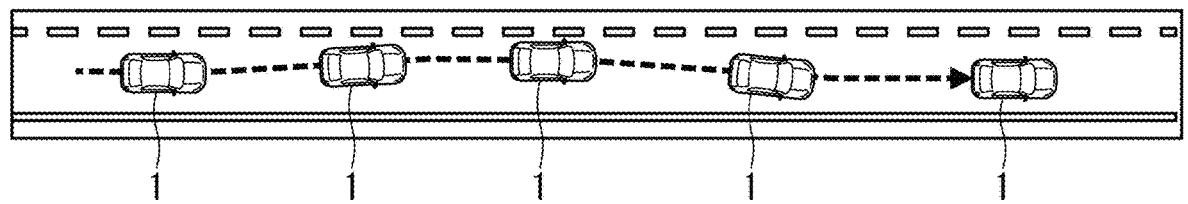
FIG. 21 illustrates an example display screen according to a modification of Embodiment 4.
Figure 22:
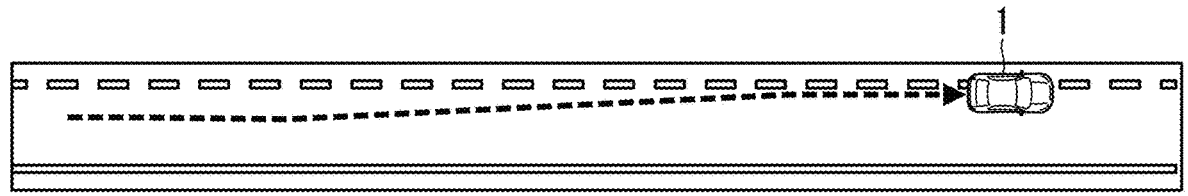
FIG. 22 illustrates an example display screen according to a modification of Embodiment 4.
Figure 23:
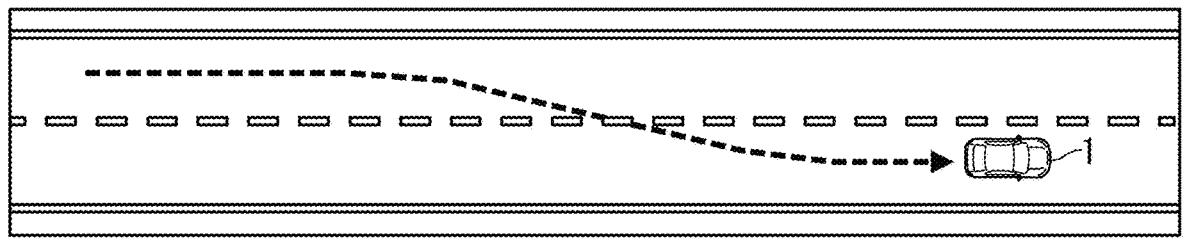
FIG. 23 illustrates an example display screen according to a modification of Embodiment 4.

FIGS. 21 to 23 illustrate example display screens each indicating a traveling trajectory for the latest predetermined time (or the latest predetermined distance). The display 18 displays a traveling trajectory on a lane or alerts the driver and the occupants through a display screen and by voice when the subject vehicle 1 is weaving as illustrated in FIG. 21 or when the subject vehicle 1 is gradually approaching the white line as illustrated in FIG. 22. The display 18 also displays a traveling trajectory on a lane or changes details of an alert, based on a type (broken line and solid line) of the white line to which the subject vehicle 1 attempts to change the lane as illustrated in FIG. 23.

Such a configuration can show the driver and the occupants the latest driving state by displaying the traveling trajectory of the subject vehicle 1 on the lane, using the results of high accurate positioning obtained through satellite positioning and hybrid positioning. This can, for example, appropriately alert and warn the driver and the occupants when drowsy driving or dangerous driving caused by front distracted driving is highly probable, thereby facilitating avoidance of a situation where the subject vehicle 1 is moving out of a lane and a road and falls into a difficulty in continuing to travel and a situation causing a self-inflicted traffic accident.

Figure 24:
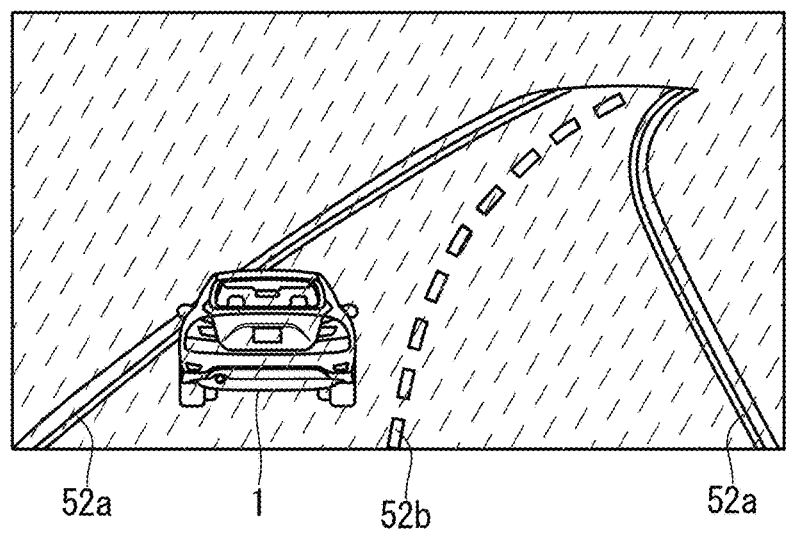
FIG. 24 illustrates an example display screen according to a modification of Embodiment 4.
Figure 25:
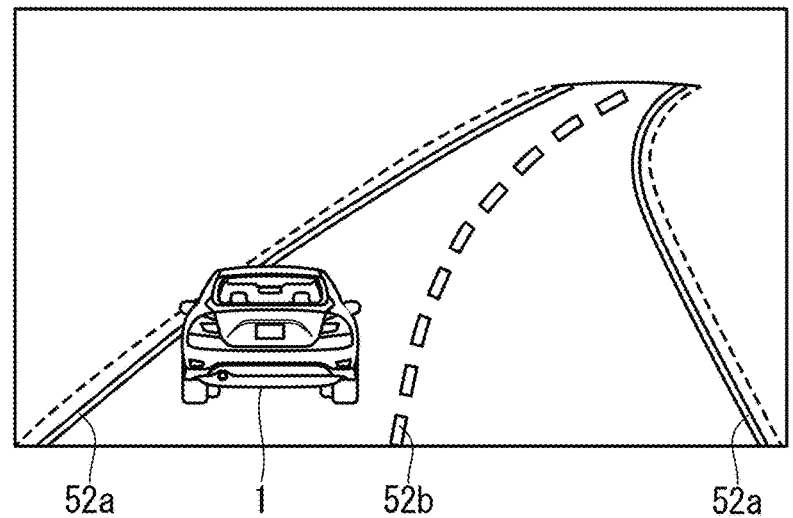
FIG. 25 illustrates an example display screen according to a modification of Embodiment 4.

FIGS. 24 and 25 illustrate example display screens when a head up display is installed as the display 18 near the windshield of the subject vehicle 1 where the driver can easily see. The display 18 displays a position relationship between boundary lines 52a of the traveling lane, a white line 52b, and the subject vehicle 1, under low visibility caused by darkness at night, heavy rain, a dense fog, or blowing snow as illustrated in FIG. 24, and when the white line cannot be recognized by accumulation of snow as illustrated in FIG. 25.

Such a configuration can provide the Augmented Reality (AR) assistance for presenting accurate information on the traveling lane and the subject vehicle position in the lane to the driver and the occupants, using the results of high accurate positioning obtained through satellite positioning and hybrid positioning even under the low visibility or when the white line cannot be recognized. This enables the driver to appropriately drive even under the low visibility or when the white line cannot be recognized, and facilitates avoidance of a situation where the subject vehicle 1 is moving out of a lane and a road and falls into a difficulty in continuing to travel and a situation causing a self-inflicted traffic accident.

Figure 26:
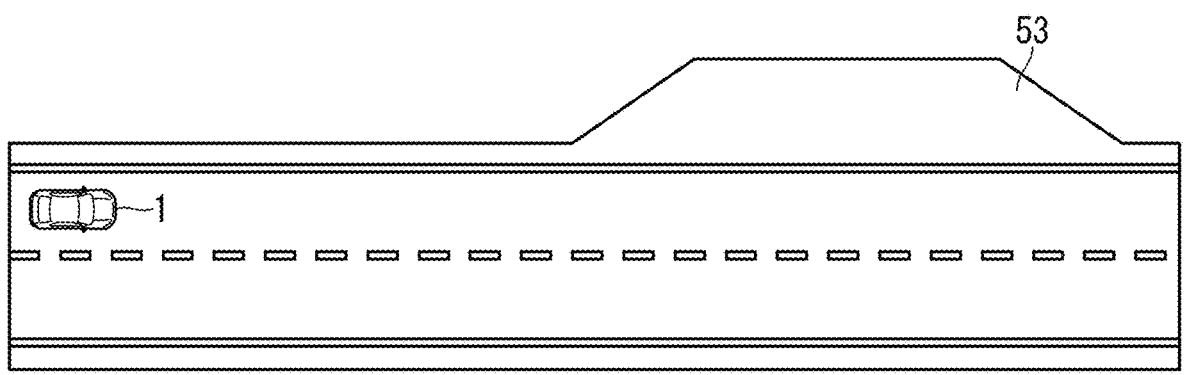
FIG. 26 illustrates an example display screen according to a modification of Embodiment 4.

FIG. 26 illustrates an example display screen displaying the nearest emergency parking zone 53 ahead of the subject vehicle 1 in an expressway. Before the driver and the occupants have poor physical conditions and the driver has difficulty in continuing to safely drive long, the display 18 guides a location of the nearest emergency parking zone 53 and guides a lane toward the location.

Such a configuration can guide a lane toward the nearest emergency parking zone 53, using the results of high accurate positioning obtained through satellite positioning and hybrid positioning. This can enhance the reliability of guiding a lane toward the emergency parking zone 53.

Figure 27:
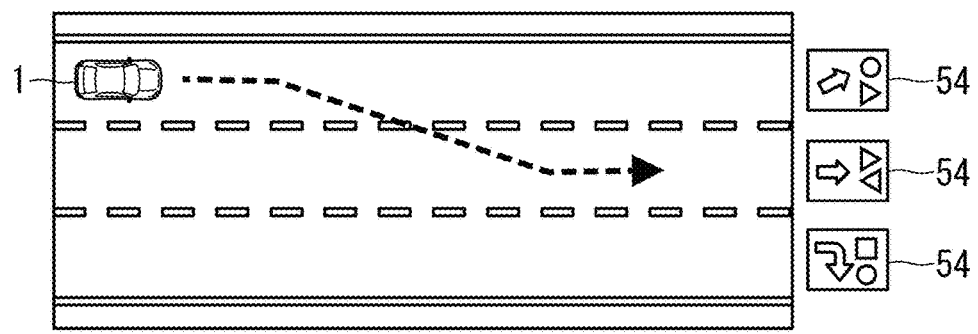
FIG. 27 illustrates an example display screen according to a modification of Embodiment 4.

FIG. 27 illustrates an example display screen displaying destinations of lanes ahead of the subject vehicle 1. The display 18 displays images 54 illustrating regional destinations for respective lanes of a road through which the subject vehicle 1 is traveling. When a lane toward a destination is determined, the display 18 may display only the image 54 of the lane, or provide an indication urging a change to the lane toward the destination and provide the voice guidance.

Such a configuration can guide a lane toward a destination, using the results of high accurate positioning obtained through satellite positioning and hybrid positioning. This can enhance the reliability of guiding the lane toward the destination.

Figure 28:
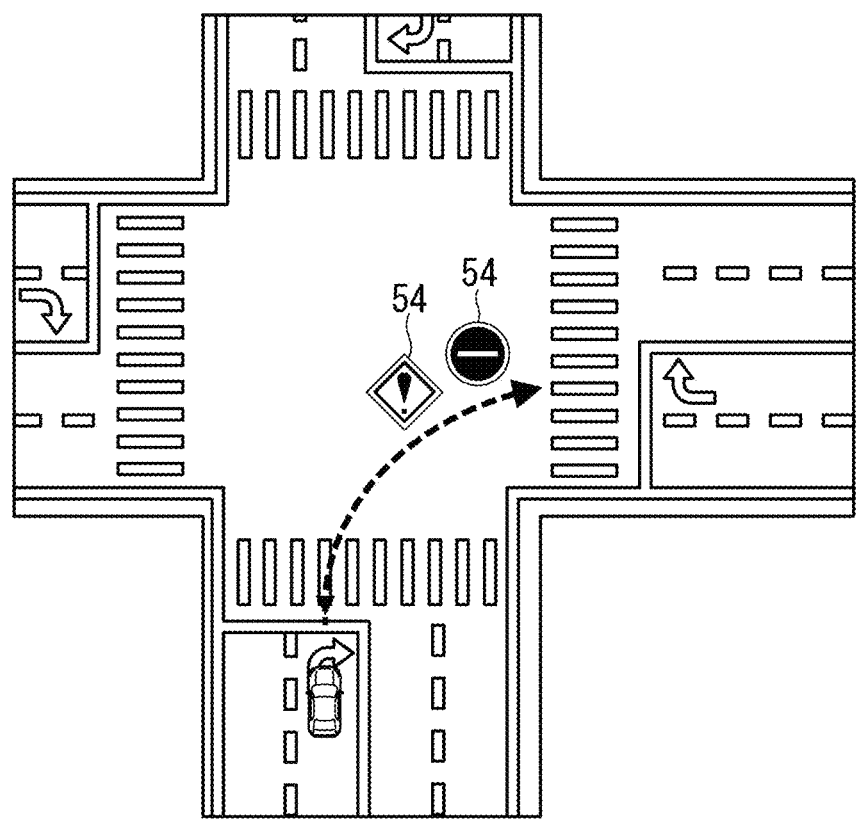
FIG. 28 illustrates an example display screen according to a modification of Embodiment 4.

FIG. 28 illustrates an example display screen when the subject vehicle 1 enters a lane, for example, a general road through which the subject vehicle 1 cannot pass. When the subject vehicle 1 attempts to enter a lane whose traveling direction is prohibited by traffic rules (travel the wrong way) or when the subject vehicle 1 has entered the lane (traveled the wrong way), the display 18 displays the alert and the warning such as the images 54, and provides the voice guidance.

Such a configuration can sense (detect) a state in which the subject vehicle 1 begins to travel the wrong way, using the results of high accurate positioning obtained through satellite positioning and hybrid positioning even in a center of an intersection without any indication of a white line. Thus, dangerous driving caused by distractions of the driver can be predicted earlier. This can alert and warn the driver and the occupants not inadvertently but at appropriate timing.

Embodiment 5

Figure 29:
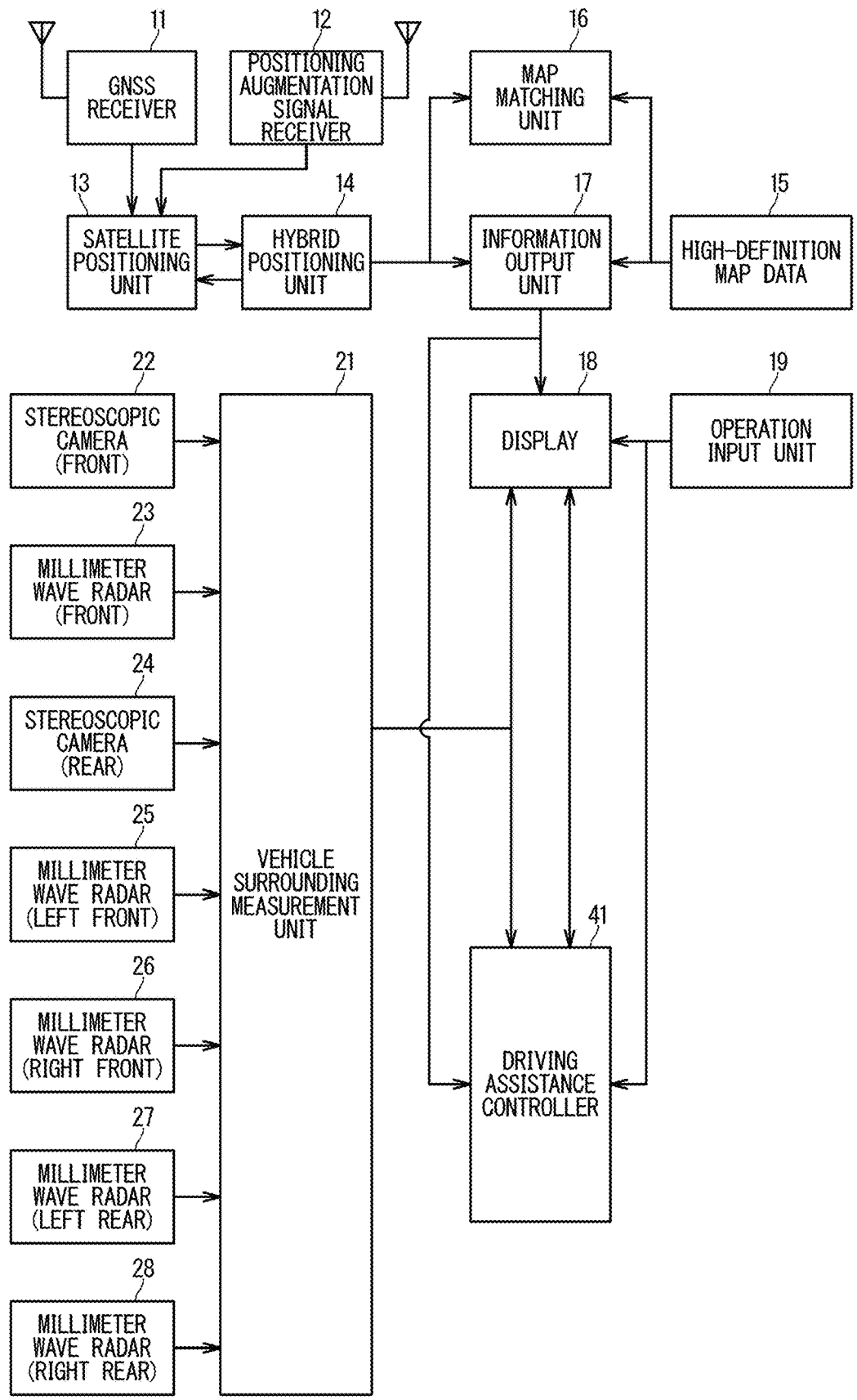
FIG. 29 is a block diagram illustrating a configuration of a driving assistance system according to Embodiment 5.

FIG. 29 is a block diagram illustrating a configuration of a driving assistance system according to Embodiment 5. The driving assistance system in FIG. 29 has a configuration obtained by adding, to the configuration in FIG. 17 according to Embodiment 4, a vehicle surrounding measurement unit 21, a front stereoscopic camera 22, a front millimeter wave radar 23, a rear stereoscopic camera 24, a left front millimeter wave radar 25, a right front millimeter wave radar 26, a left rear millimeter wave radar 27, and a right rear millimeter wave radar 28. The driving assistance system in FIG. 29 can sense the existence and movement of obstacles such as non-subject vehicles around the subject vehicle 1, which will be described hereinafter.

Figure 30:
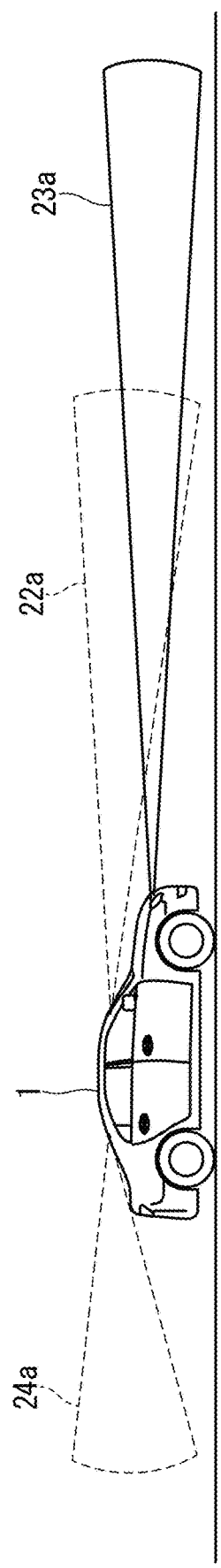
FIG. 30 illustrates stereoscopic cameras and millimeter wave radars according to Embodiment 5.
Figure 31:
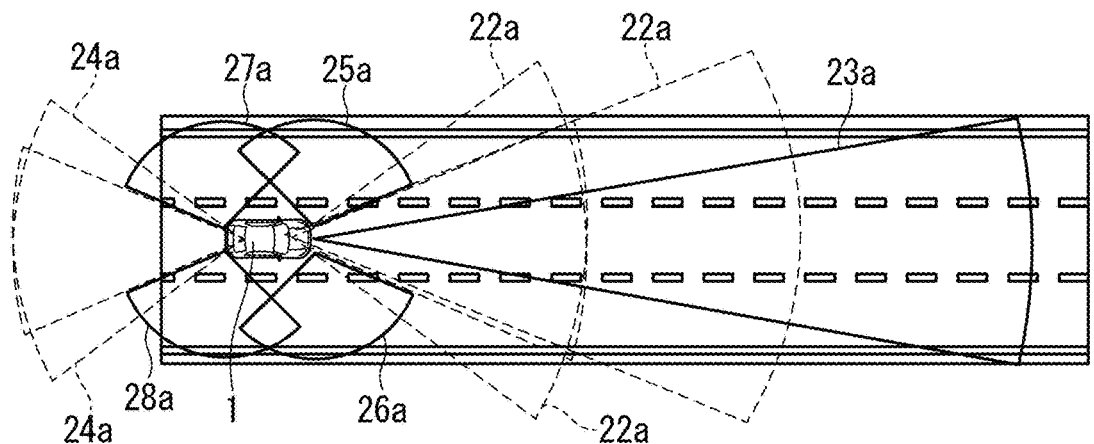
FIG. 31 illustrates the stereoscopic cameras and the millimeter wave radars according to Embodiment 5.

FIG. 30 and FIG. 31 are a side view and a top view, respectively, of installation positions and measurement ranges of the stereoscopic cameras 22 and 24 and the millimeter wave radars 23, 25, 26, 27, and 28.

The stereoscopic camera 22 and the stereoscopic camera 24 are installed at the top of the windshield and at the top of the rear window, and have a sensing range 22a and a sensing range 24a, respectively. The sensing range 22a and the sensing range 24a have 40° sensing angles forward and backward, and have 100 m and 40 m of sensing distances, respectively. The numerical values of the sensing angles and the sensing distances described herein are examples, and not limited to these.

The millimeter wave radar 23 is installed at the center of a front bumper, and has a sensing range 23a. The sensing range 23a has a relatively narrow 20° sensing angle forward, and has 200 m of a relatively long sensing distance. The numerical values of the sensing angle and the sensing distance described herein are examples, and not limited to these. The millimeter wave radar 25 and the millimeter wave radar 26 are installed at the corners of the front bumper, and have a sensing range 25a and a sensing range 26a, respectively. The millimeter wave radar 27 and the millimeter wave radar 28 are installed at the corners of the rear bumper, and have a sensing range 27a and a sensing range 28a, respectively. The sensing range 25a, the sensing range 26a, the sensing range 27a, and the sensing range 28a have relatively wide 120° sensing angles ahead on the left, ahead on the right, behind on the left, and behind on the right, respectively, and have 30 m of relatively short sensing distances. The numerical values of the sensing angles and the sensing distances described herein are examples, and not limited to these.

Next, characteristics of the stereoscopic cameras will be described. Each of the stereoscopic cameras includes right and left cameras that capture images of various obstacles such as non-subject vehicles and pedestrians and pavement markings such as white lines and yellow lines, and senses three-dimensional positions, sizes, and shapes of boundaries (lighting variations) of the obstacles and the pavement markings based on displacement (parallax) in capturing the images. The stereoscopic cameras can sense the movement of the obstacles even when the obstacles move across the sensing direction. However, in the presence of smudges and fogging on the windshield in front of lenses of the stereoscopic cameras or in the absence of lighting of the subject vehicle 1 in bad weather (heavy rain), backlit, at night, and in tunnels, the sense performance of the stereoscopic cameras decreases.

Next, characteristics of the millimeter wave radars will be described. Each of the millimeter wave radars senses a distance between the millimeter wave radar and an obstacle when millimeter waves (electromagnetic waves) transmitted within a predefined sensing angle are reflected off the obstacle and are returned to the millimeter wave radar. The millimeter wave radars are superior in ranging performance on long range, and can maintain the ranging performance independently of the sunshine condition, brightness, and the weather (rain, fog). However, the millimeter wave radars have difficulty in sensing an obstacle with a low reflection coefficient and sensing the movement of an obstacle moving across the sensing direction of the radars.

In light of the foregoing, the vehicle surrounding measurement unit 21 in FIG. 29 according to Embodiment 5 integrates the existence and behaviors of obstacles sensed by the stereoscopic cameras 22 and 24 and the millimeter wave radars 23, 25, 26, 27, and 28 with collaborative recognition. In other words, the vehicle surrounding measurement unit 21 monitors the surrounding of the subject vehicle 1 by combining sensing results of the stereoscopic cameras and the millimeter wave radars.

Figure 32:
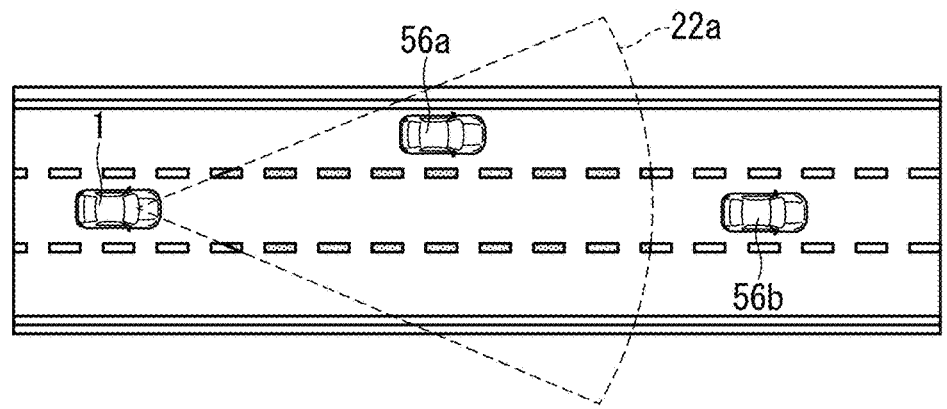
FIG. 32 illustrates a monitoring example by the stereoscopic cameras and the millimeter wave radars according to Embodiment 5.
Figure 33:
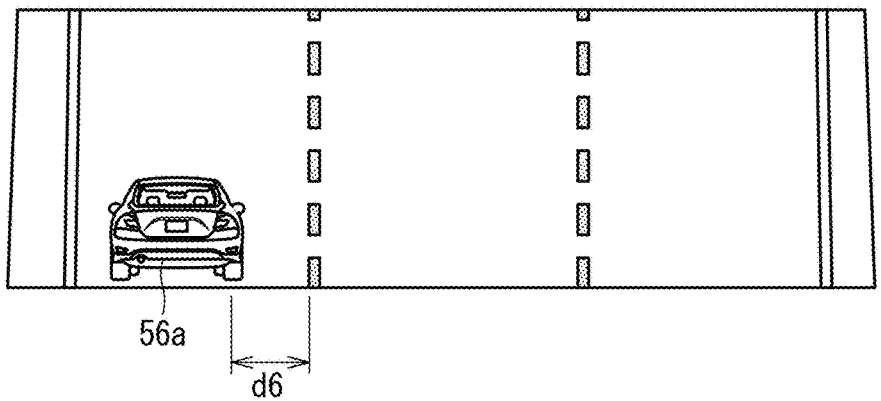
FIG. 33 illustrates a monitoring example by the stereoscopic cameras and the millimeter wave radars according to Embodiment 5.
Figure 34:
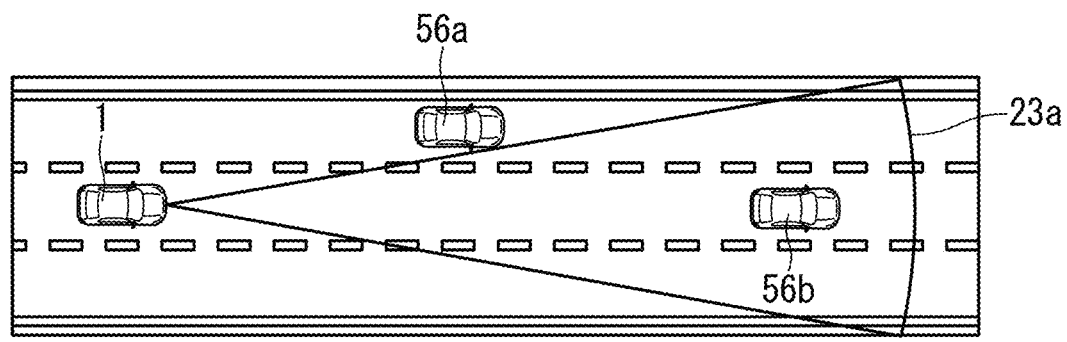
FIG. 34 illustrates a monitoring example by the stereoscopic cameras and the millimeter wave radars according to Embodiment 5.

Next, examples of monitoring the surrounding of the subject vehicle 1 by the stereoscopic cameras 22 and 24 and the millimeter wave radars 23, 25, 26, 27, and 28 will be described. FIGS. 32 to 34 illustrate operations of the front stereoscopic camera 22 and the front millimeter wave radar 23 that sense non-subject vehicles 56a and 56b ahead of the subject vehicle 1.

As illustrated in FIG. 32, the stereoscopic camera 22 has a wide sensing angle and a short sensing distance. Thus, the stereoscopic camera 22 senses not the non-subject vehicle 56b traveling through the traveling lane of the subject vehicle 1 and located outside of the sensing distance, but the non-subject vehicle 56a traveling through a lane adjacent left to the traveling lane of the subject vehicle 1 and located within the sensing distance in the example of FIG. 32.

The stereoscopic camera 22 senses shapes of right and left white lines (hatch portions in FIG. 32) of the traveling lane within the sensing range 23a, so that the stereoscopic camera 22 can sense the type of the white lines as broken lines.

As illustrated in FIG. 33, the stereoscopic camera 22 can sense the shape of the obstacle such as the non-subject vehicle 56a and the shape of the white line (to the left of the traveling lane). Thus, the stereoscopic camera 22 can sense a distance d6 of, for example, the space between the obstacle and the white line.

In contrast, the millimeter wave radar 23 has a narrow sensing angle and a long sensing distance as illustrated in FIG. 34. Thus, the millimeter wave radar 23 senses not the non-subject vehicle 56a traveling through the lane adjacent left to the traveling lane of the subject vehicle 1, but the non-subject vehicle 56b traveling through the traveling lane of the subject vehicle 1 in the example of FIG. 34.

The vehicle surrounding measurement unit 21 senses, based on the sensing results in FIG. 32 to 34, a distance and a relative position of each of the non-subject vehicle 56b traveling through the traveling lane and the non-subject vehicle 56a traveling through the lane adjacent left to the traveling lane with respect to the subject vehicle 1, and a type of the white lines of the traveling lane.

[Summary of Embodiment 5]

The driving assistance system according to Embodiment 5 can map a result (subject vehicle position) of high accurate positioning obtained through satellite positioning and hybrid positioning, and an obstacle ahead of the subject vehicle 1 which has been sensed by the stereoscopic cameras and the millimeter wave radars on a high-definition map per lane. Thus, the driving assistance system can show the driver and the occupants driving states of the subject vehicle 1 including a traffic situation ahead of the subject vehicle 1. This driving assistance system can, for example, appropriately alert and warn the driver and the occupants when drowsy driving or dangerous driving caused by front distracted driving is highly probable.

[Modifications]

Figure 35:
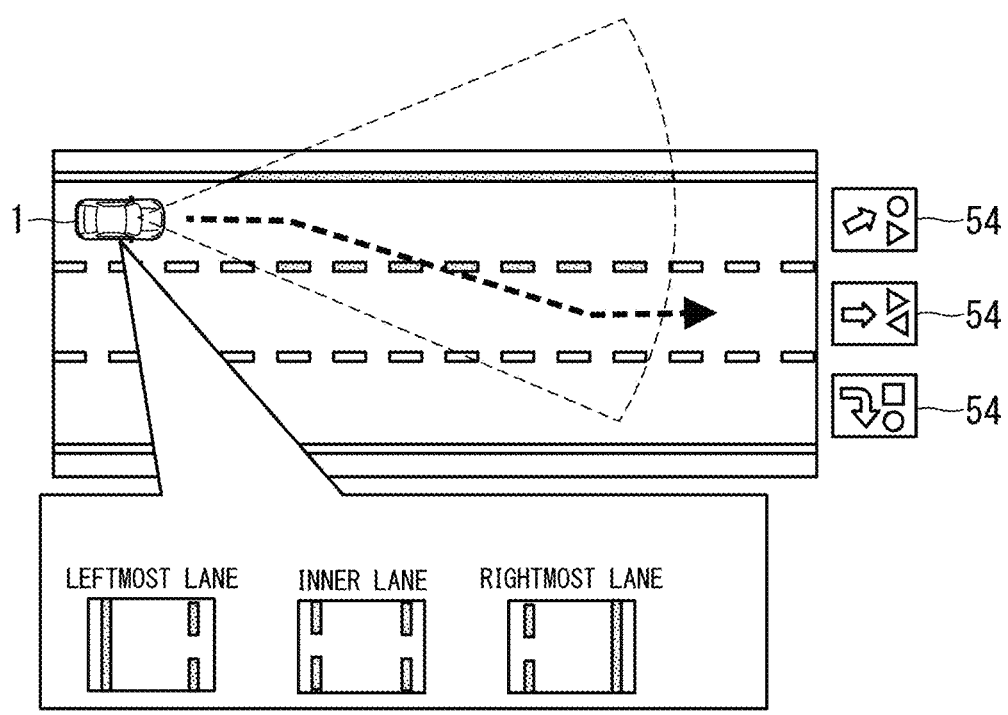
FIG. 35 illustrates a monitoring example by the stereoscopic cameras and the millimeter wave radars according to a modification of Embodiment 5.

FIG. 35 illustrates an example of determining a traveling lane, based on types of white lines of the traveling lane which are sensed by the stereoscopic camera 22.

The stereoscopic camera 22 can sense whether types of the right and left white lines of the traveling lane are broken line or solid line. Thus, the vehicle surrounding measurement unit 21 may estimate whether the traveling lane is a leftmost lane, a rightmost lane, or an inner lane other than the leftmost lane and the rightmost lane, based on combinations of types of the right and left white lines which are sensed by the stereoscopic camera 22.

When the white lines are broken lines, the vehicle surrounding measurement unit 21 linearly interpolates blank spaces between front and back white portions with the front and back white portions, so that boundaries (contours) of a continuous traveling lane can be determined. In Japan, a broken white line of an expressway alternates between a white portion of 8 m and a blank space of 12 m, whereas a broken white line of a general road alternates between a white portion of 5 m and a blank space of 5 m. Thus, the vehicle surrounding measurement unit 21 may sense whether the subject vehicle 1 is traveling through an expressway or a general road, based on spacings between white portions and blank spaces.

The driving assistance controller 41 checks the results of high accurate positioning obtained through satellite positioning and hybrid positioning against the lane information sensed by the vehicle surrounding measurement unit 21 to identify a lane with higher reliability as a traveling lane through which the subject vehicle 1 should travel, and guides a change to a lane leading to a destination.

Such a configuration enables the use of not only information on the subject vehicle position and the traveling lane that have been determined by the satellite positioning unit 13, the hybrid positioning unit 14, and the map matching unit 16 but also information on the traveling lane sensed by the vehicle surrounding measurement unit 21. Since the respective advantages of the pieces of the information can increase the performance (e.g., accuracy and reliability) of the driving assistance controller 41 on traveling lanes, the driver and the occupants can receive stable driving assistance.

Figure 36:
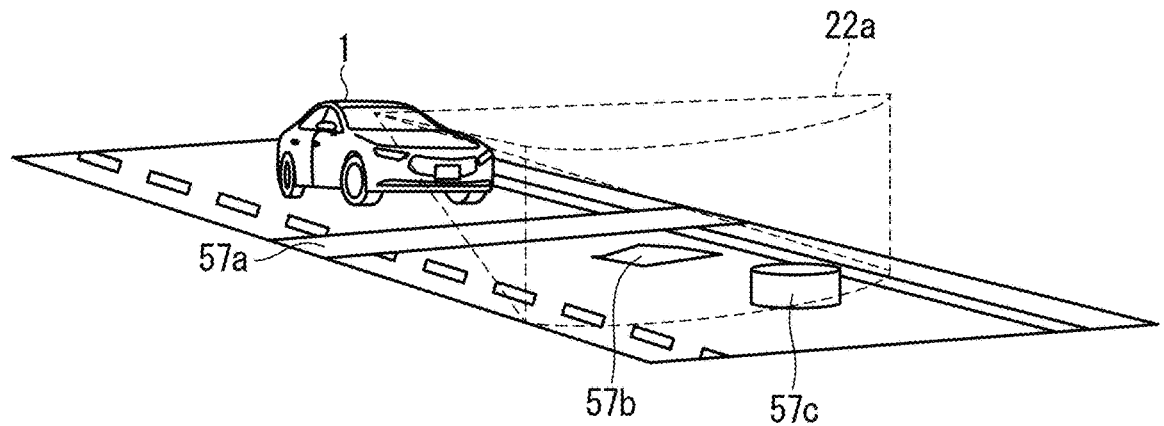
FIG. 36 illustrates a monitoring example by the stereoscopic cameras and the millimeter wave radars according to a modification of Embodiment 5.

FIG. 36 illustrates an example of sensing a bump 57a, a pothole 57b, and an obstacle 57c on a road. The front stereoscopic camera 22 senses the bump 57a such as a concrete embedded portion, the pothole 57b such as a pavement flaw, and the obstacle 57c such as a dropping within the sensing range 22a.

The driving assistance controller 41 determines, for example, whether the riding comfort is impacted, based on results of sensing the bump 57a, the pothole 57b, and the obstacle 57c by the front stereoscopic camera 22. Then, the driving assistance controller 41 controls a display screen and voice of the display 18 based on the determination results, so that the driver and the occupants are informed of the impact on the riding comfort and an alert and a warning for the avoidance.

Such a configuration enables the driver and the occupants to know, for example, the bump 57a, the pothole 57b, and the obstacle 57c on the road in advance. Thus, the driver can appropriately drive by slowing or carefully driving near the places.

Figure 37:
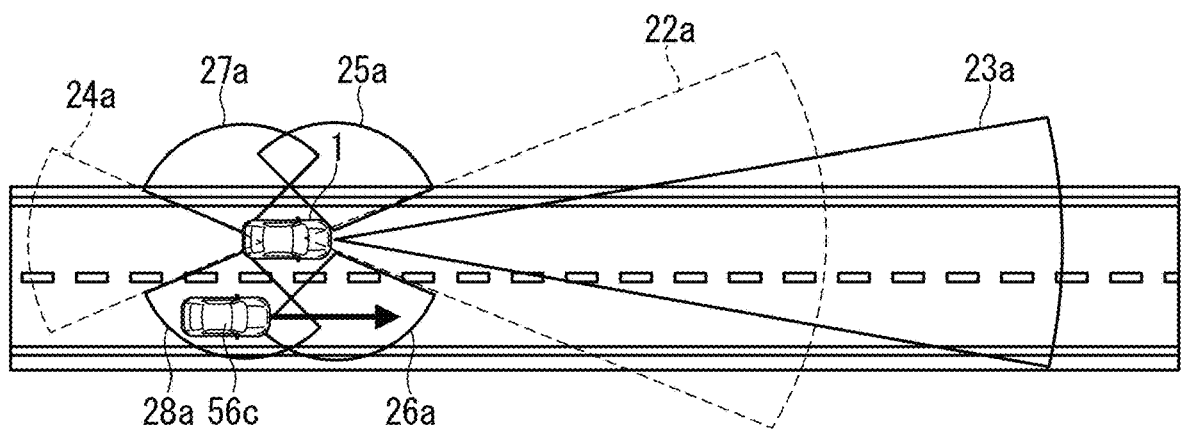
FIG. 37 illustrates a monitoring example by the stereoscopic cameras and the millimeter wave radars according to a modification of Embodiment 5.
Figure 38:
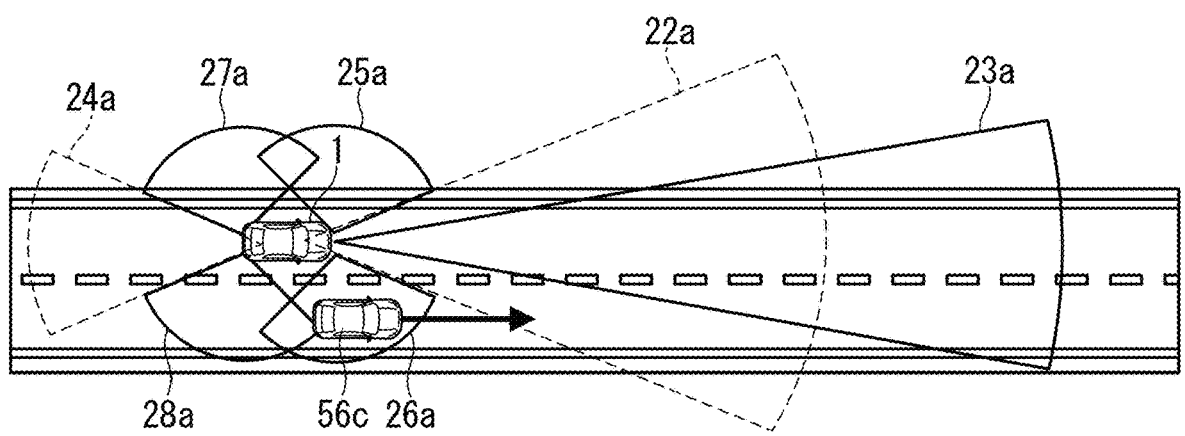
FIG. 38 illustrates a monitoring example by the stereoscopic cameras and the millimeter wave radars according to a modification of Embodiment 5.
Figure 39:
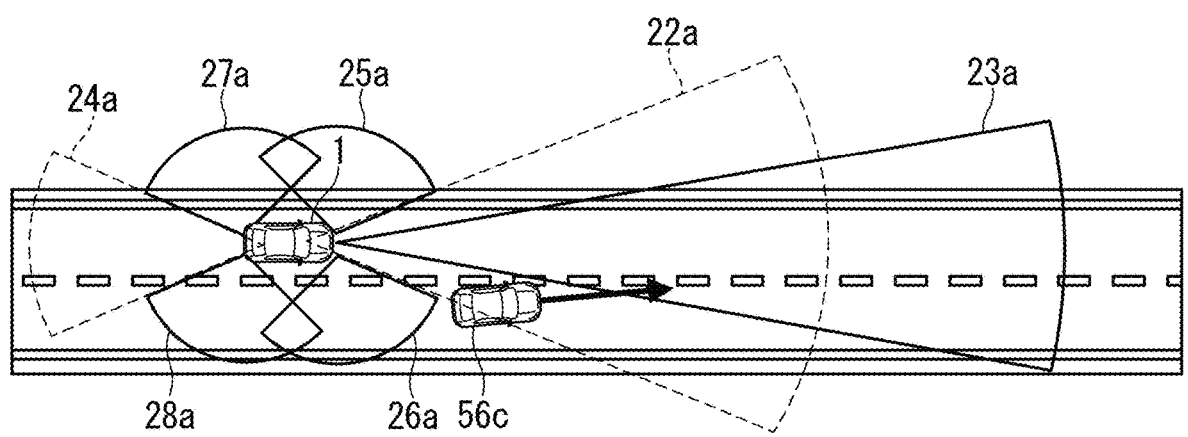
FIG. 39 illustrates a monitoring example by the stereoscopic cameras and the millimeter wave radars according to a modification of Embodiment 5.
Figure 40:
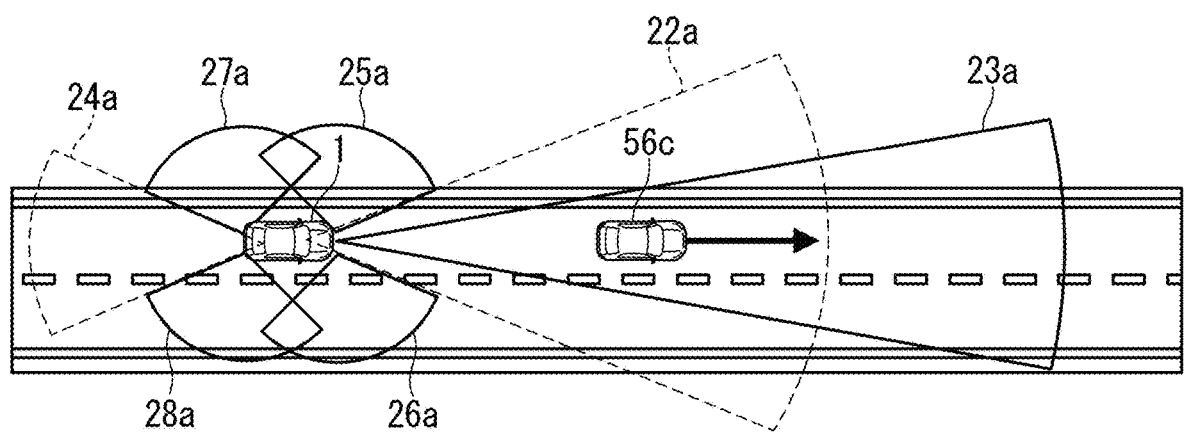
FIG. 40 illustrates a monitoring example by the stereoscopic cameras and the millimeter wave radars according to a modification of Embodiment 5.

FIGS. 37 to 40 illustrate, in chronological order, an example of monitoring the surrounding of the subject vehicle 1 when a non-subject vehicle 56c overtakes the subject vehicle 1 and changes the lane in front of the subject vehicle 1. In FIG. 37, the right rear millimeter wave radar 28 senses the non-subject vehicle 56c traveling behind the subject vehicle 1 on the right. In FIG. 38, the right front millimeter wave radar 26 senses the non-subject vehicle 56c overtaking the subject vehicle 1 and traveling in front of and to the right of the subject vehicle 1. In FIG. 39, the front stereoscopic camera 22 senses the non-subject vehicle 56c whose lane is being changed from the lane on the right front of the subject vehicle 1 toward the lane in front of the subject vehicle 1. In FIG. 40, the front stereoscopic camera 22 and the front millimeter wave radar 23 sense the non-subject vehicle 56c traveling in front of the subject vehicle 1.

During these operations the driving assistance controller 41 maps obstacles around the subject vehicle 1 that have been sensed by the plurality of stereoscopic cameras and the plurality of millimeter wave radars with respect to the subject vehicle position on the high-definition map (e.g., on a road through which the subject vehicle 1 is traveling). Then, while predicting the movement of each of the obstacles at the next measurement timing, the driving assistance controller 41 determines whether the obstacle has moved almost as predicted, whether a new obstacle has been sensed, or whether the obstacle sensed earlier is moving away upon arrival of the next measurement timing. For example, when the plurality of stereoscopic cameras and the plurality of millimeter wave radars have sensed the non-subject vehicle 56c as illustrated in FIGS. 37 to 40, the driving assistance controller 41 determines that the non-subject vehicle 56c has moved almost as predicted.

A wide variety of obstacles typically exist on roads. The obstacles include non-subject vehicles, two-wheel vehicles, bicycles, and pedestrians other than the subject vehicle 1, stationary obstacles, and individually moving obstacles. Since the driving assistance system with the aforementioned configuration enables the driver and the occupants to know the existence of obstacles around the subject vehicle 1, position relationships between the obstacles and the subject vehicle 1, and behaviors of the obstacles, it facilitates avoidance of collisions with the obstacles.

Even a configuration partly different from that of Embodiment 5 as (1) to (3) below can produce the same advantages as those of the configuration according to Embodiment 5.

(1) Any of the stereoscopic cameras and the millimeter wave radars may be changed to an ultrasound sensor. The ultrasound sensor can sense the presence or absence of a sensing target and a distance to an obstacle when transmitted ultrasonic waves are reflected off the sensing target and the ultrasound sensor receives the reflected waves. The detection sensitivity of the ultrasound sensor is independent of a reflection coefficient of the sensing target. The ultrasound sensor is resistant to dust and smudges, and can sense a transparent object such as glass and an intricate object such as wire gauze. Moreover, the ultrasound sensor is inexpensive. However, sound waves are slower in propagation speed than electromagnetic waves. The ultrasound sensor has a sensing distance of 10 m that is shorter than those of millimeter wave radars. Thus, the ultrasound sensor may be used as a sonar in parking a vehicle.

(2) Any of the stereoscopic cameras and the millimeter wave radars may be changed to light detection and ranging (LiDAR). The LiDAR can accurately sense not only a distance to a sensing target but also the position and the shape of the target when a transmitted laser light (infrared rays) is reflected off the target and the LiDAR receives the reflected waves. Since the LiDAR uses infrared rays shorter in wavelength than electromagnetic waves, the LiDAR can sense a smaller obstacle and an obstacle with a lower reflection coefficient than those by millimeter wave radars. Consequently, the LiDAR is suitable when the shape of an obstacle and a position relationship with the obstacle need to be accurately sensed. It should be noted that, however, the LiDAR is more expensive than millimeter wave radars and the sensing capability of the LiDAR decreases in bad weather.

(3) When the driving assistance system senses, for example, the bump 57a, the pothole 57b, and the obstacle 57c on the road in FIG. 36, the road surface may be maintained by transmitting the sensing results to a road maintenance center. For example, when sensing, for example, the bump 57a on the road, the driving assistance controller 41 may automatically inform a predefined server of the road maintenance center of coordinates at which the bump 57a has been sensed and the sensing results. Then, the road maintenance center may organize, for example, the coordinates and the type of the bump 57a on the road which have been stored in the server and generate priorities for maintenance, thereby issuing a maintenance command to construction vehicles for maintenance operations.

Embodiment 6

Figure 41:
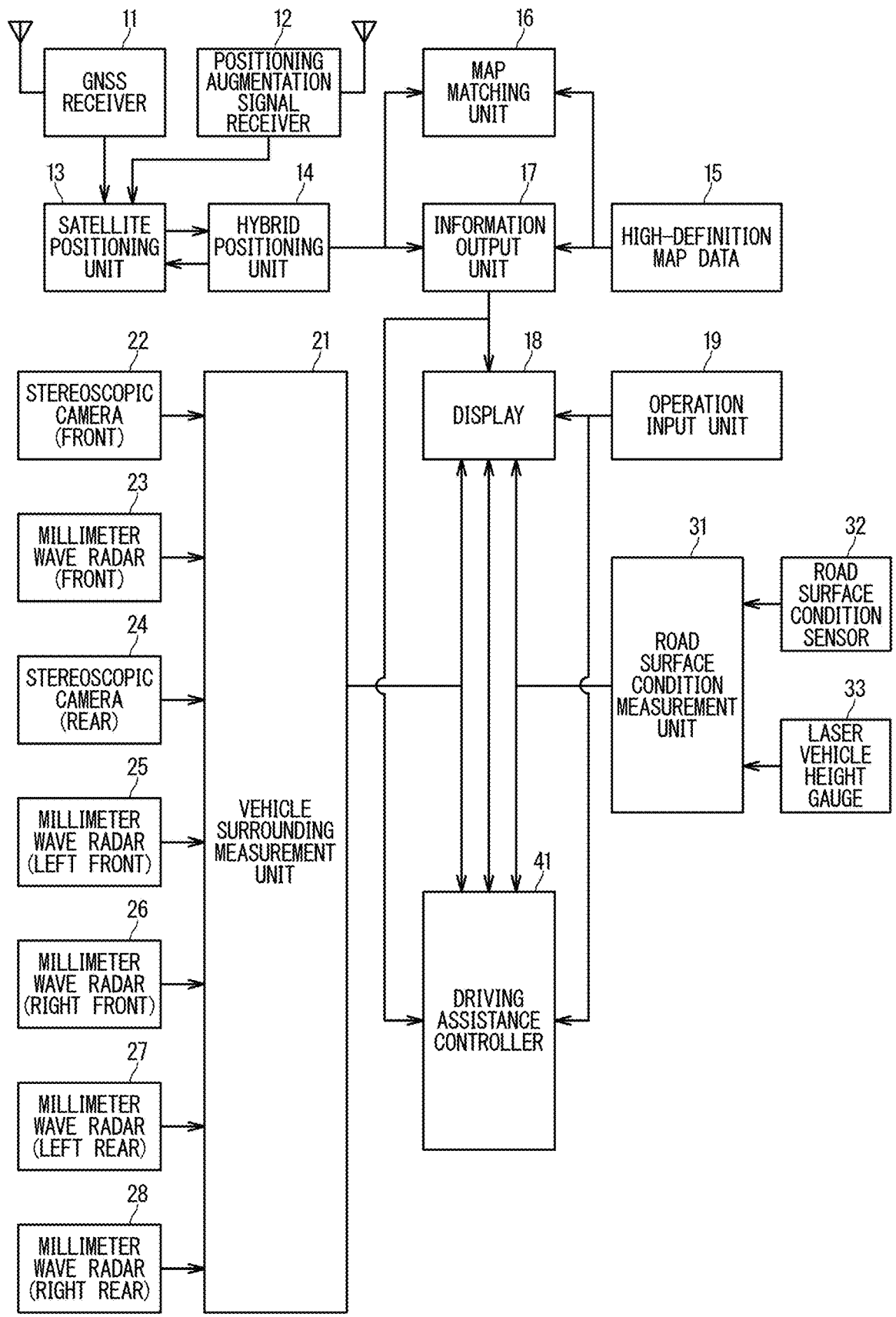
FIG. 41 is a block diagram illustrating a configuration of a driving assistance system according to Embodiment 6.

FIG. 41 is a block diagram illustrating a configuration of a driving assistance system according to Embodiment 6. The driving assistance system in FIG. 41 has a configuration obtained by adding, to the configuration in FIG. 29 according to Embodiment 5, a road surface condition measurement unit 31, a road surface condition sensor 32, and a laser vehicle height gauge 33.

Figure 42:
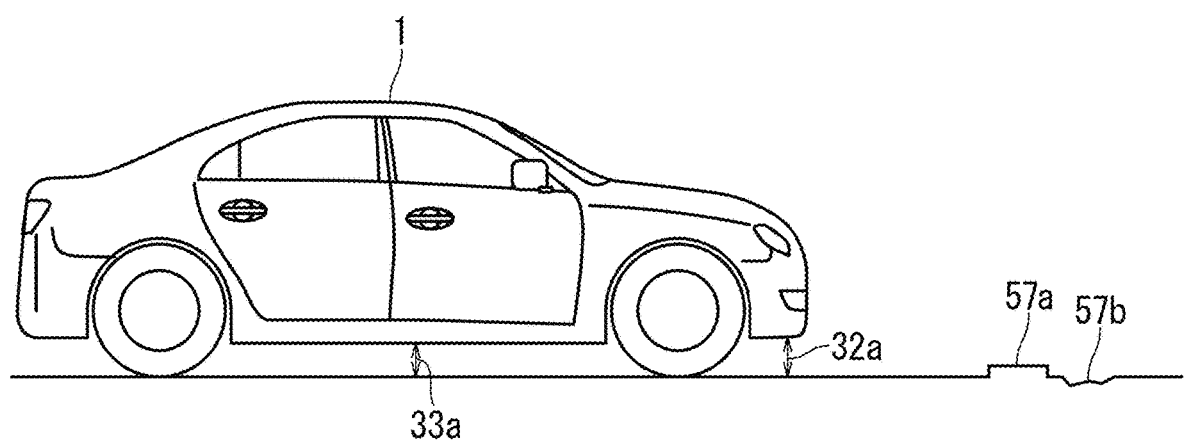
FIG. 42 illustrates a road surface condition sensor and a laser vehicle height gauge according to Embodiment 6.

FIG. 42 is a side view illustrating installation positions of the road surface condition sensor 32 and the laser vehicle height gauge 33. FIG. 42 illustrates a measurement direction 32*a* of the road surface condition sensor 32 and a measurement direction 33*a* of the laser vehicle height gauge 33.

The road surface condition sensor 32 senses (monitors) a road surface condition immediately below the subject vehicle 1. The road surface condition sensor 32, for example, irradiates a road surface with near-infrared laser light with a plurality of wavelengths to measure the reflection from the road surface, thereby sensing road surface states including roughness of the road surface, and a thickness of each of a dry layer, a wet layer, an icy layer, and a compacted snow layer on the road surface. The laser vehicle height gauge 33 diagonally irradiates the road surface with laser light, and receives reflected light from the road surface to sense a distance (a vehicle height) between the road surface and the subject vehicle 1 through trigonometry, and a crack, a pothole, a rut, and a flatness defect on the road surface.

The road surface condition measurement unit 31 determines an integrated road surface condition, based on sensing results of the road surface condition sensor 32 and the laser vehicle height gauge 33.

The driving assistance controller 41 causes the display 18 to display a display screen and provide the voice guidance based on determination results on road surface conditions by the road surface condition measurement unit 31, so that the driver and the occupants are informed of, for example, the riding comfort and the influence on the driving. When determining that the driving of the subject vehicle 1 is interfered, based on the determination results of the road surface condition measurement unit 31, the driving assistance controller 41 causes the display 18 to display a display screen and provide the voice guidance so that the driver and the occupants are informed of an alert and a warning for the avoidance.

[Summary of Embodiment 6]

The driving assistance system according to Embodiment 6 enables the driver and the occupants to know a road surface condition in advance. Thus, the driver can appropriately drive by slowing or carefully driving near the place.

Modifications

The driving assistance system may transmit a road surface condition to a road maintenance center to maintain a road surface. For example, when determining that the driving of the subject vehicle 1 is interfered, the driving assistance controller 41 may automatically inform a predefined server of a road maintenance center of coordinates at which the determination has been made and the determination results. Then, the road maintenance center may organize, for example, coordinates on road surface conditions which have been stored in the server and generate priorities for maintenance, thereby issuing a maintenance command to construction vehicles for maintenance operations.

Embodiment 7

Figure 43:
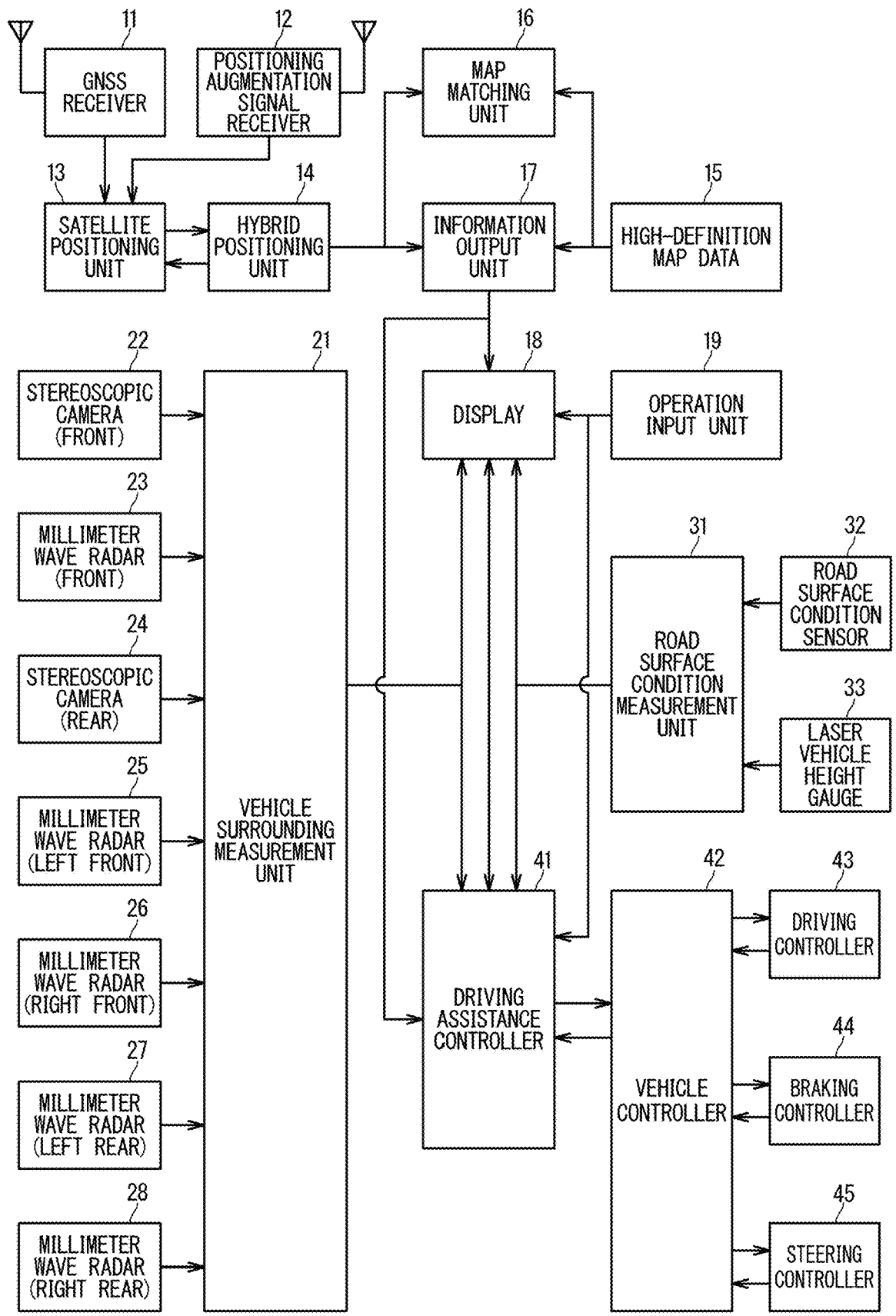
FIG. 43 is a block diagram illustrating a configuration of a driving assistance system according to Embodiment 7.

FIG. 43 is a block diagram illustrating a configuration of a driving assistance system according to Embodiment 7. The driving assistance system in FIG. 43 has a configuration obtained by adding, to the configuration in FIG. 41 according to Embodiment 6, a vehicle controller 42, a driving controller 43, a braking controller 44, and a steering controller 45.

The driving assistance controller 41 controls the vehicle controller 42 based on information from the information output unit 17, the operation input unit 19, the vehicle surrounding measurement unit 21, and the road surface condition measurement unit 31.

The vehicle controller 42 has functions including lane keeping assist (LKA), lane change assist (LCA), adaptive cruise control (ACC), and advanced emergency braking (AEB). The vehicle controller 42 controls, for example, an engine, a brake, and a steering under control of the driving assistance controller 41, using the driving controller 43, the braking controller 44, and the steering controller 45.

The driving controller 43 controls a drive system by, for example, adjusting fuel injection of the engine and selecting a gear according to the subject vehicle speed. The braking controller 44 operates the brake when, for example, there is a collision risk without a brake operation of the driver. The steering controller 45 operates the steering to control a traveling direction of the subject vehicle 1.

[Summary of Embodiment 7]

The aforementioned driving assistance system according to Embodiment 7 can appropriately control the traveling of the subject vehicle 1, using the results of high accurate positioning obtained through satellite positioning and hybrid positioning. Next, some examples of control on the subject vehicle 1 will be described.

[Examples of Control on Vehicle in Embodiment 7]

Figure 44:
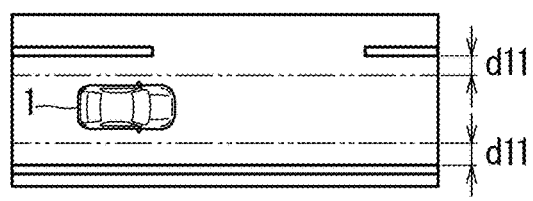
FIG. 44 illustrates example vehicle control of the driving assistance system according to Embodiment 7.

FIG. 44 illustrates an example traveling control for preventing the subject vehicle 1 from moving out of a lane. Some drawings subsequent to FIG. 44 illustrate an inner portion located at a predefined distance d11 from each of the right and left white lines of a traveling lane, using chain double-dashed lines.

When the driver requests the driving assistance controller 41 to implement the lane keeping assist function through the operation input unit 19, the driving assistance controller 41 controls the vehicle controller 42 so that the driving controller 43, the braking controller 44, and the steering controller 45 are controlled. This control allows the subject vehicle 1 to maintain a vehicle spacing with a non-subject vehicle ahead and travel with the predefined distance d11 from each of the right and left white lines of the traveling lane being maintained.

The display 18 notifies the driver and the occupants of whether to implement the lane keeping assist function through a display screen and by voice. When the lane keeping assist function is implemented and one of the right and left white lines of the traveling lane sensed by the front stereoscopic camera 22 is a broken line, the vehicle surrounding measurement unit 21 linearly interpolates blank spaces of the broken line with the front and back white portions to determine boundaries (contours) of the continuous traveling lane. The information output unit 17 outputs, to the driving assistance controller 41, coordinates indicating boundaries of a lane identified by the map matching unit 16 as the traveling lane, the type of the traveling lane (solid line and broken line), and the subject vehicle position. The driving assistance controller 41 controls distances between the subject vehicle position and the right and left white lines of the traveling lane, by checking the coordinates indicating the boundaries of the traveling lane, the type of the traveling lane (solid line and broken line), and the subject vehicle position against the boundary lines of the traveling lane obtained by the vehicle surrounding measurement unit 21.

With such a configuration, the driving assistance controller 41 assists the lane keeping of the subject vehicle 1, using a relationship between the coordinates indicating the boundary of the lane identified by the map matching unit 16 as the traveling lane and the subject vehicle position from the information output unit 17. For example, even when a distance between the subject vehicle 1 and a non-subject vehicle ahead becomes shorter and the front stereoscopic camera 22 cannot temporarily sense the right and left white lines of the traveling lane, as long as a state where a prediction error of the subject vehicle position is lower than or equal to a predefined error is continued, the stable lane keeping assist can be provided to the driver and the occupants.

Figure 45:
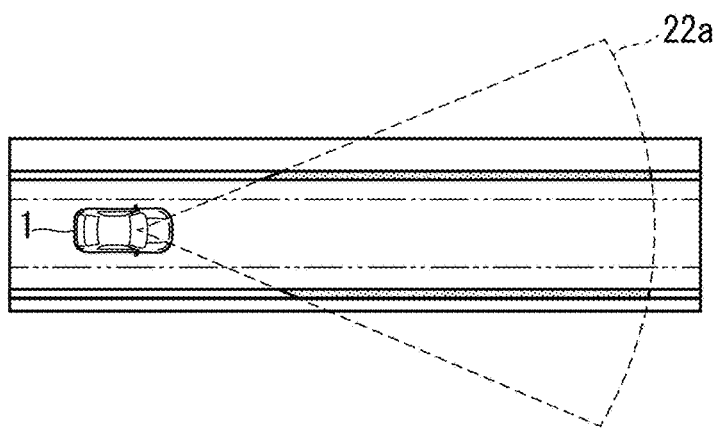
FIG. 45 illustrates example vehicle control of the driving assistance system according to Embodiment 7.
Figure 46:
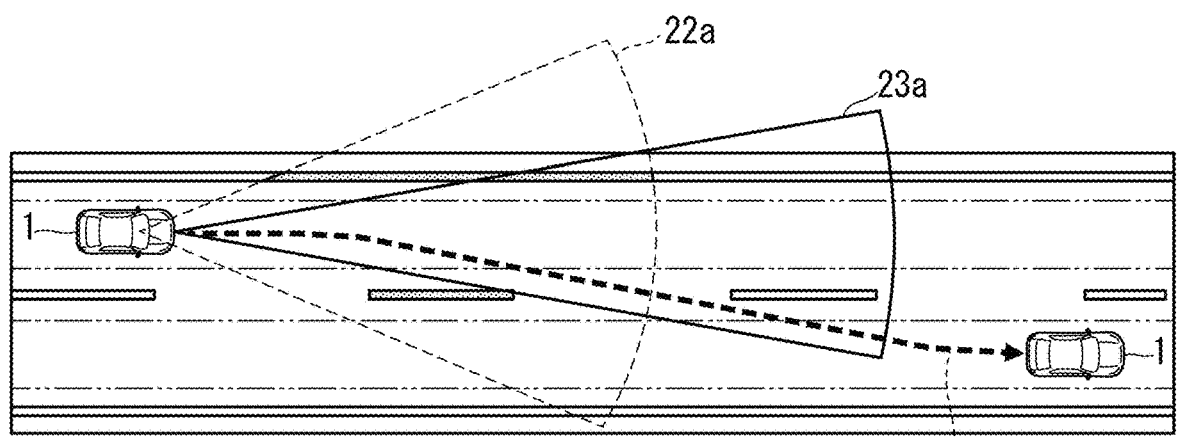
FIG. 46 illustrates example vehicle control of the driving assistance system according to Embodiment 7.

FIGS. 45 and 46 illustrate examples of determining whether to change a lane, based on the type (solid line and broken line) of each of the right and left white lines of the traveling lane in front of the subject vehicle 1.

In FIG. 45, each of the right and left white lines of the traveling lane of the subject vehicle 1 is a solid line out of which a vehicle is prohibited from moving. Here, even when the operation input unit 19 receives an operation of implementing the lane change assist function from the driver, the driving assistance controller 41 suspends a command for changing a traveling lane, and outputs a command for maintaining the traveling lane to the vehicle controller 42.

In FIG. 46, the right white line of the traveling lane of the subject vehicle 1 is a broken line across which a vehicle can travel. Here, when the operation input unit 19 receives an operation of implementing the lane change assist function from the driver, the driving assistance controller 41 confirms the absence of any obstacle around the subject vehicle 1 and then generates a traveling path 58 including coordinates and an azimuth. Subsequently, the driving assistance controller 41 outputs, to the vehicle controller 42, a command for changing the traveling lane of the subject vehicle 1 along the traveling path 58.

Upon receipt of this command, the vehicle controller 42 controls the driving controller 43, the braking controller 44, and the steering controller 45 so that the subject vehicle 1 travels through the traveling path 58, thereby changing the traveling lane to a lane to the right of the current traveling lane. The information output unit 17 outputs, to the driving assistance controller 41, coordinates indicating boundaries of a lane identified by the map matching unit 16 as the traveling lane, the type of the traveling lane (solid line and broken line), and the subject vehicle position. The driving assistance controller 41 controls distances between the subject vehicle position and the right and left white lines of the traveling lane by checking the coordinates indicating the boundaries of the traveling lane, the type of the traveling lane (solid line and broken line), and the subject vehicle position against the boundary lines of the traveling lane obtained by the vehicle surrounding measurement unit 21.

For example, even when a distance between the subject vehicle 1 and a non-subject vehicle ahead becomes shorter and the front stereoscopic camera 22 cannot temporarily sense the right and left white lines of the traveling lane, as long as a state where a prediction error of the subject vehicle position is lower than or equal to a predefined error is continued, the aforementioned configuration can determine whether to change a lane using at least one of the type of the white line from the information output unit 17 or the type of the white line from the vehicle surrounding measurement unit 21. The driving assistance system can assist driving of the subject vehicle 1 so that the subject vehicle 1 follows the traffic rules.

Furthermore, the driving assistance controller 41 assists the lane keeping, using relationships between the coordinates indicating the boundaries of the lane identified by the map matching unit 16 as the traveling lane and the subject vehicle position from the information output unit 17. For example, even when a distance between the subject vehicle 1 and a non-subject vehicle ahead becomes shorter and the front stereoscopic camera 22 cannot temporarily sense the right and left white lines of the traveling lane, as long as a state where a prediction error of the subject vehicle position is lower than or equal to a predefined error is continued, the stable lane keeping assist can be provided to the driver and the occupants.

FIGS. 47 to 51 illustrate, in chronological order, an example where the subject vehicle 1 is traveling while avoiding and overtaking a non-subject vehicle 56*d* parking ahead of the subject vehicle 1.

Figure 47:
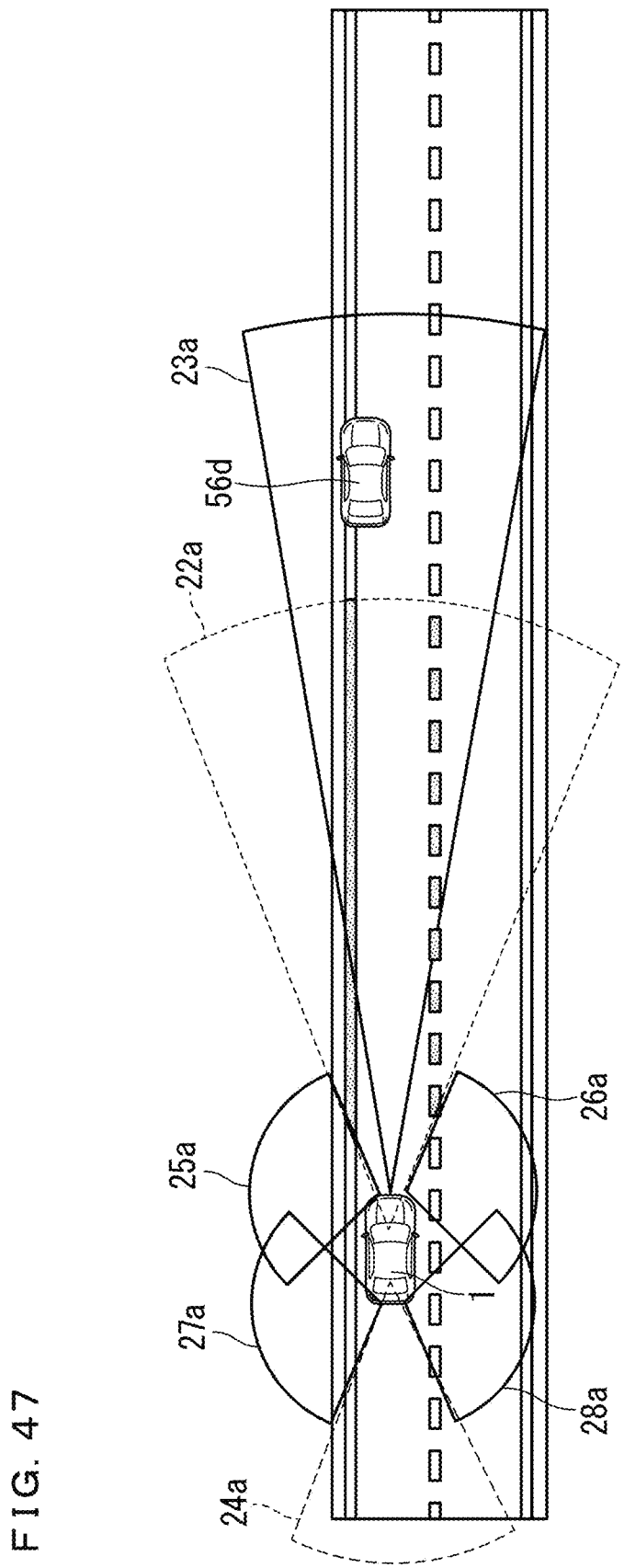
FIG. 47 illustrates example vehicle control of the driving assistance system according to Embodiment 7.

FIG. 47 illustrates that the front millimeter wave radar 23 senses an obstacle ahead of the traveling lane of the subject vehicle 1 and the front stereoscopic camera 22 senses that the right line of the traveling lane is a broken line. The driving assistance controller 41 maps coordinates of the subject vehicle position, coordinates of the obstacle ahead of the subject vehicle 1, and the type of the white line in a virtual space per lane.

Figure 48:
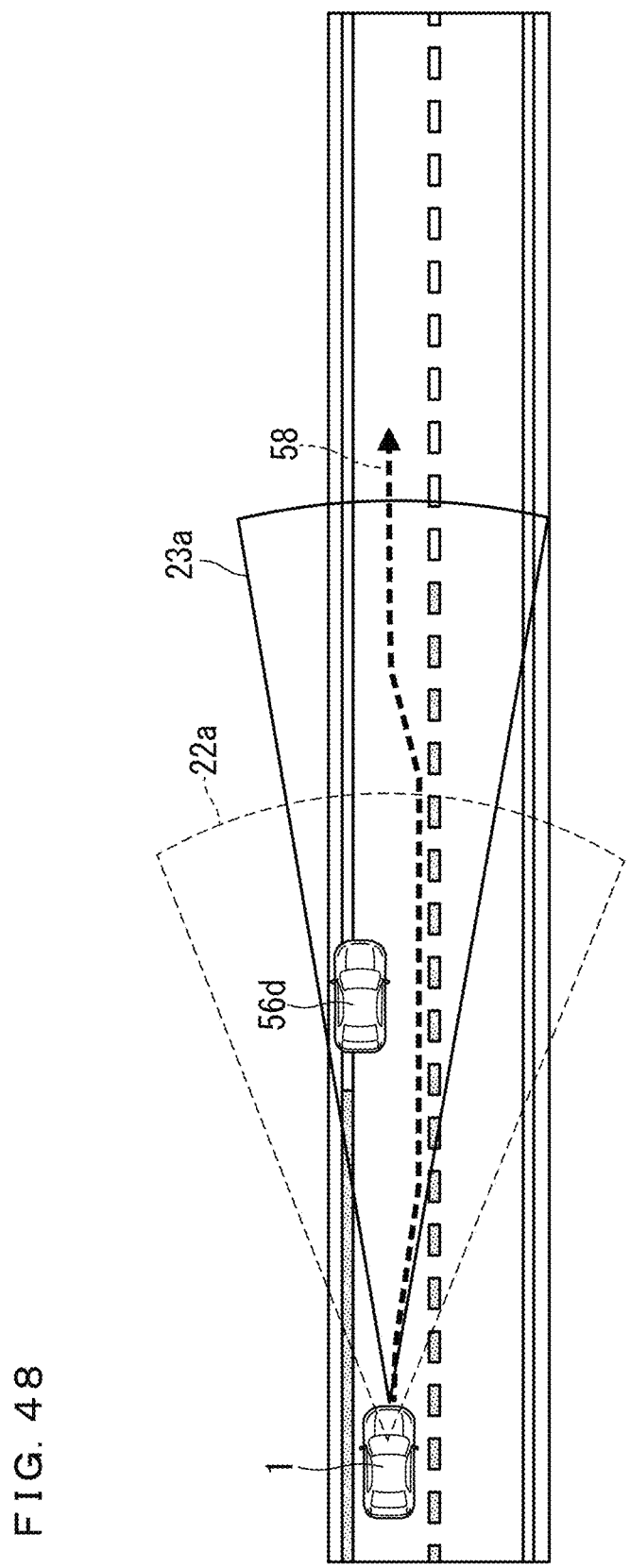
FIG. 48 illustrates example vehicle control of the driving assistance system according to Embodiment 7.

FIG. 48 illustrates that the subject vehicle 1 is approaching an obstacle up to a distance at which the front stereoscopic camera 22 can sense the obstacle as the parking non-subject vehicle 56*d*. Here, when the operation input unit 19 receives an operation of implementing the lane change assist function from the driver, the driving assistance controller 41 generates the traveling path 58 for overtaking the non-subject vehicle 56*d*, adds the traveling path 58 to the virtual space, and updates the mapping including the subject vehicle position and the white lines of the traveling lane whenever necessary. The traveling path 58 provides space with a predefined distance between the subject vehicle 1 and the non-subject vehicle 56*d*, in a location where the subject vehicle 1 overtakes one side of the non-subject vehicle 56*d*.

Figure 49:
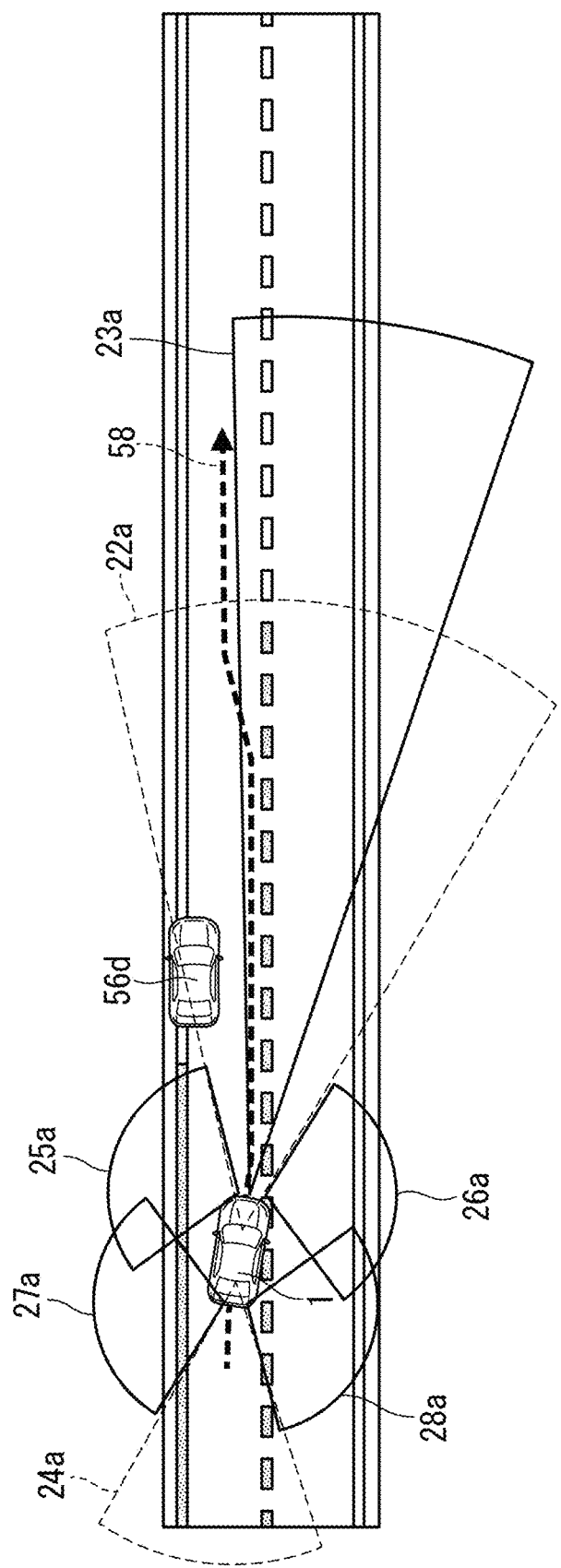
FIG. 49 illustrates example vehicle control of the driving assistance system according to Embodiment 7.

In FIG. 49, the subject vehicle 1 is moving along the traveling path 58 for avoiding the non-subject vehicle 56*d* while the front stereoscopic camera 22 checks the position relationship between the subject vehicle 1 and the non-subject vehicle 56*d*. The driving assistance controller 41 controls the driving controller 43, the braking controller 44, and the steering controller 45 so that the subject vehicle position and the traveling azimuth determined by the hybrid positioning unit 14 follow the traveling path 58, and also updates information mapped to the virtual space. These control and update are performed in FIGS. 50 and 51.

Figure 50:
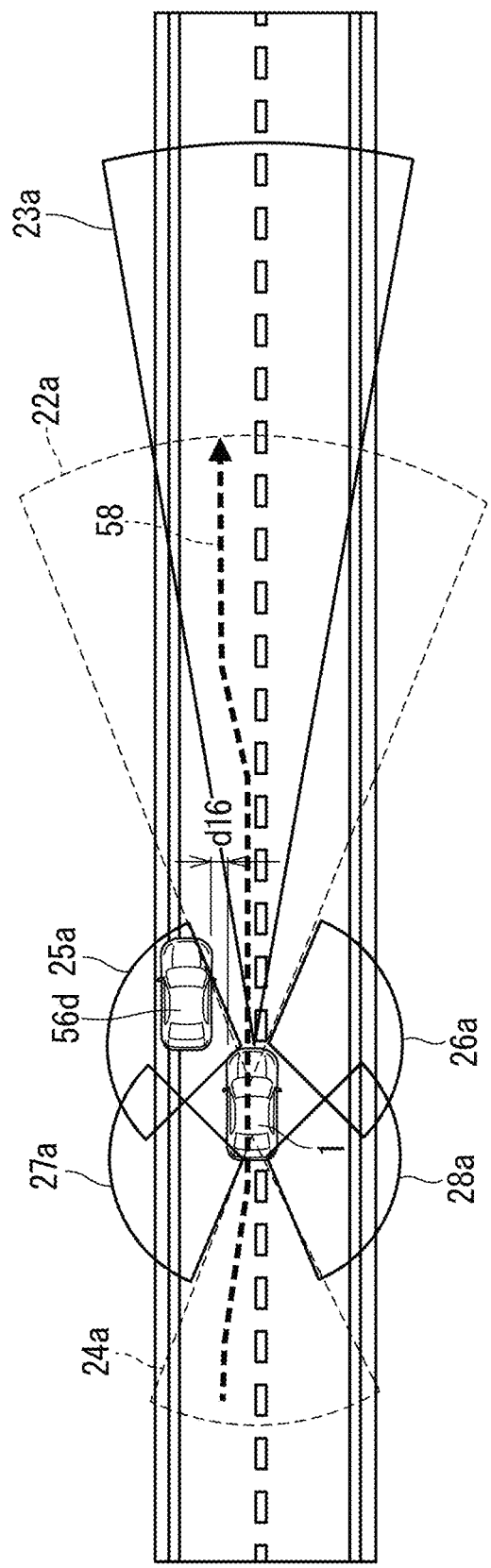
FIG. 50 illustrates example vehicle control of the driving assistance system according to Embodiment 7.

FIG. 50 illustrates the subject vehicle 1 overtaking one side of the non-subject vehicle 56*d*. The subject vehicle 1 and the non-subject vehicle 56*d* have space with the predefined distance d16. While the subject vehicle 1 is moving along the traveling path 58 in the state of FIG. 50, the left front millimeter wave radar 25 gradually ceases sensing the non-subject vehicle 56*d*, whereas the left rear millimeter wave radar 27 gradually senses the non-subject vehicle 56*d*.

Figure 51:
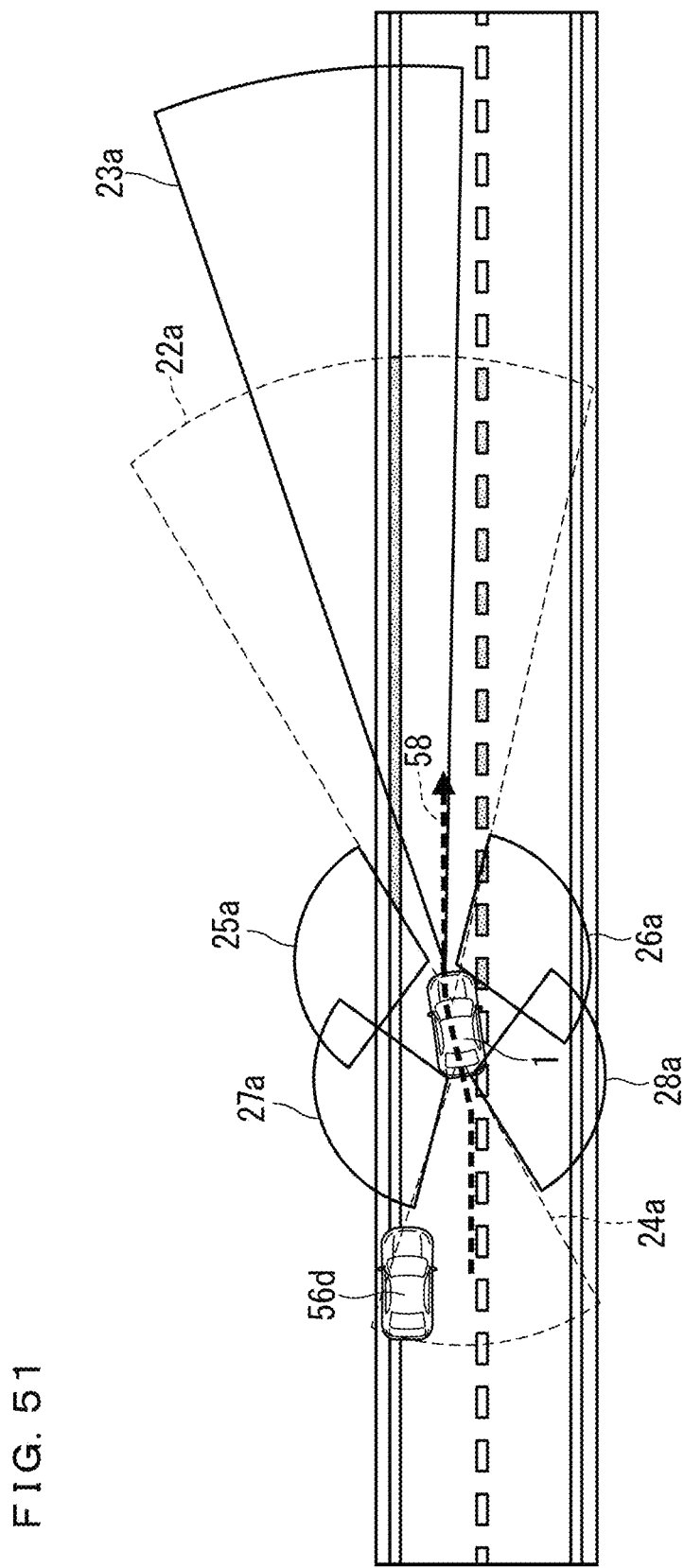
FIG. 51 illustrates example vehicle control of the driving assistance system according to Embodiment 7.

In FIG. 51, the left rear millimeter wave radar 27 ceases sensing the non-subject vehicle 56*d*, and the subject vehicle 1 is moving along the traveling path 58 that returns to the original lane.

For example, when the non-subject vehicle 56*d* is parked ahead of the subject vehicle 1, the aforementioned configuration provides the driving assistance so that the subject vehicle 1 moves along the traveling path 58 having the space with the distance d16 between the subject vehicle 1 and the non-subject vehicle 56*d* while confirming the absence of other obstacles around the subject vehicle 1. Since the configuration can prevent the subject vehicle 1 from continuing to wait behind the non-subject vehicle 56*d*, traffic congestion can be reduced.

Figure 52:
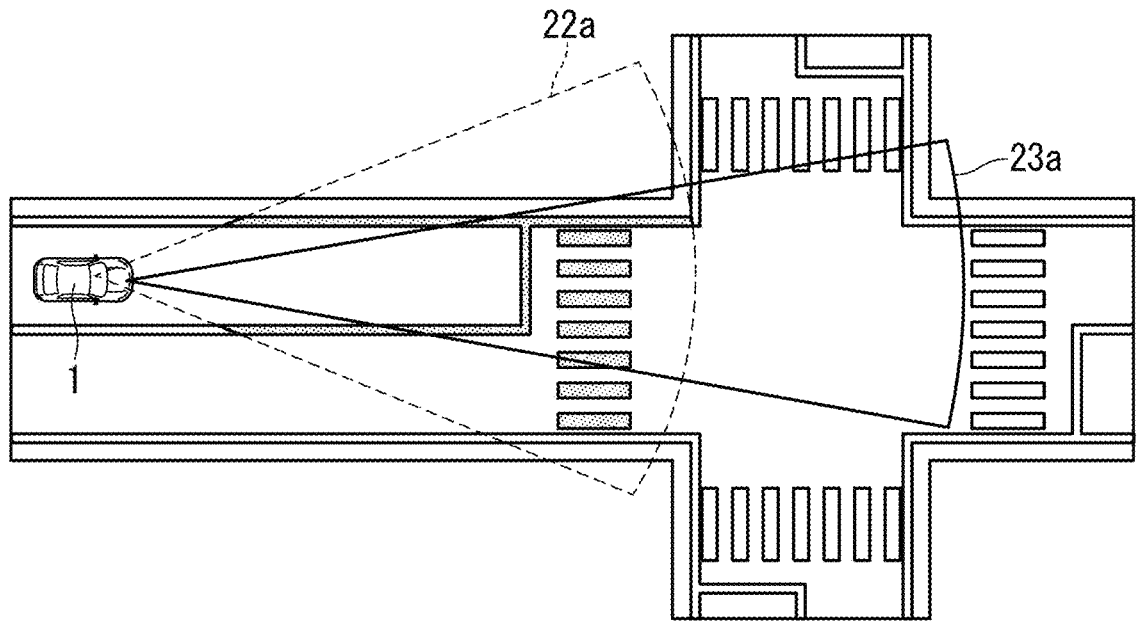
FIG. 52 illustrates example vehicle control of the driving assistance system according to Embodiment 7.
Figure 53:
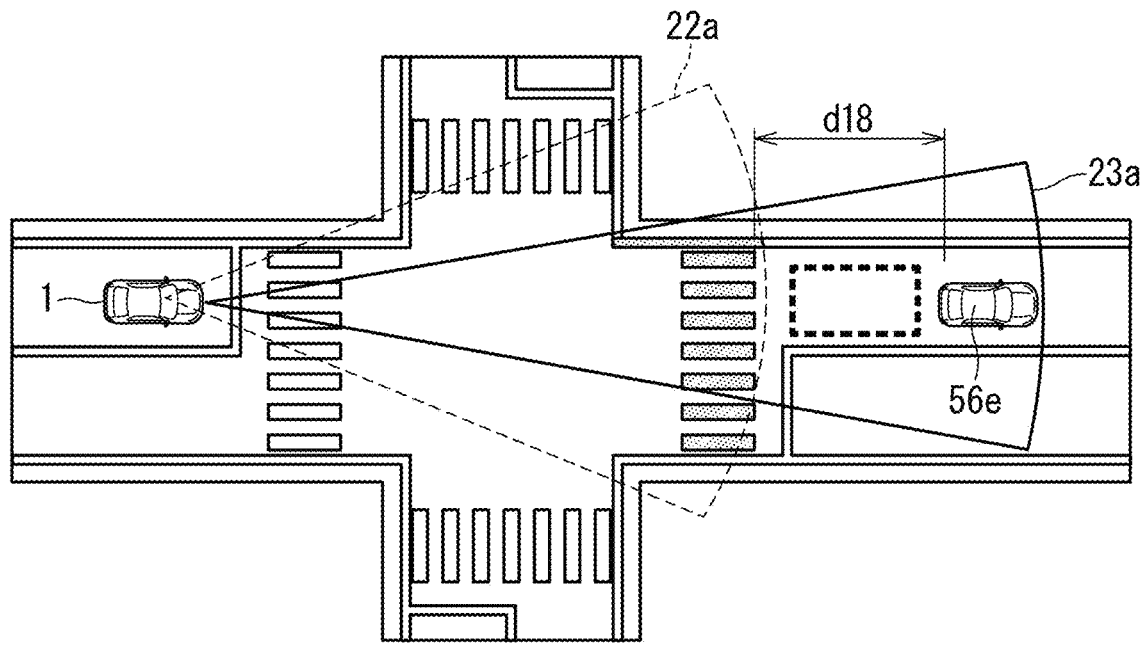
FIG. 53 illustrates example vehicle control of the driving assistance system according to Embodiment 7.
Figure 54:
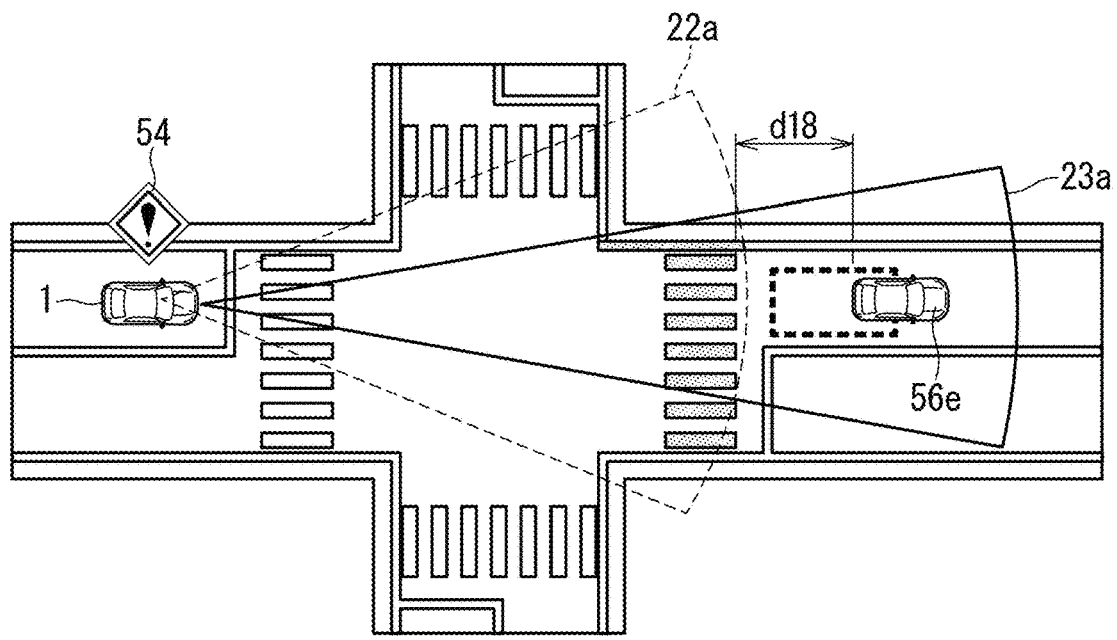
FIG. 54 illustrates example vehicle control of the driving assistance system according to Embodiment 7.

FIGS. 52 to 54 illustrate that when the subject vehicle 1 is traveling through a single lane in one direction on a road and is approaching an intersection, the subject vehicle 1 stops in front of the intersection once and then proceeds ahead of the intersection.

In FIG. 52, the front stereoscopic camera 22 senses the presence of a pedestrian crossing and a stop line between the subject vehicle 1 and the intersection, and also senses the right and left white lines of the traveling lane as solid lines. The driving assistance controller 41 maps, for example, in a virtual space, the subject vehicle position, the white lines of the traveling lane, and coordinates and the size of each of the stop line and the pedestrian crossing.

FIG. 53 illustrates that the subject vehicle 1 stops in front of the stop line in front of the intersection. Here, the front stereoscopic camera 22 senses a pedestrian crossing ahead of the intersection, and the front millimeter wave radar 23 senses an obstacle ahead of the pedestrian crossing. The driving assistance controller 41 maps coordinates and the size of each of the pedestrian crossing and the obstacle ahead of the intersection. Furthermore, the driving assistance controller 41 determines whether a distance d18 between the pedestrian crossing and the obstacle ahead of the pedestrian crossing is longer than the length of the subject vehicle 1, that is, the presence or absence of space that the subject vehicle 1 can enter between the pedestrian crossing and the obstacle ahead of the pedestrian crossing. FIG. 53 illustrates the presence of the space that the subject vehicle 1 can enter, between the pedestrian crossing and a non-subject vehicle 56e ahead of the pedestrian crossing. Here, the driving assistance controller 41 determines that the subject vehicle 1 can proceed ahead of the intersection when a traffic signal turns green, causes the display 18 to notify it to the driver and the occupants through a display screen and by voice, and allows the subject vehicle 1 to enter the intersection.

FIG. 54 illustrates the absence of the space that the subject vehicle 1 can enter between the pedestrian crossing and the non-subject vehicle 56e ahead of the pedestrian crossing, unlike FIG. 53. Here, the driving assistance controller 41 determines that the subject vehicle 1 cannot proceed ahead of the intersection when the traffic signal turns green, causes the display 18 to notify the driver and the occupants to wait until the space is created, by displaying an image 54 and by voice, and causes the subject vehicle 1 to continue to stop.

In this configuration, the subject vehicle 1 stops in front of the stop line in front of the intersection once and then checks the presence or absence of the space ahead of the intersection. This can prevent the subject vehicle 1 from irrationally entering the intersection in the absence of the space ahead of the intersection, and obstructing traffic flow.

[Modifications]

Although Embodiment 7 describes mapping coordinates of a non-subject vehicle in a virtual space, the movement of the non-subject vehicle may be predicted based on momentary coordinates of the non-subject vehicle and a speed of the subject vehicle 1 relative to a speed of the non-subject vehicle. Such a configuration enables vehicle control with more accurate traffic situations around the subject vehicle 1 being reflected.

Embodiment 7 describes that the stereoscopic cameras each sense the size of the non-subject vehicle, which is not limited to this. For example, the driving assistance controller 41 may create a database by associating vehicle models with sizes in advance and sense the size of a non-subject vehicle by recognizing a vehicle model closer in silhouette of brightness boundaries sensed by a stereoscopic camera as a vehicle model of the non-subject vehicle. Furthermore, the driving assistance controller 41 may calculate a distance between a subject vehicle and a non-subject vehicle, based on the size of the non-subject vehicle sensed from the vehicle model, and the size of the non-subject vehicle sensed by a stereoscopic camera.

[Other Modifications]

Figure 55:
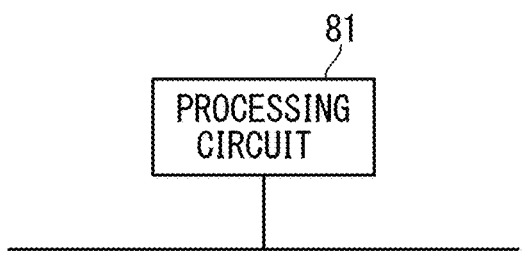
FIG. 55 is a block diagram illustrating a hardware configuration of a positioning device according to the other modifications.

The GNSS receiver 11, the positioning augmentation signal receiver 12, the positioning-based satellite selecting means 131, the standalone positioning solution calculating means 132, the float solution calculating means 133, the ambiguity search and test means 134, the fix solution calculating means 135, and the satellite positioning error predicting means 136 which are described in FIG. 1 will be hereinafter referred to as "GNSS receivers 11, etc.". A processing circuit 81 in FIG. 55 implements the GNSS receivers 11, etc. Specifically, the processing circuit 81 includes: the GNSS receiver 11 that obtains pieces of observation data of a plurality of GNSS satellites and a piece of orbit data of the plurality of GNSS satellites; the positioning augmentation signal receiver 12 that obtains positioning augmentation data from positioning augmentation satellites or the Internet; the positioning-based satellite selecting means 131 that selects positioning-based satellites from among the plurality of GNSS satellites; the standalone positioning solution calculating means 132 that determines a standalone positioning solution, based on pieces of observation data and a piece of orbit data of the positioning-based satellites without using the positioning augmentation data; the float solution calculating means 133 that determines a float solution including a carrier phase bias, based on the pieces of observation data and the piece of orbit data of the positioning-based satellites, and the positioning augmentation data; the ambiguity search and test means 134 that determines an integer ambiguity based on the carrier phase bias of the float solution; the fix solution calculating means 135 that determines a fix solution based on the pieces of observation data and the piece of orbit data of the positioning-based satellite, the positioning augmentation data, and the integer ambiguity; and the satellite positioning error predicting means 136 that sets any one of the standalone positioning solution, the float solution, the fix solution, and a non-positioning solution indicating no existence of a solution as a positioning solution, and predicts a positioning error of the positioning solution per epoch. This processing circuit 81 may be dedicated hardware, or a processor that executes a program stored in a memory. The processor is, for example, a central processing unit, a processing unit, an arithmetic unit, a microprocessor, a microcomputer, or a digital signal processor (DSP).

When the processing circuit 81 is dedicated hardware, the processing circuit 81 is, for example, a single circuit, a composite circuit, a programmed processor, a parallel-programmed processor, an application-specific integrated circuit (ASIC), a field-programmable gate array (FPGA), or any combination of these. The functions of each of the units, for example, the GNSS receivers 11, etc., may be implemented by a circuit obtained by distributing a processing circuit, or the functions of the units may be collectively implemented by a single processing circuit.

Figure 56:
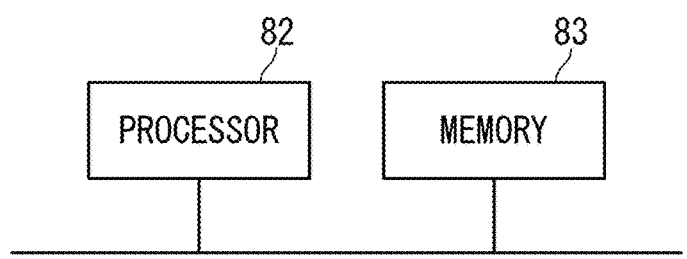
FIG. 56 is a block diagram illustrating a hardware configuration of the positioning device according to the other modifications.

When the processing circuit 81 is a processor, the functions of the GNSS receivers 11 etc., are implemented by any combinations with software, etc. The software, etc., is, for example, software, firmware, or the software and the firmware. For example, the software is described as a program, and stored in a memory. As illustrated in FIG. 56, a processor 82 to be applied as the processing circuit 81 implements the functions of each of the units by reading and executing the program stored in a memory 83. In other words, the positioning device includes the memory 83 for storing a program which, when executed by the processing circuit 81, consequently executes the steps of: obtaining pieces of observation data of a plurality of GNSS satellites and a piece of orbit data of the plurality of GNSS satellites; obtaining positioning augmentation data from positioning augmentation satellites or the Internet; selecting positioning-based satellites from among the plurality of GNSS satellites; determining a standalone positioning solution, based on pieces of observation data and a piece of orbit data of the positioning-based satellites without using the positioning augmentation data; determining a float solution including a carrier phase bias, based on the pieces of observation data and the piece of orbit data of the positioning-based satellites, and the positioning augmentation data; determining an integer ambiguity based on the carrier phase bias of the float solution; determining a fix solution based on the pieces of observation data and the piece of orbit data of the positioning-based satellites, the positioning augmentation data, and the integer ambiguity; and setting any one of the standalone positioning solution, the float solution, the fix solution, and a non-positioning solution indicating no existence of a solution as a positioning solution, and predicting a positioning error of the positioning solution per epoch. Put it differently, this program causes a computer to execute procedures or methods on the GNSS receivers 11, etc. Here, examples of the memory 83 may include non-volatile or volatile semiconductor memories such as a random-access memory (RAM), a read-only memory (ROM), a flash memory, an erasable programmable read-only memory (EPROM), and an electrically erasable programmable read-only memory (EEPROM), a hard disk drive (HDD), a magnetic disc, a flexible disk, an optical disk, a compact disk, a mini disk, a Digital Versatile Disc (DVD), a drive device thereof, and further any a storage medium to be used in the future.

The configuration for implementing the functions of the GNSS receivers 11, etc., using one of the hardware and the software, etc., is described above. However, the configuration is not limited to this but a part of the GNSS receivers 11, etc., may be implemented by dedicated hardware, and another part thereof may be implemented by software, etc. For example, the processing circuit 81, an interface, and a receiver functioning as the dedicated hardware can implement the functions of the GNSS receivers 11, etc., and the processing circuit 81 functioning as the processor 82 can implement the functions of the other constituent elements through reading and executing a program stored in the memory 83.

As described above, the processing circuit 81 can implement each of the functions by hardware, software, etc., or any combinations of these.

Furthermore, the aforementioned positioning device is applicable to a positioning system built as a system obtained by appropriately combining: vehicle equipment such as portable navigation devices (PNDs), navigation devices, and a driver monitoring system (DMS), communication terminals including mobile terminals such as a mobile phone, a smartphone, and a tablet, functions of applications to be installed into at least one of the vehicle equipment or the communication terminals, and a server. The functions and the constituent elements of the aforementioned positioning device may be dispersively allocated to the devices that build the system, or allocated to any one of the devices in a centralized manner.

Embodiments and the modifications can be freely combined, or appropriately modified and omitted.

The foregoing description is in all aspects illustrative and not restrictive. It is understood that numerous modifications that have not yet been exemplified can be devised.

EXPLANATION OF REFERENCE SIGNS

11 GNSS receiver, 12 positioning augmentation signal receiver, 131 positioning-based satellite selecting means, 132 standalone positioning solution calculating means, 133 float solution calculating means, 134 ambiguity search and test means, 135 fix solution calculating means, 136 satellite positioning error predicting means, 141 speed sensor, 144 angular velocity sensor, 147 dead reckoning means, 148 hybrid positioning means, 149 hybrid positioning error predicting means.

The invention claimed is:

1. A positioning apparatus, comprising:
   GNSS obtaining circuitry to obtain a piece of observation data generated by a GNSS receiver including, for each of positioning signals from a plurality of GNSS satellites, a pseudo range, a carrier phase, and a Doppler shift frequency, and a piece of orbit data of the plurality of GNSS satellites;
   positioning augmentation data obtaining circuitry to obtain positioning augmentation data from positioning augmentation satellites or the Internet;
   positioning-based satellite selecting circuitry to select positioning-based satellites from among the plurality of GNSS satellites based on a communication quality of the GNSS satellites;
   standalone positioning solution calculating circuitry to determine a standalone positioning solution, based on the pieces of observation data and a piece of orbit data of the positioning-based satellites without using the positioning augmentation data;
   float solution calculating circuitry to determine a float solution including a carrier phase bias, based on the pieces of observation data and the piece of orbit data of the positioning-based satellites, and the positioning augmentation data;
   search and test circuitry to determine an integer ambiguity based on the carrier phase bias of the float solution;
   fix solution calculating circuitry to determine a fix solution based on the pieces of observation data and the piece of orbit data of the positioning-based satellites, the positioning augmentation data, and the integer ambiguity; and
   satellite positioning error predicting circuitry to set any one of, the standalone positioning solution, the float solution, the fix solution, and an indication of no existence of a solution, as a positioning solution, and predict a positioning error of the positioning solution per epoch, wherein the epoch corresponds to a cycle of operation of the positioning apparatus,
   wherein the satellite positioning error predicting circuitry:
   predicts a positioning error of the float solution per epoch, based on a relationship between the positioning error of the float solution and information on at least one of a constellation of the positioning-based satellites, an elapsed time after receipt of the positioning augmentation data, observation statuses of the positioning-based satellites, or a converged status of the float solution, the relationship being obtained by learning the information and the positioning error of the float solution; and predicts a positioning error of the fix solution per epoch, based on a relationship between the information and the positioning error of the fix solution, the relationship being obtained by learning the information and the positioning error of the fix solution, and wherein the positioning apparatus further comprises:
a dead reckoning circuitry to estimate a position of a vehicle using a sensor;
a hybrid positioning circuitry to determine a hybrid positioning solution, based on the position of the vehicle estimated by the dead reckoning circuitry, and the standalone positioning solution; and
a hybrid positioning error predicting circuitry to predict, when one of the float solution and the fix solution is determined, a positioning error of the hybrid positioning solution, based on a positioning error of the one of the float solution and the fix solution, and a difference between the one of the float solution and the fix solution and the hybrid positioning solution.

2. The positioning apparatus according to claim 1, wherein each of the positioning signals further includes an ionospheric delay error,
the positioning signals include a first positioning signal and a second positioning signal that are in different frequency bands, and
the positioning-based satellite selecting circuitry:
determines first pseudo-range residuals, based on a comparison between the pseudo ranges and the carrier phases or the Doppler shift frequencies all of which are included in the positioning signals being received;
determines second pseudo-range residuals by offsetting the ionospheric delay error of the first positioning signal against the ionospheric delay error of the second positioning signal when having both of the first positioning signal and the second positioning signal;
selects preliminary positioning-based satellites whose communication quality is higher than or equal to a first threshold from among the plurality of GNSS satellites, based on at least one of the first pseudo-range residuals or the second pseudo-range residuals of the plurality of GNSS satellites; and
selects the positioning-based satellites whose communication quality is higher than or equal to a second threshold higher than the first threshold and whose number of pieces of observation data is lower than or equal to a threshold, from among the plurality of GNSS satellites based on the at least one of the first pseudo-range residuals or the second pseudo-range residuals of the plurality of GNSS satellites, when the number of pieces of observation data of the preliminary positioning-based satellites exceeds a threshold.

3. The positioning apparatus according to claim 1, wherein the positioning apparatus learns the relationship between the information and the positioning error of the float solution and the relationship between the information and the positioning error of the fix solution.

4. The positioning apparatus according to claim 1, wherein the float solution calculating circuitry determines the float solution per epoch when a predetermined computation condition is satisfied, irrespective of whether the search and test circuitry determines the integer ambiguity, and
the search and test circuitry determines the integer ambiguity when the positioning error of the fix solution is larger than a first threshold and pseudo range residuals of the positioning-based satellites are smaller than a second threshold, until radio waves of the positioning-based satellites are interrupted or shielded since the search and test circuitry determines the integer ambiguity, or until the positioning-based satellites are updated since the search and test circuitry determines the integer ambiguity.

5. The positioning apparatus according to claim 1, wherein when one of the float solution and the fix solution is determined, the satellite positioning error predicting circuitry predicts a positioning error of the standalone positioning solution, based on a positioning error of the one of the float solution and the fix solution, and a difference between the one of the float solution and the fix solution and the standalone positioning solution.

6. The positioning apparatus according to claim 1, when none of the float solution and the fix solution is determined, the hybrid positioning circuitry corrects a positioning error of the standalone positioning solution using positioning errors of the standalone positioning solution calculated up to a predefined epoch, and determines the hybrid positioning solution based on the corrected standalone positioning solution.

7. A positioning method, comprising:
obtaining a piece of observation data that is generated by a GNSS receiver including, for each of positioning signals from a plurality of GNSS satellites, a pseudo range, a carrier phase, and a Doppler shift frequency, and a piece of orbit data of the plurality of GNSS satellites;
obtaining positioning augmentation data from positioning augmentation satellites or the Internet;
selecting positioning-based satellites from among the plurality of GNSS satellites based on a communication quality of the GNSS satellites;
determining a standalone positioning solution, based on the pieces of observation data and a piece of orbit data of the positioning-based satellites without using the positioning augmentation data;
determining a float solution including a carrier phase bias, based on the pieces of observation data and the piece of orbit data of the positioning-based satellites, and the positioning augmentation data;
determining an integer ambiguity based on the carrier phase bias of the float solution;
determining a fix solution based on the pieces of observation data and the piece of orbit data of the positioning-based satellites, the positioning augmentation data, and the integer ambiguity;
setting any one of, the standalone positioning solution, the float solution, the fix solution, and an indication of no existence of a solution, as a positioning solution, and predicting a positioning error of the positioning solution per epoch, the epoch corresponding to a cycle of operation of the positioning method;
predicting a positioning error of the float solution per epoch, based on a relationship between the positioning error of the float solution and information on at least one of a constellation of the positioning-based satellites, an elapsed time after receipt of the positioning augmentation data, observation statuses of the positioning-based satellites, or a converged status of the float solution, the relationship being obtained by learning the information and the positioning error of the float solution; and
predicting a positioning error of the fix solution per epoch, based on a relationship between the information and the positioning error of the fix solution, the relationship being obtained by learning the information and the positioning error of the fix solution,
wherein the positioning method further comprises:
estimating a position of a vehicle using a sensor;
determining a hybrid positioning solution based on the estimated position of the vehicle, and the standalone positioning solution; and
predicting, when one of the float solution and the fix solution is determined, a positioning error of the hybrid positioning solution, based on a positioning error of the one of the float solution and the fix solution, and a difference between the one of the float solution and the fix solution and the hybrid positioning solution.

8. A positioning apparatus, comprising:
GNSS obtaining circuitry to obtain a piece of observation data generated by a GNSS receiver including, for each of positioning signals from a plurality of GNSS satellites, a pseudo range, a carrier phase, and a Doppler shift frequency, and a piece of orbit data of the plurality of GNSS satellites;
positioning augmentation data obtaining circuitry to obtain positioning augmentation data from positioning augmentation satellites or the Internet;
positioning-based satellite selecting circuitry to select positioning-based satellites from among the plurality of GNSS satellites based on a communication quality of the GNSS satellites;
standalone positioning solution calculating circuitry to determine a standalone positioning solution, based on the pieces of observation data and a piece of orbit data of the positioning-based satellites without using the positioning augmentation data;
float solution calculating circuitry to determine a float solution including a carrier phase bias, based on the pieces of observation data and the piece of orbit data of the positioning-based satellites, and the positioning augmentation data;
search and test circuitry to determine an integer ambiguity based on the carrier phase bias of the float solution;
fix solution calculating circuitry to determine a fix solution based on the pieces of observation data and the piece of orbit data of the positioning-based satellites, the positioning augmentation data, and the integer ambiguity;
satellite positioning error predicting circuitry to set any one of, the standalone positioning solution, the float solution, the fix solution, and an indication of no existence of a solution, as a positioning solution, and predict a positioning error of the positioning solution per epoch, wherein the epoch corresponds to a cycle of operation of the positioning apparatus;
a dead reckoning circuitry to estimate a position of a vehicle using a sensor; and
a hybrid positioning circuitry to determine a hybrid positioning solution, based on the position of the vehicle estimated by the dead reckoning circuitry, and the positioning solution,
wherein the satellite positioning error predicting circuitry:
predicts a positioning error of the float solution per epoch, based on a relationship between the positioning error of the float solution and information on at least one of a constellation of the positioning-based satellites, an elapsed time after receipt of the positioning augmentation data, observation statuses of the positioning-based satellites, or a converged status of the float solution, the relationship being obtained by learning the information and the positioning error of the float solution; and
predicts a positioning error of the fix solution per epoch, based on a relationship between the information and the positioning error of the fix solution, the relationship being obtained by learning the information and the positioning error of the fix solution,
the positioning apparatus further comprising
a controller to determine, based on the hybrid positioning solution and map data, at least one of a distance between a center of the vehicle and a center of a traveling lane through which the vehicle is traveling, a distance between the vehicle and a white line to a left of the traveling lane, or a distance between the vehicle and a white line to a right of the traveling lane, and causes a display to display a color corresponding to the at least one of the distances.

9. The positioning apparatus according to claim 8,
wherein the controller determines a traveling trajectory of the vehicle and a position of each of the white lines of the traveling lane, based on the hybrid positioning solution and the map data, and causes the display to execute an alert corresponding to the traveling trajectory and the positions of the white lines.

10. The positioning apparatus according to claim 8,
wherein the controller causes the display to display a position relationship between boundary lines of the traveling lane, the white lines, and the vehicle, based on the hybrid positioning solution and the map data.

11. The positioning apparatus according to claim 8,
wherein the controller causes the display to guide an emergency parking zone ahead of the vehicle, based on the hybrid positioning solution and the map data.

12. The positioning apparatus according to claim 8,
wherein the controller causes the display to display regional destinations for respective lanes including the traveling lane, based on the hybrid positioning solution and the map data.

13. The positioning apparatus according to claim 8,
wherein the controller causes the display to execute an alert when the vehicle enters or has entered a lane through which the vehicle cannot pass, based on the hybrid positioning solution and the map data.

14. The positioning apparatus according to claim 8, further comprising
measurement circuitry to sense the white lines to the right and the left of the traveling lane of the vehicle, and estimate whether the traveling lane is a leftmost lane, a rightmost lane, or an inner lane, based on combinations of types of the sensed white lines,
wherein the controller causes the display to guide a lane through which the vehicle should travel, based on the hybrid positioning solution and a result of the estimation of the measurement circuitry.

15. The positioning apparatus according to claim 14,
wherein the measurement circuitry senses a bump and a pothole on a road ahead of the vehicle, and an obstacle ahead of the vehicle, and
the controller causes the display to execute an alert, based on a sensing result on the obstacle.

16. The positioning apparatus according to claim 14,
wherein the measurement circuitry senses an obstacle ahead of the vehicle, and
the controller causes the display to display a map per lane to which the obstacle has been mapped, based on the map data and a sensing result on the obstacle.

17. The positioning apparatus according to claim 14,
wherein the measurement circuitry senses an obstacle on one side of the vehicle, using a plurality of sensing devices, and the controller predicts a behavior of the obstacle, based on a sensing result on the obstacle.

18. The positioning apparatus according to claim 14,
wherein the measurement circuitry determines a road surface condition of a road through which the vehicle is traveling, and the controller causes the display to execute an alert, based on a determining result on the road surface condition.

19. The positioning apparatus according to claim 14,
wherein the controller controls a distance between the vehicle and each of the white lines, based on the hybrid positioning solution and a sensing result on the white lines.

20. The positioning apparatus according to claim 14,
wherein the controller controls a change in the traveling lane of the vehicle, based on the hybrid positioning solution, a sensing result on the white lines, and the types of the sensed white lines.

21. The positioning apparatus according to claim 14,
wherein the measurement circuitry senses a vehicle parking ahead of the vehicle, and wherein the controller allows the vehicle to overtake the parking vehicle, based on the hybrid positioning solution and a sensing result on the parking vehicle.

22. The positioning apparatus according to claim 14,
wherein the measurement circuitry senses an area in front of an intersection ahead of the vehicle, and the controller allows the vehicle to enter the area when determining that the area has a space that the vehicle can enter, based on a sensing result of the measurement circuitry.

* * * * *